US006993504B1

(12) United States Patent
Friesen et al.

(10) Patent No.: US 6,993,504 B1
(45) Date of Patent: Jan. 31, 2006

(54) USER INTERFACE FOR SEMI-FUNGIBLE TRADING

(75) Inventors: Richard W. Friesen, Fairfax, CA (US); Mark C. Klizas, San Francisco, CA (US)

(73) Assignee: Trading Technologies International, Inc., Chicago, IL (US)

( * ) Notice: Subject to any disclaimer, the term of this patent is extended or adjusted under 35 U.S.C. 154(b) by 37 days.

(21) Appl. No.: 09/651,301

(22) Filed: Aug. 30, 2000

Related U.S. Application Data

(63) Continuation-in-part of application No. 09/289,550, filed on Apr. 9, 1999.

(60) Provisional application No. 60/151,468, filed on Aug. 30, 1999.

(51) Int. Cl.
*G06F 17/60* (2006.01)

(52) U.S. Cl. ...................... 705/37; 705/36 R
(58) Field of Classification Search ............... 364/408; 705/37, 36 R
See application file for complete search history.

(56) References Cited

U.S. PATENT DOCUMENTS

| | | | |
|---|---|---|---|
| 4,674,044 A | 6/1987 | Kalmus et al. ............. | 364/408 |
| 4,750,135 A | 6/1988 | Boilen | |
| 4,799,156 A | 1/1989 | Shavit et al. ............... | 364/401 |
| 4,823,265 A * | 4/1989 | Nelson ....................... | 364/408 |
| 4,903,201 A | 2/1990 | Wagner | |
| 5,038,284 A | 8/1991 | Kramer | |
| 5,077,665 A | 12/1991 | Silverman et al. | |
| 5,101,353 A | 3/1992 | Lupien et al. | |
| 5,136,501 A | 8/1992 | Silverman et al. | |
| 5,270,922 A | 12/1993 | Higgins | |
| 5,297,031 A | 3/1994 | Gutterman et al. .......... | 364/408 |
| 5,297,032 A | 3/1994 | Trojan et al. ............... | 364/408 |
| 5,347,452 A | 9/1994 | Bay, Jr. ....................... | 705/37 |
| 5,375,055 A | 12/1994 | Togher et al. .............. | 364/408 |
| 5,619,631 A | 4/1997 | Schott | |
| 5,675,746 A * | 10/1997 | Marshall ...................... | 705/35 |
| 5,689,651 A | 11/1997 | Lozman ....................... | 395/237 |
| 5,774,877 A | 6/1998 | Patterson, Jr. et al. | |
| 5,793,301 A | 8/1998 | Patterson, Jr. et al. | |
| 5,797,002 A | 8/1998 | Patterson, Jr. et al. | |

(Continued)

FOREIGN PATENT DOCUMENTS

EP 0 388 162 A2 3/1990

(Continued)

OTHER PUBLICATIONS

Yahoo!Finance—p. 1, 1995.*

(Continued)

*Primary Examiner*—Jagdish N Patel
(74) *Attorney, Agent, or Firm*—McDonnell Boehnen Hulbert & Berghoff LLP

(57) ABSTRACT

A user interface and method are disclosed for providing trading between a plurality of semi-fungible and non-fungible goods. A plurality of book axes are displayed in a single interface, each book axis representing a market for a particular good. Orders for goods are displayed as marks on the axes to display the relative value of the orders. A value axis is provided that relates the value of the goods from each market to each other. Thus, a single interface provides the means to relate the values of different semi-fungible goods. The value axis may be displayed in units of price, or a custom value designated by a user or pre-defined by the interface. Quantity information is represented in the interface through the display of a dimension of an order icon. Precise information about each order is displayed either in a panel view or a pop-up window.

70 Claims, 15 Drawing Sheets

U.S. PATENT DOCUMENTS

| | | | |
|---|---|---|---|
| 5,844,572 A | 12/1998 | Schott | 345/440 |
| 5,845,266 A | 12/1998 | Lupien et al. | |
| 5,915,245 A | 6/1999 | Patterson, Jr. et al. | |
| 5,924,082 A | 7/1999 | Silverman et al. | |
| 5,924,083 A | 7/1999 | Silverman et al. | |
| 5,946,666 A * | 8/1999 | Nevo et al. | 705/36 |
| 5,946,667 A | 8/1999 | Tull, Jr. et al. | |
| 5,963,923 A | 10/1999 | Garber | |
| 5,966,139 A | 10/1999 | Anupam et al. | 345/440 |
| 6,012,046 A | 1/2000 | Lupien et al. | |
| 6,014,643 A | 1/2000 | Minton | |
| 6,035,287 A | 3/2000 | Stallaert et al. | |
| 6,098,051 A | 8/2000 | Lupien et al. | |
| 6,101,484 A | 8/2000 | Halbert et al. | |
| 6,131,087 A | 10/2000 | Luke et al. | |
| 6,134,535 A | 10/2000 | Belzberg | |
| 6,188,403 B1 | 2/2001 | Sacerdoti et al. | 345/339 |
| 6,195,647 B1 | 2/2001 | Martyn et al. | |
| 6,272,474 B1 | 8/2001 | Garcia | |
| 6,282,521 B1 | 8/2001 | Howorka | |
| 6,408,282 B1 | 6/2002 | Buist | |
| 6,418,419 B1 * | 7/2002 | Nieboer | 705/37 |
| 2001/0034696 A1 | 10/2001 | McIntyre | |
| 2002/0023038 A1 | 2/2002 | Fritsch et al. | |

FOREIGN PATENT DOCUMENTS

| | | |
|---|---|---|
| EP | 0 388 162 A2 | 9/1990 |
| WO | WO 92/12488 | 7/1992 |
| WO | WO 95/26005 A1 | 9/1995 |
| WO | WO 00/52619 A1 | 9/2000 |

OTHER PUBLICATIONS

APT Brochure, LIFFE Exchange, circa 1990*.
Trading Screen, INTEX of Bermuda, circa 1984*.
Weber, Information Technology in the Major International Financial Markets, Apr. 7, 1993.
Trading Screen, TIFFE Exchange, circa 1989-1990*.
Trading Screen, MEFF Exchange, circa 1990*.
Cavaletti, Order Routing Article, Futures Magazine, Feb. 1997.
Aurora Article, CBOT, circa 1989*.
Wright, William (Researh Report Information Animation Applications in the Capital Markets, IEEE 1995) (Wright).*
Kharouf, Jim and Carla Cavaletti; "A Trading Room With a View"; Futures; Nov. 1998; 6 pages. www.futuresmag.com.
USPTO Presentation regarding The NASDAQ Stock Market, Inc.; dated Nov. 8, 2001; 15 pages.
One Click Trading Options, Trading Technologies, circa 1998.
Trading Screen, SWX Exchange, circa 1990*.
Expanding futures and options trading around the world, around the clock, GLOBEX, circa 1989*.
Hansell, The Computer that ate Chicago, Institutional Investor, Feb. 1989.
Globex Report: An Update on the CME Global electronic exchange, Feb. 10, 1989.
NYMEX Access Documents, New York Mercantile Exchange, Feb. 28, 1992.
CATS Traders' Manual, Toronto Stock Exchange, Sep. 30, 1977.
Market Watch, Trading Screen, date not available.
Grummer, Peake, Sellers, Preliminary Feasibility Study, Bermudex Ltd., Nov. 1980.
Peake, Mendellson, The ABCs of trading on a market system, Appendix C of Preliminary Feascibility Study, Bermudex Ltd., Sep. 1997.
Peake, The last 15 meters, Appendix E of Preliminary Feasibility Study, Bermudex Ltd., Jun. 15, 1997.
Declaration of Brendan Bradley in Case No. 04 C 5312, Nov. 18, 2004.
Memorandum Opinion Published Feb. 9, 2005, of Judge James B. Moran in Case No. 04 C 5312.
"How the Futures Markets Work," Jake Bernstein, 1989, New York Institute of Finance, pp. 62-67.
"Dictionary of Finance and Investment Terms," John Downes and Jordan Elliot Goodman, 1998, Barrons Educational Services, Inc., p. 329.
Java Island, copyright 1999 (printed from http://www.isld.com on Jun. 11, 1999).

* cited by examiner

USER INTERFACE FOR SEMI-FUNGIBLE TRADING

RELATED APPLICATIONS

The present application claims priority under 35 U.S.C. §119(e) from provisional patent application 60/151,468, entitled "Semi-Fungible Screen Views," filed Aug. 30, 1999, and is a continuation-in-part application of U.S. patent application Ser. No. 09/289,550, "User Interface for an Electronic Trading System," filed Apr. 9, 1999, both of which are incorporated by reference, herein.

TECHNICAL FIELD

The present invention relates generally to the field of graphical user interfaces and more particularly to the field of graphical user interfaces for electronic trading systems.

BACKGROUND OF THE INVENTION

Fungible products are products which are interchangeable. For example, one share of Company A may be traded interchangeably with another share of Company A. The traders do not care which share they have because the shares are identical in every aspect. Thus, the shares are fungible. Gold, silver, corn, and soybeans are all examples of fungible goods that are commonly traded on different exchanges. Another class of products that are traded are called semi-fungible. Semi-fungible products are goods that have very similar qualities but are not identical. For example, a call stock option with a strike price of $10.00 for Company A is very similar to a call stock option with a strike price of $20.00 for Company A. Both are options for Company A, and therefore both have a value based on Company A. However, they are not interchangeable because one may be exercised at $10.00 per share and one may be exercised at $20.00 per share. Thus, they have different values, and therefore would not be traded for each other on an equal basis. For example, a trader with 10 contracts of the $10.00 strike call option may sell those contracts for one value and sell 10 contracts of the $20.00 strike call option at a different, lower, value; the $10.00 strike call option is more valuable than the $20.00 strike call option.

Trading semi-fungible goods is therefore more difficult than trading in fungible goods because of the difference in values between the semi-fungible goods. Thus, the trader must always track the relative difference in values when trading semi-fungible goods. In the simplified example described above, the trader must be aware that the trader should pay more to buy a $20.00 strike call option than the trader should pay to buy a $10.00 strike call option. However, the goods are semi-fungible, and therefore in the option example, global information about the company can affect all of the different option contracts. Thus, a trader may devote more resources into all series of call options because of a positive piece of news about the company. Alternatively, a piece of news about a company may influence a trader to buy options with a 30-day expiration date but sell options with a 12-month expiration date. Thus, a trader trading in semi-fungible goods takes advantage of commonality of the contracts but must be aware of the differences in the contracts. Tracking the relative difference in value for semi-fungible goods while executing real-time transactions is very difficult, but is extremely important to a successful trader.

In conventional schemes for providing semi-fungible good information, a trader would have to rely on a spreadsheet listing the bids and offers and associated prices for one semi-fungible good. Then, if the trader was tracking related semi-fungible goods, the trader must display on the same computer screen a second spreadsheet showing the same information for a different semi-fungible good. If the trader was trading thirty or forty or a hundred goods, as is common in the industry, the trader would find it difficult to track the activity associated with the different related semi-fungible goods. Moreover, the trader would have no context to relate the different prices for one semi-fungible good to another.

For example, a trader may be trading Company A options having a strike price of $10.00 and an expiration date of Jan. 1, 2001 (Option A). The current offer for Option A may be at $15.00, and therefore the trader may decide to buy when the offer is at $11.00. The trader may also be trading Company A options having a strike price of $10.00 that expire May 1, 2001 (Option B). The offer for that series may be at $20.00 and the trader may want to buy Option B contracts when the offer is at $15.00. The trader may have fifty more option types that the trader is interested in buying, and for each one, the trader must remember the value of the offer and at which action point the trader will buy or sell. Even though the option types are very similar, the values and the action points may be very different. If global information affecting Company A is received, for example, lower than expected sales, then the trader must adjust his action points for all of the different option types, and the adjustment most likely will not be uniform. The options having a longer expiration may be minimally affected, and the ones expiring very soon may be substantially affected by the news. Thus, the trader must maintain and adjust all of that information quickly and efficiently, which is extremely difficult to accomplish in conventional methods.

In the above-referenced patent application "User Interfaces for Electronic Trading," a method of enabling electronic trading is described that provides a user interface that displays on one screen all of the outstanding offers and bids for one product. This system provides an easy interface that allows traders to track bids and offers and decision points related to different goods. However, a system is needed that can provide ease and efficiency for trading in semi-fungible goods, that can enable a trader to view at a glance the difference in values among related semi-fungible goods or multiple non-fungible goods, and make trading decisions quickly and efficiently.

SUMMARY OF INVENTION

The present invention is a user interface for an electronic trading system that enables the efficient and effective trading of semi-fungible goods. In a preferred embodiment, the user interface displays information regarding a plurality of semi-fungible goods on a single screen to allow a trader to view markets for the different semi-fungible goods simultaneously. In one embodiment, the interface displays a series of vertical or horizontal lines (straight or curved), where each line represents a book for a single semi-fungible good. Then, in accordance with the present invention, the interface displays visual indicators of the bids and/or offers for the good such as icons or hatchmarks on the line. Thus, on a single line, a trader can view the outstanding offers and bids for a semi-fungible good. Then, adjacent the line is at least one other line representing a semi-fungible good. The trader can view both lines and the visual indicators on the lines and track the markets for the two semi-fungible goods at the same time, allowing the trader to trade in semi-fungible goods efficiently. However, in accordance with the present invention, the interface may display any number of book axes simultaneously, depending upon a user's preferences. In accordance with one embodiment of the present invention, a trader can place an offer or bid for any displayed semi-fungible good book axis merely by dragging and dropping a bid or offer icon onto the relevant book axis at a desired price or value. In a further embodiment, the trader can select one of the displayed book axes to create a enlarged version of the book axis illustrating more detail. The enlarged version displays bid and offer information and can provide additional functionality, such as providing cumulative totals of quantities being bid or offered, or generating an average price for different bids and offers.

In one embodiment, the semi-fungible goods are normalized using a common value. The value is preferably computed by an algorithm or other rule selected by the trader as a basis for comparing the semi-fungible goods. For example, for options, the common value may be implied volatility. In this example, the scale used for the axis to which the markets are correlated would be in units of implied volatility, and all of the markets displayed would also be displayed in units of implied volatility. Thus, in contrast to conventional systems, in the present invention a trader can view multiple markets for semi-fungible goods and quickly determine their relative values merely by analyzing the graphical placement of the bids and offers. In conventional systems, as discussed above, a trader would have to mentally track relative value, or compare different spreadsheets, or perform other manipulations to understand how differences in prices for different semi-fungible goods translated into relative values of those goods. In addition, the interface of the present invention allows for dynamic updating of the relative value information as the interface automatically computes changing prices or other factors into a relative value metric and displays the results on the value axes of the different goods. To determine the actual price of a good, in one embodiment, the trader merely selects a price display option to have the price revealed or rests the cursor over an axis or bid or offer icon and views a flip-up text box with price information.

In a preferred embodiment, the use of a value axis and the display of a plurality of goods enables a trader to view the spreads between bids and offers (collectively "markets") for different goods. The spread information allows the trader to quickly view what the current buying or selling price is and provides information on the liquidity and depth of the markets. In this embodiment, the spread is displayed in a different color to allow the trader to more easily view the activity in the markets.

In a further embodiment, the geometric dimensions of the visual indicators representing bids and offers indicate the quantity of the orders. Thus, for a vertical axis, the width of a visual indicator represents the quantity of the order. The quantity values and associated dimensions (e.g. length, width, area) are determined on a relative scale, to allow the display of a plurality of semi-fungible goods. For example, if one semi-fungible good has orders in quantities of 5, 10, and 15, the order for 15 will have a visual indicator that is three times as large as the order for 5. However, if this axis is alongside an axis that has orders in quantities of 100, 200 and 300, the 300 order will also have a visual indicator that is three times as large as the order for 100 and will be the same physical length as the order for 15 on the first axis. This allows the trader to quickly determine the relative quantities of orders along one axis, but still enables the display of a multiple of axes. If an absolute scale were used, for example, a single display may not be able to display the second axis, having orders in the hundreds and the first axis, that has orders in the tens, as the length of the visual indicators in the second axis would occupy most of the display space. In a further embodiment, the user assigns a value for the maximum width of a visual indicator, and all orders of the assigned value and above would appear as the maximum width. In this instance, all orders less than the assigned value would be represented by proportional hatchmarks. This set value can be a percentile level for all orders in any given book axis and a constant level can be set across all book axes. This prevents orders of quantity significantly higher than the average across all orders in the book axis from overly biasing the scale.

In a further embodiment, an action line is provided to enable a trader to immediately be aware when the value or price of a good has approached a value that the trader has determined is appropriate to take an action, i.e., buy or sell. In an embodiment in which the semi-fungible goods are displayed with axes having the same units, the action line may be a straight line that represents a value common to all semi-fungible goods. For example, if the axes are displayed in units of implied volatility, the action line may be displayed as a straight line having an implied volatility of 10. This indicates that regardless of the particular option, the trader would prefer to buy options below the action line, i.e., with implied votatility below 10, and sell options above the action line, i.e., with implied volatility above 10. The use of an action line further enables a trader to trade efficiently and effectively in semi-fungible goods.

In another embodiment of the invention, an array of filter boxes are displayed which, when highlighted, allow the trader to differentiate between semi-fungible orders based on parameters unique to given orders or order books. In a preferred embodiment, the trader can specify that a filter box be highlighted for all order books where the lowest (the "best") offer is for more than a given number of contracts. In another embodiment, all order books where a given trader has entered an order will be highlighted. A trader may use this feature to locate orders of other traders with which the trader has a line of credit.

DETAILED DESCRIPTION OF THE PREFERRED EMBODIMENT

Figure 1:
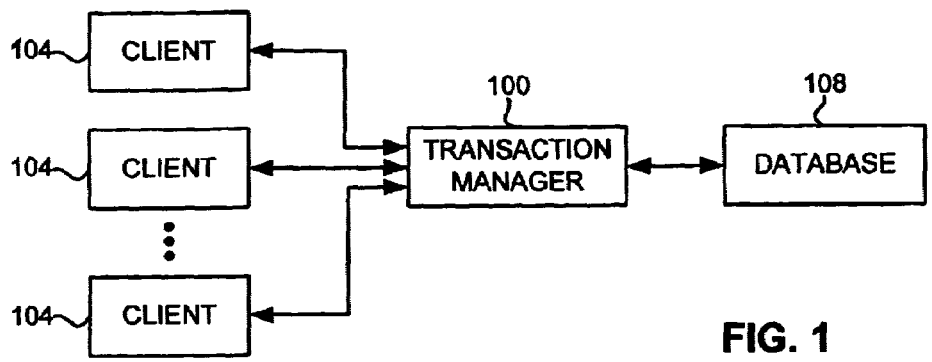
FIG. 1 is a block diagram of a preferred embodiment of the electronic trading system of the present invention.

FIG. 1 illustrates the electronic trading system in accordance with the present invention. Client terminals 104 are coupled to a transaction manager 100. The client terminals 104 are personal computers, terminals as part of a network, or any other computing device. Traders use the client terminals 104 to interact with trading pits that are managed by the transaction manager 100. The transaction manager 100 manages transaction requests generated by the client terminals 104, routes information to, from, and between the terminals 104 and the transaction manager 100, and stores and retrieves information from a database 108 or databases 108.

Figure 2:
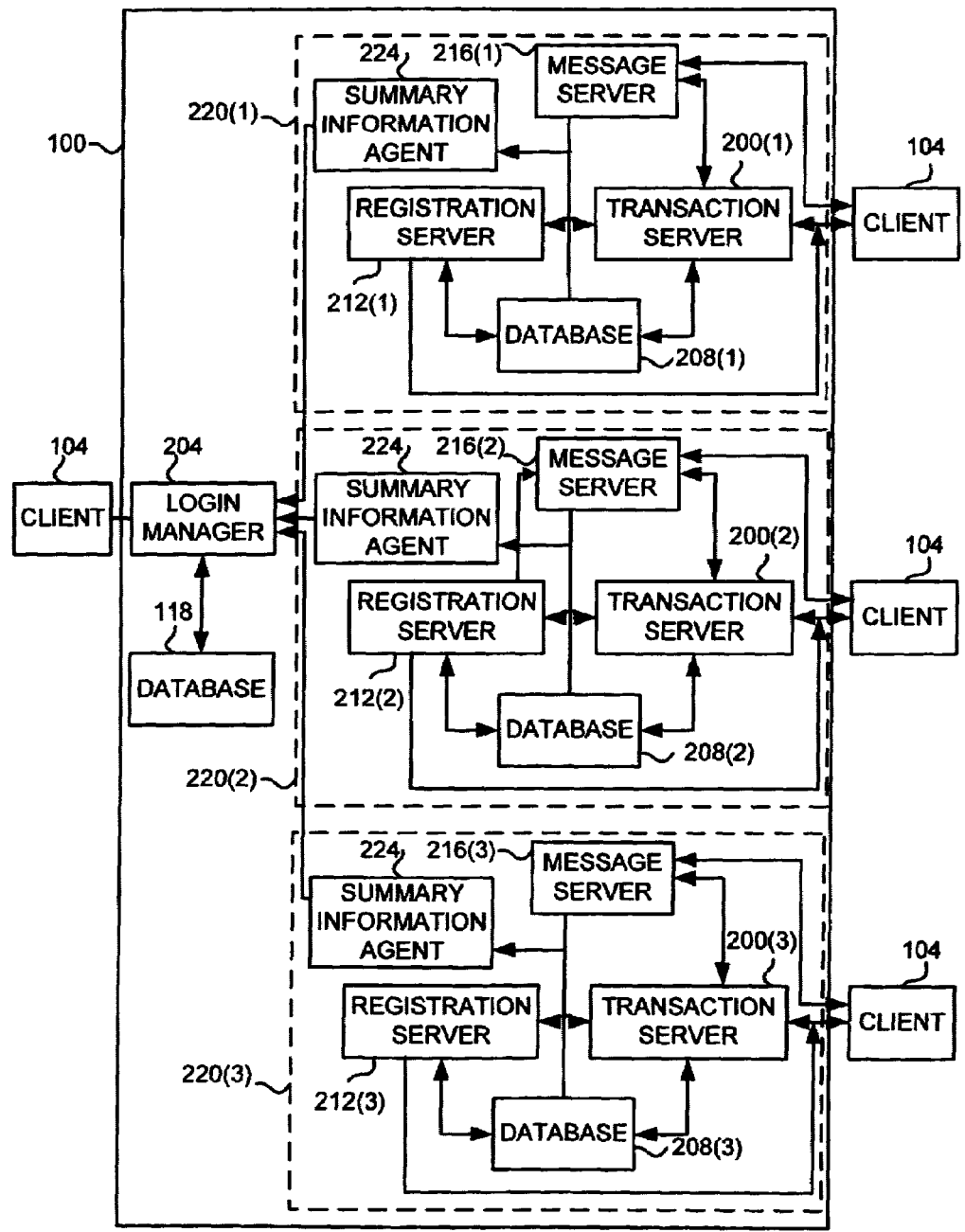
FIG. 2 is a block diagram of a preferred embodiment of the transaction manager of the present invention.

FIG. 2 illustrates a more specific embodiment of the transaction manager 100. The clients 104 are coupled to log-in manager 204 to provide to each client access to the transaction manager 100, and to allow each client 104 to designate one or more trading pit 220 to which to be connected. The transaction manager 100 hosts one or more transaction servers 200. Each transaction server 200 is responsible for the trading of a specified item, essentially supporting a specific trading pit. The summary information agents 224 for each transaction server 200 provide a current status of the activity of each pit 220 to a trader connected to the log-in manager 204. The trader can select a pit 220 to which to be connected based upon the summary information. Once the log-in process is complete, the clients 104 are coupled to a registration server 212 for the specified trading pit 220. Registration for each pit 220 requires the client 104 to provide an access key that it received from the login manager 204 during log in.

After registering for a pit 220, the trader is able to add, modify or delete orders for the item being traded in the trading pit 220. One type of an order called a "bid" is an order to buy up to a specific quantity of an item at or below a specific value. Another type of an order called an "offer" is an order to sell up to a specific quantity of an item at or above a specific value. Other types of orders are possible depending on the type of item being traded in the trading pit 220.

Each pit 220 includes a transaction server 200. The transaction server 200 receives orders, matches bids and offers (when a bid and offer are matched it is called a trade or execution) and routes information to both the database 208 and the client terminals 104 connected to the trading pit 220. The client terminals 104 generate icons for bid and offer orders (called bid and offer icons), historical charts and trader icons, and determine the placement of bid and offer icons and trader icons responsive to the information received from the transaction server 200. The database 208 to which the transaction server 200 is coupled stores the information corresponding to each trader, information on every order submitted over a period (such as start of trading days), information on every trade over a period (such as last 180 days) and the information corresponding to the item being traded. Each trader may have information associated with the trader's account stored, including a name, e-mail account, address, phone number, personal value quantifying metric or analytic activity level history, and various other information which is unique to the individual trader and which may be used by the present invention to create a virtual trading environment.

The information corresponding to every order includes whether the order was a new order, modifications to an existing order or deletion of a previously submitted order, the type of order (for example, bid or offer), the value, the quantity, the time and date the order was submitted, and any other information specific to the order. The information corresponding to every trade includes the value, quantity, buyer and seller. The information corresponding to the item being traded includes the highest outstanding bid value and the lowest outstanding offer value for the item, as well as a list of the values of all open orders for the item. The item information is stored on the database 208 in a data structure such as an order table. The server 200 updates the information in the order table responsive to receiving information from the client terminals 104. The updated information is then transmitted back to the client terminals 104. Other information, such as information used in creating historical charts, may also be stored on database 208. Information which may be global to more than one pit 220, for example, trader personal information, is also stored on the system database 108, to allow the information to be accessed by each trading pit 220.

For traders registered to the same trading pit 220, all of their orders (i.e. bids or offers specifying a value and quantity) are transmitted to the transaction server 200 for that pit 220. The server 200 analyzes the orders for matches with outstanding, or open, orders. If there is a match between orders of different types, for example, between a bid and an offer, then a transaction is enacted and the client terminals 104 are notified to remove the matched icons. All outstanding orders are transmitted to each client terminal, allowing a trader to view all of the outstanding orders from all traders for an item on a trading pit at any given time. The client displays are updated continuously or at specific intervals to provide updated information regarding which orders are outstanding and the state of the market in the pit 220. As shown in FIG. 2, multiple trading pits 220 are provided in the electronic trading system, and a single trader may be connected to as many pits 220 at the same time as desired. The number of trading pits 220 which may be maintained in accordance with the present invention is scalable responsive to the number of servers which are provided in the system. The items of trade include any possible commodity, for example, minerals, futures, or shares in a corporation. Other network configurations can be used to implement the electronic trading system as is known to those of ordinary skill in the art.

Figure 3A:
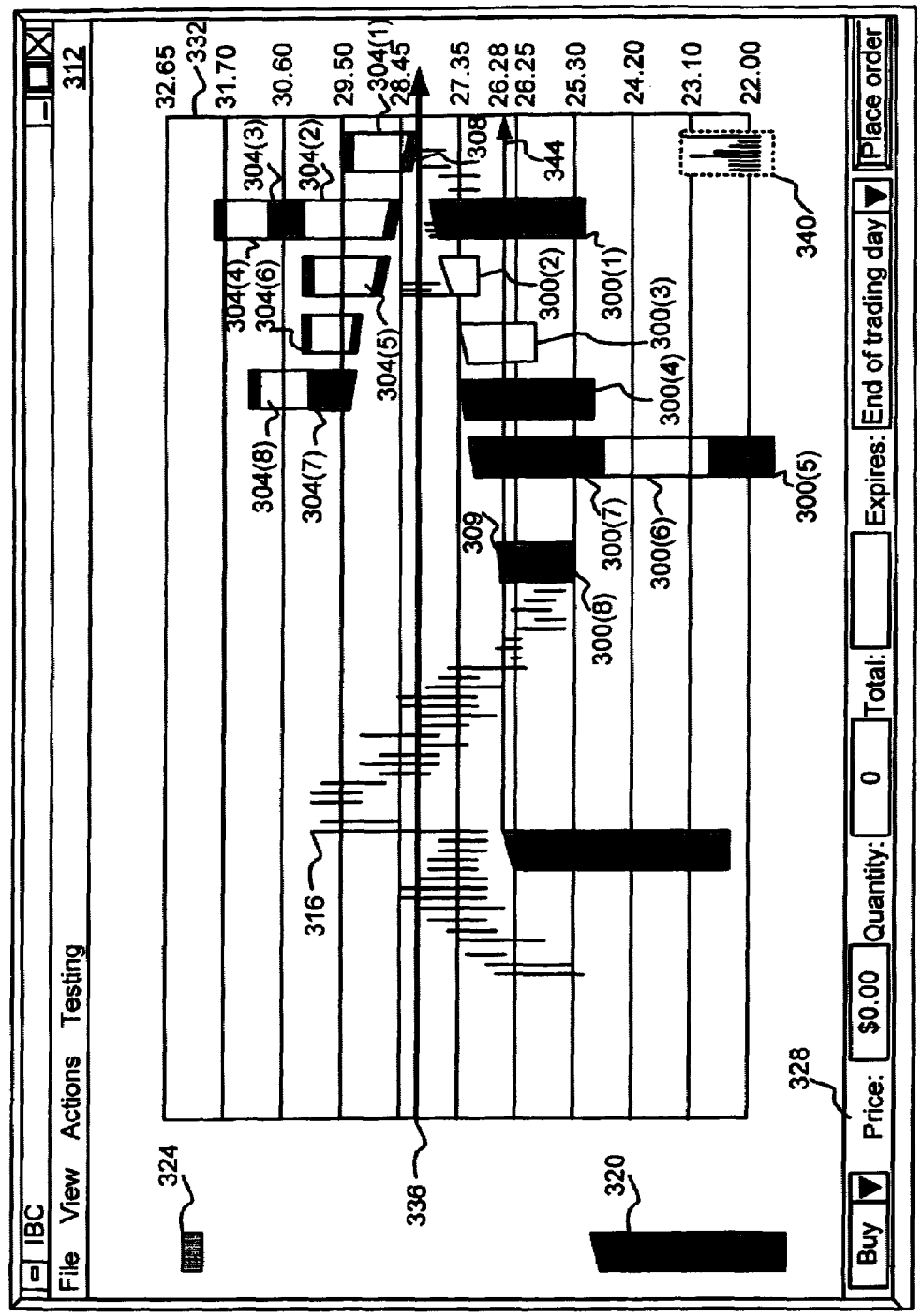
FIGS. 3a–3c are screen shots illustrating an embodiment of a Priority View in accordance with the present invention.

The client terminals 104 provide the interactive link between the traders and the trading pits 220, and display the various user interfaces of the present invention. FIG. 3a illustrates a priority view 312 which is designed to allow traders to intuitively place orders 300, 304 and view markers 336 representing value quantifying metrics, and contextual trend data 316 in accordance with the present invention. In the priority view embodiment, orders 300, 304 are displayed at a location corresponding to their value with respect to the value axis 332. Values may represent price, interest rate, or any other metric by which an item may be valued. For example, offer 304(1) has a value of $28.45, and the lowest point of the bottom edge 308 of the icon 304(1) is aligned with the value 28.45 on the value axis 332. In this embodiment, the top edges 309 of the bids and bottom edges 308 of the offer icons are angled. The rightmost bid is the bid having the highest value, and the rightmost offer is the offer having the lowest value. This allows the edges 308, 309 of the icons 300, 304 to form a triangle which points to the separation in value between the last lowest offer and the last highest bid. The quantity of each order is represented by a size of the icon such as its length or height. Icons having a larger size represent orders having a greater quantity. The specific quantity and other information of an order displayed on the screen may be known by selecting that order, which invokes a pop-up window to display the precise value and quantity of the selected order. In an alternate embodiment, the specific order information is displayed in the order task bar 328, in response to a trader selecting a bid or offer icon provided the order was submitted by the trader selecting the order. Alternatively, if space permits, the quantity and value may displayed in the icon itself.

If there are several orders with equal value, the orders are stacked or placed adjacent to each other responsive to the time at which the order was placed. For example, bids 300(5), 300(6), 300(7) have equal values at $29.50. Therefore, all three bid icons 300 are vertically stacked. A preferred method of stacking places the oldest orders closest to the horizontal space which naturally occurs and separates the bids and the offers. The horizontal separation between the bids and the offers occurs naturally because all of the bids displayed are always at a lower value then the displayed offers. If a bid is placed at a value equal to or exceeding an offer value, a transaction will be made immediately and the icons removed. For example, in the stack containing orders 300(7), 300(6), and 300(5) in FIG. 3*a*, the first and therefore the oldest bid in time was 300(7), and is placed at the top of the stack, closest to the horizontal separation between the displayed bids and offers. The other two stacked bids 300(6), 300(5) are positioned below the oldest bid 300(7), corresponding to the time at which they were submitted, and sorted in order of oldest to newest. In the stack containing offers 304(2), 304(3), and 304(4), the oldest offer 304(2) is positioned on the bottom of the stack closest to the horizontal separation, and the newest offer 304(4) is positioned on the top of the stack. The above method of ordering bids and offers is a preferred method, however other ordering schemes could be used within the scope of the present invention.

Figure 3B:
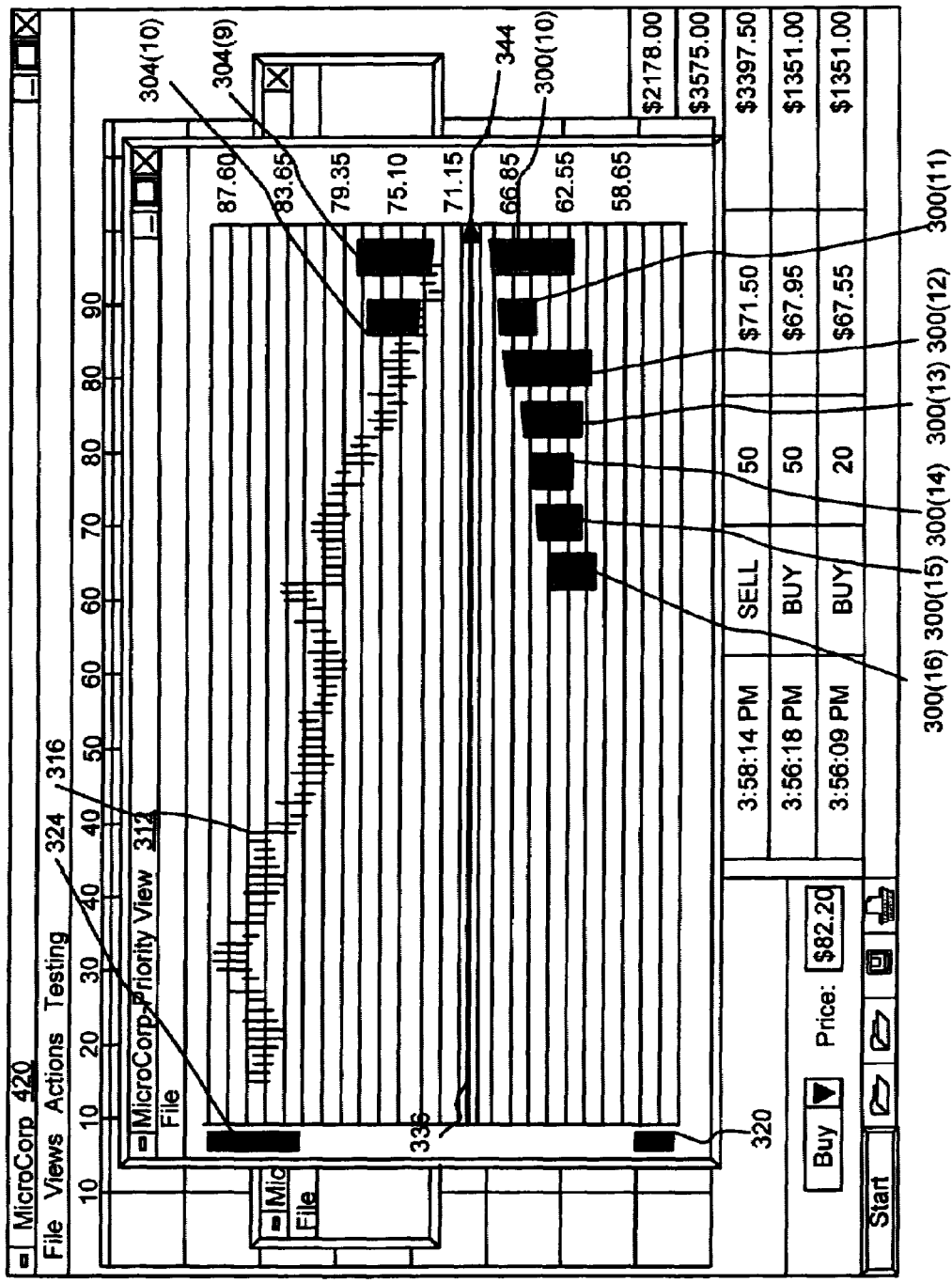

The trader using the client terminal 104 in accordance with the present invention, is shown all of the outstanding orders 300, 304 for the item being traded. This is one significant difference between the present invention and conventional systems because a trader using a system in accordance with the present invention is able to view trends in the bids and offers in addition to the buying and selling of the item being traded. For example, in FIG. 3*a*, a trader can quickly analyze the outstanding orders 300, 304, and determine that there are an almost equal number of bids 300(8) as offers 304(8). Thus, the trader may infer that the market is stable, and the value for the item will not be dramatically driven up or down in the near future. Accordingly, the trader may decide to take no action. However, as shown in FIG. 3*b*, if demand builds through an increased number of bids being made, as shown by the display of an increased number of bid icons 300, or bids are being made for large quantities, as shown by the display of bid icons 300 having a greater size, and if supply recedes as indicated by the display of a reduced number of offers icons 304, the trader can anticipate that the value for the item will increase. Consequently, the trader will place bids for the currently low valued offers 304. Thus, by viewing all outstanding offer icons 304 and bid icons 300 as they are made on an item, the trader can anticipate the market and quickly adjust his or her trading plans to take advantage of the information. In contrast, in conventional systems, the trader only knows the last highest bid and the last lowest offer. In the example of FIG. 3*a*, the trader would only know the existence of bid 300(91) and offer 304(1). Only the market maker would know of the existence of the other bids and offers. Individual traders would therefore be unaware of trends in bidding, and experience greater difficulty in anticipating the market. Thus by viewing all outstanding offer icons 304 and bid icons 300 as they are made on an item, the trader can anticipate the market and quickly adjust his or her trading plans to take advantage of the information. In contrast, in conventional systems, the trader only knows the last highest bid and the last highest offer. In the example of FIG. 3*a*, the trader would only know the existence of bid 300(9) and offer 304(1). Only the market maker would know of the existence of the other bids and offers. Individual traders would therefore be unaware of trends in bidding, and experience greater difficulty in anticipating the market.

The trader can also view the gap between offer icons 304 and bid icons 300 to determine at what value sales may be made and for what quantity. In the example of FIG. 3*a*, the trader can determine that there are several bids 300(5), 300(6), 300(7), at a value slightly less than $27.35. Therefore, if the trader has a number of items to sell, the trader can make offers at that value and be assured of a sale of all of his or her items. However, if this value is too low, the trader can choose to keep all of his items until the value of the item has risen, which would be reflected in the display of additional bid icons at a higher value position in the screen. In contrast, if a trader was using a conventional system, the trader would have to offer his items incrementally, without knowing in advance when sales are likely to be made.

The value axis 332 indicates the value at which an item is being traded. This value may represent different qualitative measures for an item, such as the raw price for the item; for bonds, the value could be the cost for the bond or the implied interest rate for the bond, or the value be used as a measure for an implied volatility of the item, for example, a generic measurement of the relative expense of an option. Each trader can use their own value scale. For example, one trader may use a bond cost as an axis of values and another may use the implied interest rate of the bond. Regardless of a trader's choice of value, the different orders are displayed on the trader's screen in terms of the value the trader is chosen. Additionally, the value scales are completely customizable. For example, a gold arbitrageur could create a scale that measures the difference between the futures price of the metal less the spot cash price of the metal. The arbitrageur could then apply the cost of carry, including insurance and storage, to the future/cash price difference to generate an implied interest rate for the gold. Thus, the value axis for the arbitrageur would be an interest rate. In another example a trader who is interested in trading soybean oil could buy and sell soybeans, but, by using a value axis which accounts for the current cost of crushing soybeans, storage of soybeans, transport, etc, can be actually trading in soybean oil. Thus different traders in the same trading pit 220 would see the same bid and offers but organized with respect to their own specific value axis. Thus, the present invention provides enormous flexibility in constructing a view of an item's value which is directly representative of the trader's own interest in the item.

The priority view 312 offers several other advantages to a trader. The offers 304 and the bids 300 are displayed in different colors, shapes, textures or sizes, or other distinguishing visual characteristics, to allow the trader to quickly ascertain the current state of the market for this item. Additionally, orders made by the trader are displayed having a different visual characteristic than the visual characteristic used to display orders of other traders. This allows the trader to easily distinguish between their own orders and the orders of other traders. For example, in FIG. 3a, the trader is able to immediately determine that offers 304(3) and 304(7) are the trader's own offers 304, and therefore should be discounted from any market analysis. In FIG. 3a, the trader can also quickly determine that the trader himself is the trader with the most bids 300 in place, which suggests to the trader that the value for the item may be driven down if the trader removes his bids 300 from the pit 220.

Orders can be placed by a trader using the user interface of the present invention in variety of ways. In one embodiment, as shown in FIG. 3a, the trader can directly submit an order by using the order task bar 328. The options to specify value and quantity of either a bid or offer, and the expiration period are provided. After the information is entered, the trader selects Place Order, and the order is submitted to the transaction server 200 for the pit 220, and an offer or bid icon 304, 300 is generated and displayed at the desired location at the desired size. The order information is communicated to the transaction server 200 and from there to the other client terminals, so that the new bid/offer appears in the displays of all other traders in this same pit. In a preferred embodiment, the trader submits an order by simply selecting either an offer token 324 or bid token 320 using a pointing device. After being selected, the trader adjusts the size of the offer or bid token 324, 320 until the size of the token matches the desired quantity of the order. Preferably, a pop-up window or other screen indicator is displayed to show in numerical terms the quantity of the current size of the token, to ease the process of creating a properly sized order token. Next, the token is dragged to a location on the screen which corresponds to the desired value of the order. Again, a screen indicator displays the current value for the token at its current location as it is being dragged to allow precise placement of the token at the desired value.

Figure 3C:
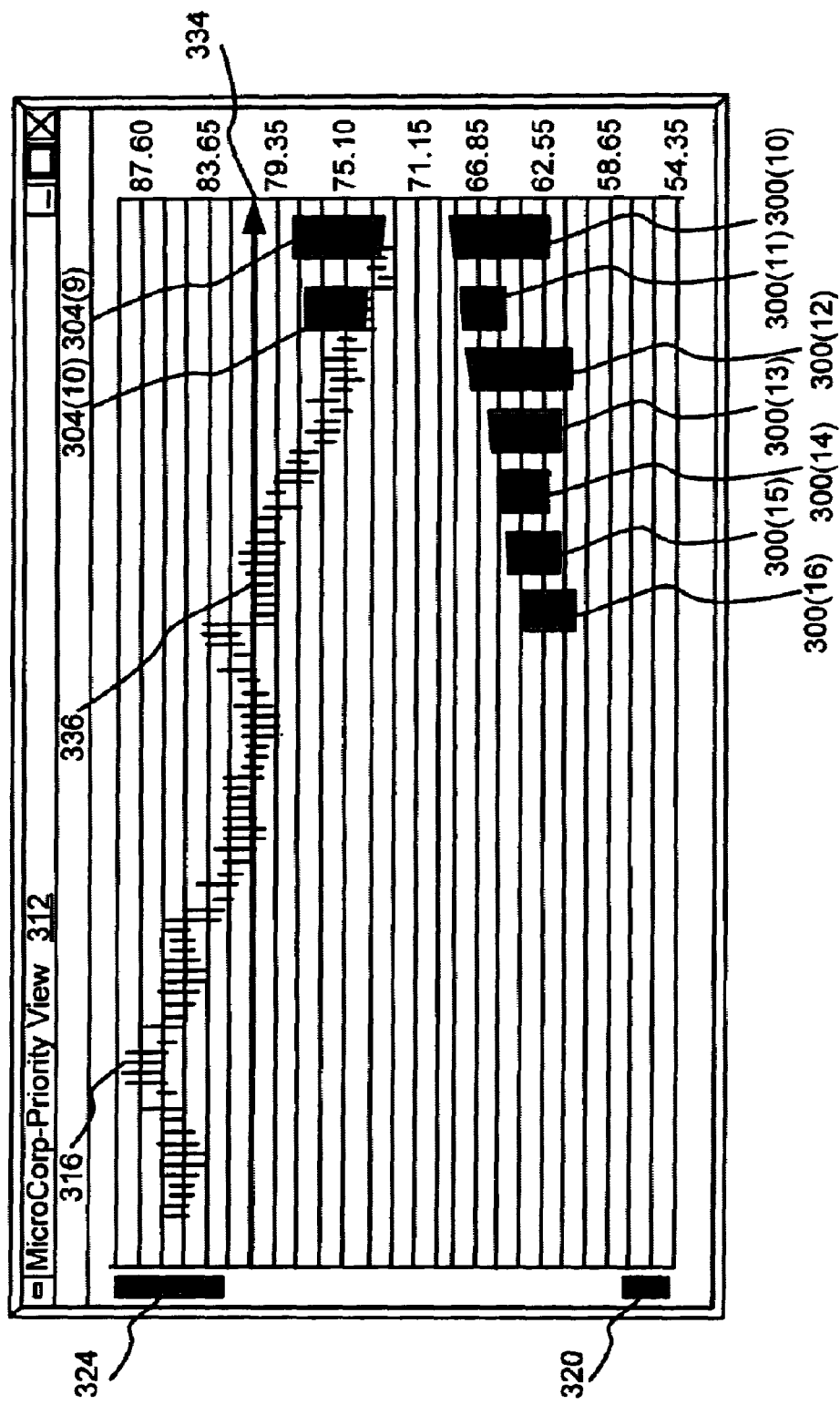
Figure 3D:
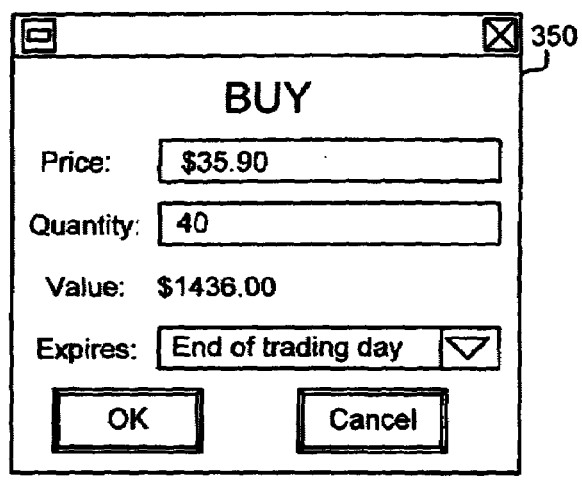
FIG. 3d illustrates a buy order pop-up window.
Figure 3E:
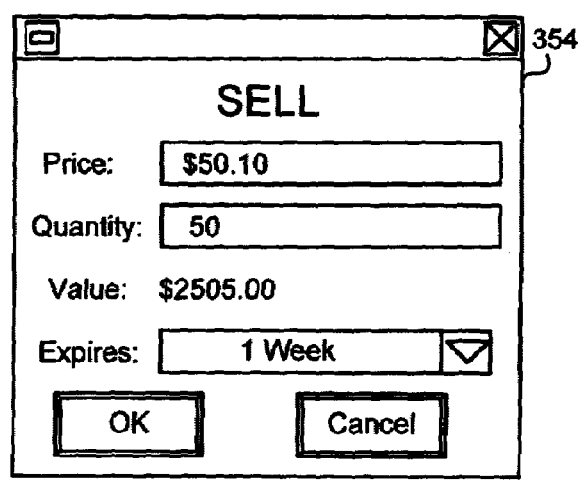
FIG. 3e illustrates a sell order pop-up window.

In the embodiment of FIG. 3a, a value marker 344 follows bid token 320 as it is moved to a location in the display. The value marker 344 indicates the value of the new order as the order is being placed. This allows for the trader to easily and precisely move the token 320, 324 to the desired value. After reaching the desired value, the trader releases the pointing device button and a Buy pop-up window 350, as shown in FIG. 3d, is displayed with the bid order information. The Buy pop-up window 350 allows the trader to modify the order information (value, quantity, expiration), cancel the order or submit the order with the presently displayed information. If the order is to sell an item, a Sell pop-up window 354 is displayed, as shown in FIG. 3e. After the order is submitted to the transaction server, it will be displayed on the screens of all traders in this trading pit connected to the transaction server 200.

An additional feature of the user interface of the present invention is the provision of contextual data. Contextual data comprises historical trading data of the item, historical or current trading data of other items, historical or current trading data of an average of items. For example, the trader may wish to have the Dow Jones Average™ displayed on the screen, and updated in realtime. Viewing contextual data along with the outstanding offers and bids allows the trader to better anticipate the market. For example, if the Dow Jones™ average is used as the contextual data, and is falling sharply, the trader may decide to begin selling his items even though the value of the item in the pit 220 has been stable. This allows the trader to anticipate where the market is headed. Any type of data useful to the trader can be displayed as contextual data. The contextual data 316 is preferably displayed as a historical chart 316 along a vertical axis of values and against a horizontal axis of time. The historical chart 316 can be displayed against any time period, for example, hours, minutes, etc. The historical chart 316 is updated periodically as the data for the item is updated. If the historical chart 316 includes the current item, as shown in FIG. 3a, bar lines are displayed in the data to indicate the high and low values of the item for that time period. A volume graph 340 is displayed at the bottom edge of graph. The volume graph illustrates the volume of transactions in the pit 220, and gives additional information to the trader regarding the state of the market for the item.

Yet another feature of the user interface of the present invention is the display of a marker 336. The marker 336 is representative of a value quantifying metric specified by the trader. The metric determines a current action value for the item which identifies the value at which the trader should act if the value of the item rises above the action value or falls beneath the action value. For example, in FIG. 3b, the value quantifying metric generates an action value of $68.57. The marker 336 is displayed at this value to indicate to the trader the location of the action value in relation to the current bids 300 and offers 304. In the example of FIG. 3b, the marker is displayed as an action line 336. As can be seen, the outstanding bids are below the action line 336 and the current offers are above the action line 336. This indicates to the trader that no action should be taken.

The value quantifying metric can be an algorithm or formula based upon factors the trader believes are important in ascertaining the true worth of an item. This metric can be set to reflect value-to-earnings ratio, volatility, volume of orders, percent gain, or any simple or complex design. The trader can input a custom metric or can select a metric from a predesignated list of metrics. Metrics may also be purchased from $3^{rd}$ parties and incorporated into the client terminal 104. This allows new metrics to be added at any time. The action value displayed by metrics are dynamically determined either by the client terminal 104 or the server 200, and updated whenever new data is received regarding a component of the metric. Thus, the trader is given the latest information to update the trader's action line 336, allowing the trader to make current, informed decisions regarding possible orders. For example, in FIG. 3c, the metric has been updated from the time of FIG. 3b. The action line 336 has moved corresponding to the new action value of $80.21. As can be seen, displaying the updated action line 336 allows the trader to immediately determine that the outstanding offers are now below his action line 336, and therefore that these offers should be purchased despite the fact that the offers themselves remained at the same value from the time of FIG. 3b to the time of FIG. 3c.

As discussed above, a trader may be connected to several trading pits 220 at once. If a trader has multiple connections, the trader can view the different pits 220 simultaneously, or if the trader wishes to concentrate on a single item, the trader can have only one pit 220 displayed. Additionally, the trader can disable the different options for a view to suit the trader's preferences, and maximize visibility for a trader's particular terminal 104.

Figure 4:
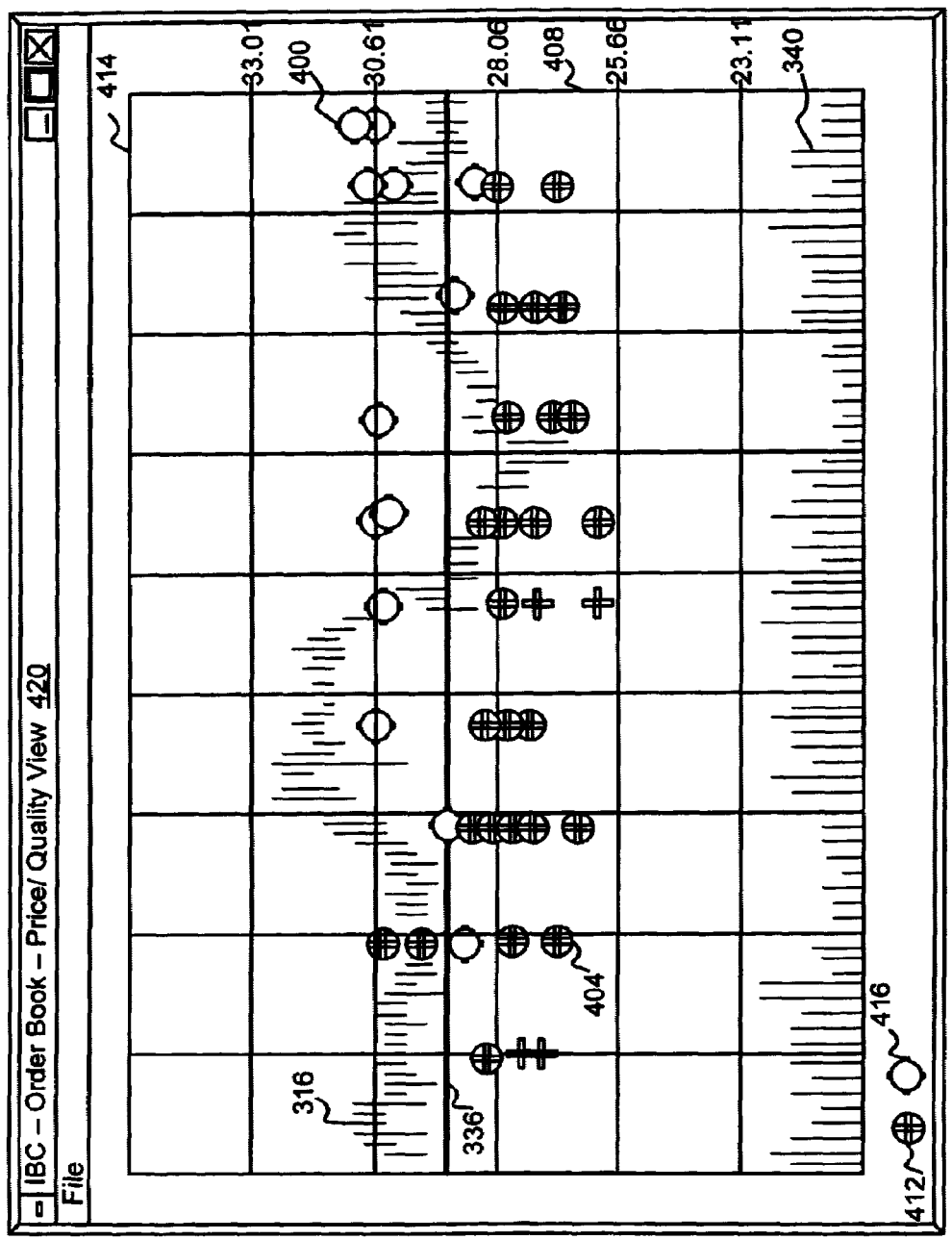
FIG. 4 is a screen shot illustrating an embodiment of a Value/Quantity View in L accordance with the present invention.

FIG. 4 illustrates an alternate view of the user interface in accordance with the present invention. The value/quantity view 420 illustrates the market for the item using a first axis of values 408 and a second axis 412 for quantity. Thus, the location of each offer icon 400 and each bid icon 404 represents the value for the offer or bid and the quantity for which the offer or bid is made. Optionally, the action line 336 is also displayed, as well as the contextual data. The alternate view provides a different intuitive perspective on the state of the market. By providing alternate views, as shown in FIG. 3c, the electronic trading system of the present invention allows the different preferences of different traders to be met. Orders in this view are placed by selecting an offer token 416 or a bid token 412 and moving the token to a location which corresponds to the desired quantity and value. If the trader wishes to purchase immediately, the trader can simply drag a bid token 412 to the location directly over any offer token, and a window pops up displaying a bid order with value and quantity equal to that of the offer token. If the trader wishes to sell immediately, the trader can simply drag an offer token 416 to the location directly over any bid token, and a window pops up displaying an offer order with value and quantity equal to that of the bid token. The trader can then execute the transaction.

Figure 5:
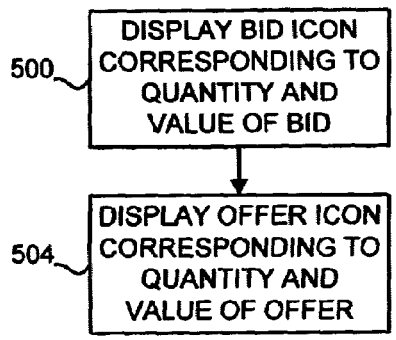
FIG. 5 is a flow chart illustrating a preferred embodiment of a method of displaying bid and offer icons in accordance with the present invention.

FIG. 5 is a flow chart illustrating a preferred embodiment of the user interface in accordance with the present invention. The client terminal 104, through data received from the transaction server 200, displays 500 at least one outstanding bid icon corresponding to a quantity and value of the bid. The client terminal 104 also displays 504 at least one outstanding offer icon corresponding to a quantity and value of an offer. Thus, by displaying at least one outstanding bid and offer icon, the "book" is opened and traders viewing the client terminal can readily spot trends in supply and demand for an item and quickly anticipate the market.

Figure 6:
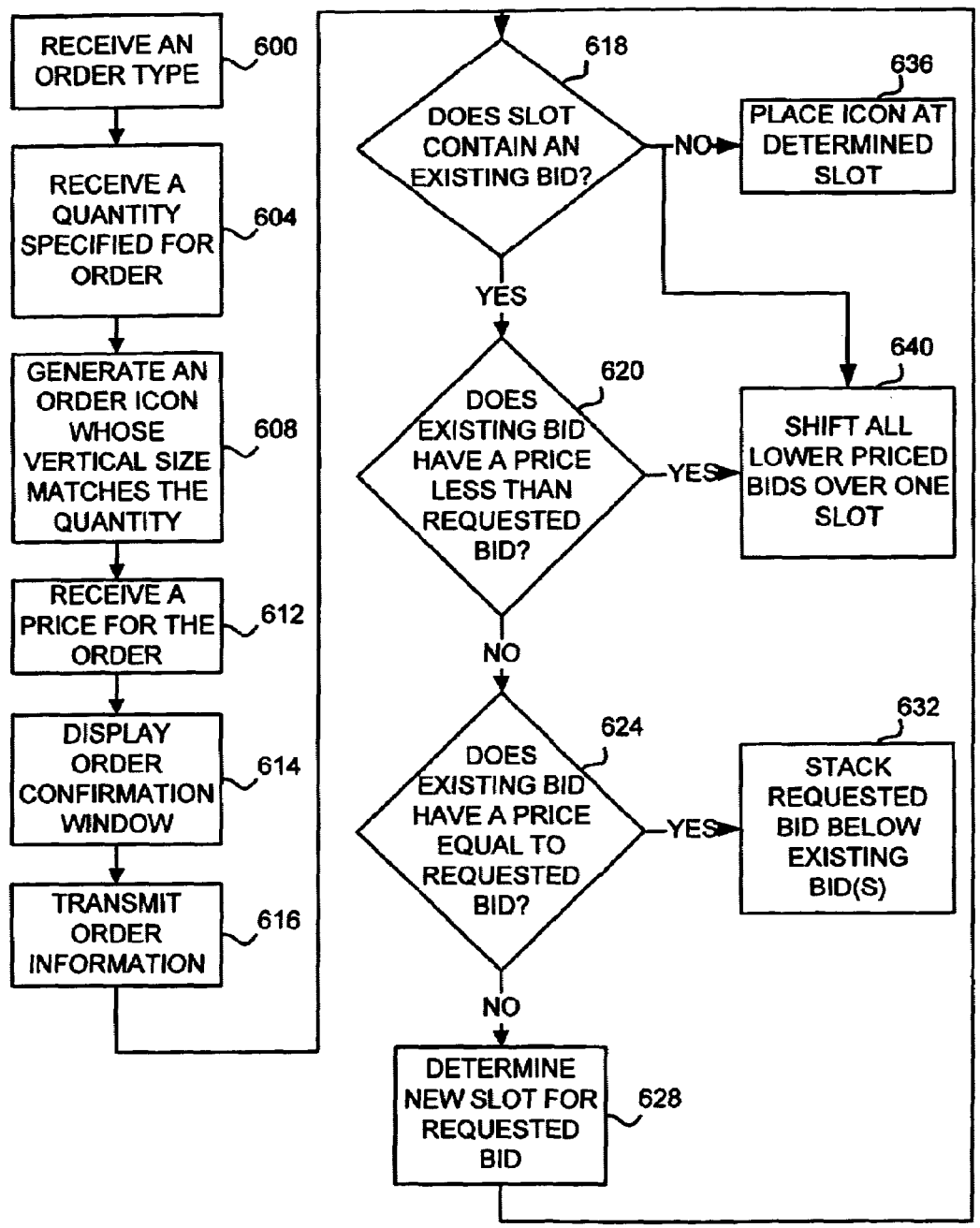
FIG. 6 is a flow chart illustrating a preferred embodiment of a method of generating a bid order icon in accordance with the present invention.

FIG. 6 illustrates an embodiment of a method of generating an order icon in accordance with the priority view 312 of the present invention. First, the client terminal 104 receives 600 the order type. The order can be either a bid or an offer. The trader specifies the type by selecting an offer or bid token to place the order, or by manually indicating the order type on the task bar. Second, the client terminal 104 receives 604 a quantity specified for the order. The quantity, as described above, is specified by the trader either by entering the number directly into the order task bar or by adjusting the size of the order token. In an embodiment where the order information is entered into the taskbar, an order icon will be generated 608 whose vertical size matches the quantity specified after the order has been processed by the server 200. The client terminal 104 then receives 612 a value for the order. Again, the trader can specify the value by entering the information into the taskbar or can drag the order token to the location corresponding to the value. Finally, the client terminal 104 displays 614 an order confirmation window displaying the value, quantity, and expiration information. The trader can modify the order in this window and then must either cancel the order by closing the window or pressing the cancel button or submit it by pressing the OK button. The client terminal 104 which receives the value and quantity and order type information transmits 616 the information to the server 200. The server 200 then processes the order information, and updates the order table.

Once the server 200 transmits updated order information to a client terminal 104, the client terminal 104, in the priority view, determines 618 whether a slot is open adjacent an existing order which has a lower value, if the order is a bid, or a higher value, if the order is an offer. In the priority view 312, the horizontal axis is divided into slots, each slot having a width equal to an order icon 300, 304 and each slot separated by a standard set-off unit. Incoming orders are sorted by the value of the order. For offers, the offers with the lowest values are positioned closest to the axis of values 332, and for bids, the bids with the highest values are positioned closest to the axis of values 332. When a new order is received, the client terminal 104 re-sorts the outstanding orders and places the order icons 300, 304 in the appropriate positions. If a new order is equal to an existing order of the same type, the order is stacked onto the existing order. FIG. 6 illustrates a more detailed methodology of the sorting mechanism, using the example of placing a new bid. However, the methodology is equally applicable to placing a new offer.

A new bid is designated for the slot adjacent an existing bid which has the least value of the set of existing bids having values greater than the value of the new bid. The client terminal 104 determines 618 whether this determined slot has an existing bid within it. If it does not, the icon is placed 636 at the determined slot. If the slot does contain an existing bid, the client terminal 104 determines 620 whether the existing bid has a value less than the requested bid. All existing bids that have values less than the requested bid are moved 640 to the adjacent slot positioned away from the axis of values 332. In the example of FIG. 3a, the adjacent slot would be a slot positioned to the left. All other bids having values less than the requested bid are shifted 640 correspondingly. If the client terminal determines 624 that the existing bid has a value equal to the existing bid, the requested bid is stacked 632 below the existing bid or bids, away from the horizontal separation between bids and offers as described above. If the client terminal 104 determines 628 that the existing bid is greater than the requested bid, a new slot is determined 628 for the requested bid, and the process is repeated.

Figure 7:
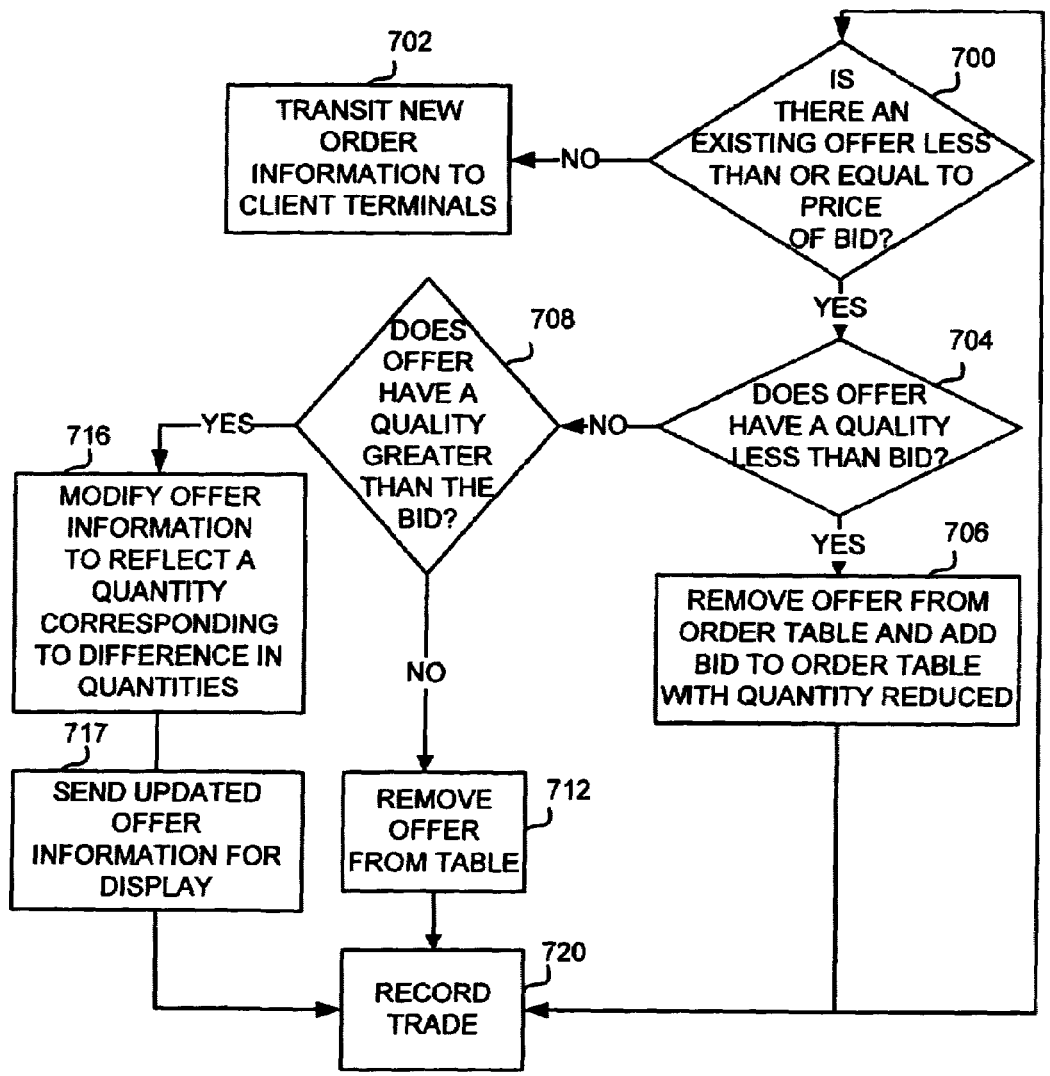
FIG. 7 is a flow chart illustrating a preferred embodiment of a method of generating a offer order icon in accordance with the present invention.

As shown in FIG. 7, upon receiving new bid information, the transaction server 200 determines 700 whether there is an existing offer in the order table having a value less than or equal to the requested bid. If there is not, the new bid is added to the table, and the information regarding the new bid is sent 702 to the client terminals 104 for display. If there is an existing offer whose value is less than or equal to the requested bid, i.e., if the new bid is the highest value bid outstanding, the server 200 determines 704 whether the existing offer has a quantity which is less than the quantity represented by the bid. If the offer does have a quantity less than the bid, the server removes 706 the offer from the order table and adds a new bid to the order table with the quantity reduced by the quantity of the offer removed.

The server 200 records 720 a trade between the trader submitting the new bid and the trader submitting the removed offer, at a value equal to the offer value and a quantity equal to the offer quantity. All of the outstanding client terminals 104 are sent the information regarding the trade. The client terminals 104 then remove the existing offer icon and add a bid icon which has a size corresponding to the difference in quantities between the existing offer icon and the requested bid icon. The transaction server 200 determines 700 again whether there is another existing offer in the order table having a value less than or equal to the requested bid to determine if another transaction can be made with the quantity remaining in the bid.

The server 200 also determines 708 whether the offer has a quantity greater than the quantity of the requested bid. If it does, the quantity of the offer is reduced 716 by the quantity of the bid, and the updated offer information is sent 717 to the client terminals 104 for display. A trade is recorded 720 between the trader submitting the new bid and the trader who submitted the offer at a value equal to the offer value and a quantity equal to the bid quantity. All of the outstanding client terminals 104 are sent the information regarding the trade and update the user interface displays accordingly.

If the quantities of the bid and offer are equal, the offer is removed 712 from the table and the transaction is complete. A trade is recorded 720 between the trader submitting the new bid and the trader who submitted the offer at a value equal to the offer value and a quantity equal to the bid quantity. All of the outstanding client terminals 104 are sent the information regarding the trade, and update the user interface displays accordingly.

Figure 8:
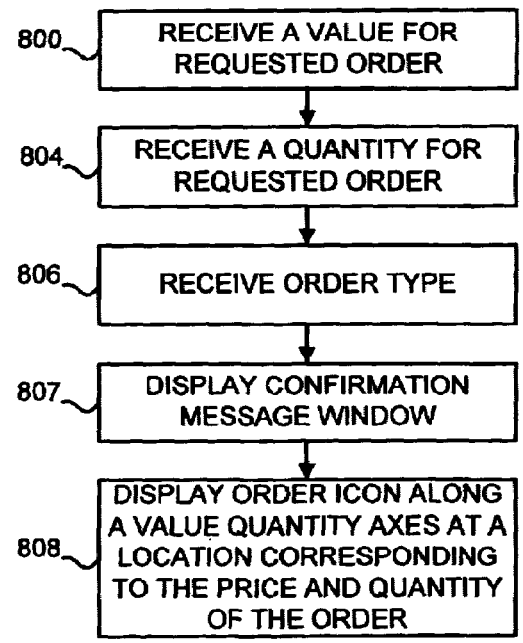
FIG. 8 is a flow chart illustrating an alternate embodiment of generating an order icon.

As shown in FIG. 8, in the value/quantity view, the client terminal 104 receives 800 a value, receives 804 a quantity, and receives 806 an order type for a new order. A confirmation window is displayed 807, and, upon confirmation of the order, the order information is transmitted to the server 200. Again, this may occur responsive to the trader entering in the information directly or dragging an order token to the proper location and after confirming the order. The server 200 receives the order information, updates the order table, and sends the updated information to the client terminals 104. The client terminals 104 display a new order icon at a location corresponding to the value and quantity of the order with respect to the axis of quantities and axis of values. If the new order is an offer, and there is an existing bid for a value higher than or equal to the value of the offer, a transaction is completed, and a new offer or a modified bid token is displayed responsive to the quantities that the original offer and bid icons represented.

Figure 9:
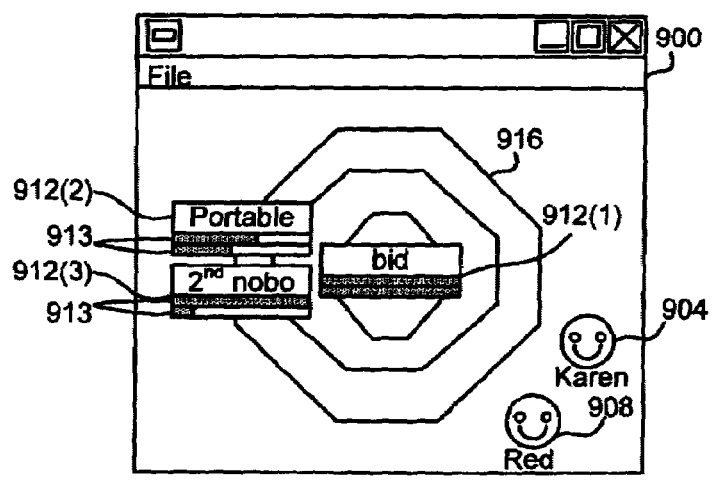
FIG. 9 is a screen shot illustrating a Pit Panel view in accordance with the present invention.

FIG. 9 illustrates a trading pit view 900 called the pit panel view 900, in accordance with the present invention. The pit panel view 900 provides a visual interface to other members of the pit 220. All users who are currently registered to the pit 220 are displayed in the pit panel 900. This is critical information to a trader regarding the activity of the pit 220. If the pit 220 is crowded, the trader can expect volatility in trading. If the pit 220 is empty, the trader can expect light trading and relatively stable values for the item.

The pit panel 900 displays trader icons 912, observer icons 904, and floor broker icons 908. Observers are users who are registered to the pit 220 but who are not actively trading and floor brokers are individuals who have expertise on a pit's item and traders, and who assist traders in executing unusual trades, negotiating a deal with multiple traders, or providing history and information on traders to others. As the observers do not trade for themselves, their icons 904 are placed on the outside of the pit icon 916. Floor brokers who do not trade also have their icons 908 placed on the outside of the pit icon 916.

The trader icons 912 are displayed on the pit icon 916. The pit icon 916 is preferably displayed as a series of concentric polygons, where each polygon represents an activity level or levels. Traders who are more active are placed closer to the center of the pit icon 916. The most active trader, in the example of FIG. 9, trader 912(1), is placed in the center of the pit icon 916. In a preferred embodiment, each polygon represents a range of activity levels. For example, the innermost polygon contains the traders with the second through ninth highest activity levels. The next polygon contains the traders having the tenth through twenty-sixth highest activity levels, and so forth. By grouping traders into activity ranges, and thus shifting a trader's icon out of a polygon only in response to the trader's activity level shifting out of the range represented by the polygon, icon changes and consequent flicker in the display of the pit icon 916 are minimized. However, a trader is able to easily ascertain who the active traders in a pit 220 are and how active the traders are by noting the relative locations of the trader icons 912 in the pit icon 916.

Figure 11:
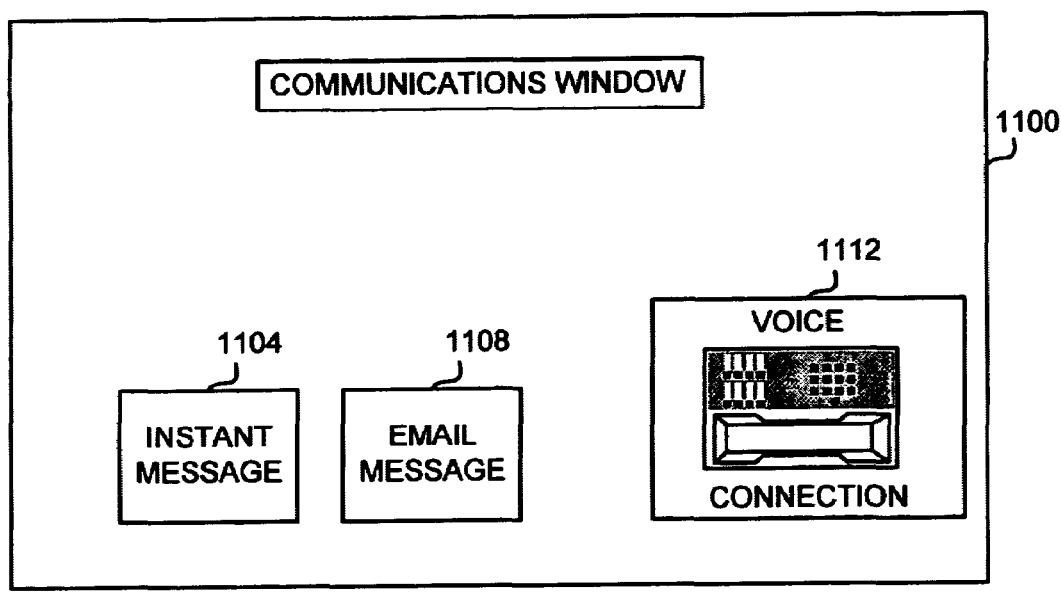
FIG. 11 is a screen shot illustrating a communication window in accordance with the present invention.

Each trader icon 912 has order indicators 913 to show the quantity of orders a trader has outstanding. Preferably, there are separate indicators 913 for bids and offers, each showing the volume of outstanding bids or offers the trader currently has placed. Other order indicators 913 may be optionally displayed, for example, indicating the sum of all quantities of orders or the volume of orders entered over a specified period of time. Selecting a trader's icon 912 will also highlight the trader's orders on the priority view, value/quantity view, and other views provided in the system that display orders and which can all be displayed concurrently. Double clicking on a trader icon 912 generates a communication window as shown in FIG. 11 which allows the trader to send an email message 1108, send an instant message 1104 as part of a text chat session, communicate by voice over the network connection 1112, or set up a later telephone call or other optional communication to the selected other trader. Thus, the pit panel 900 provides a sense of community in the pit 220 by visual representing useful information, and provides additional information to the trader which the trader can use in anticipating the market.

Figure 10:
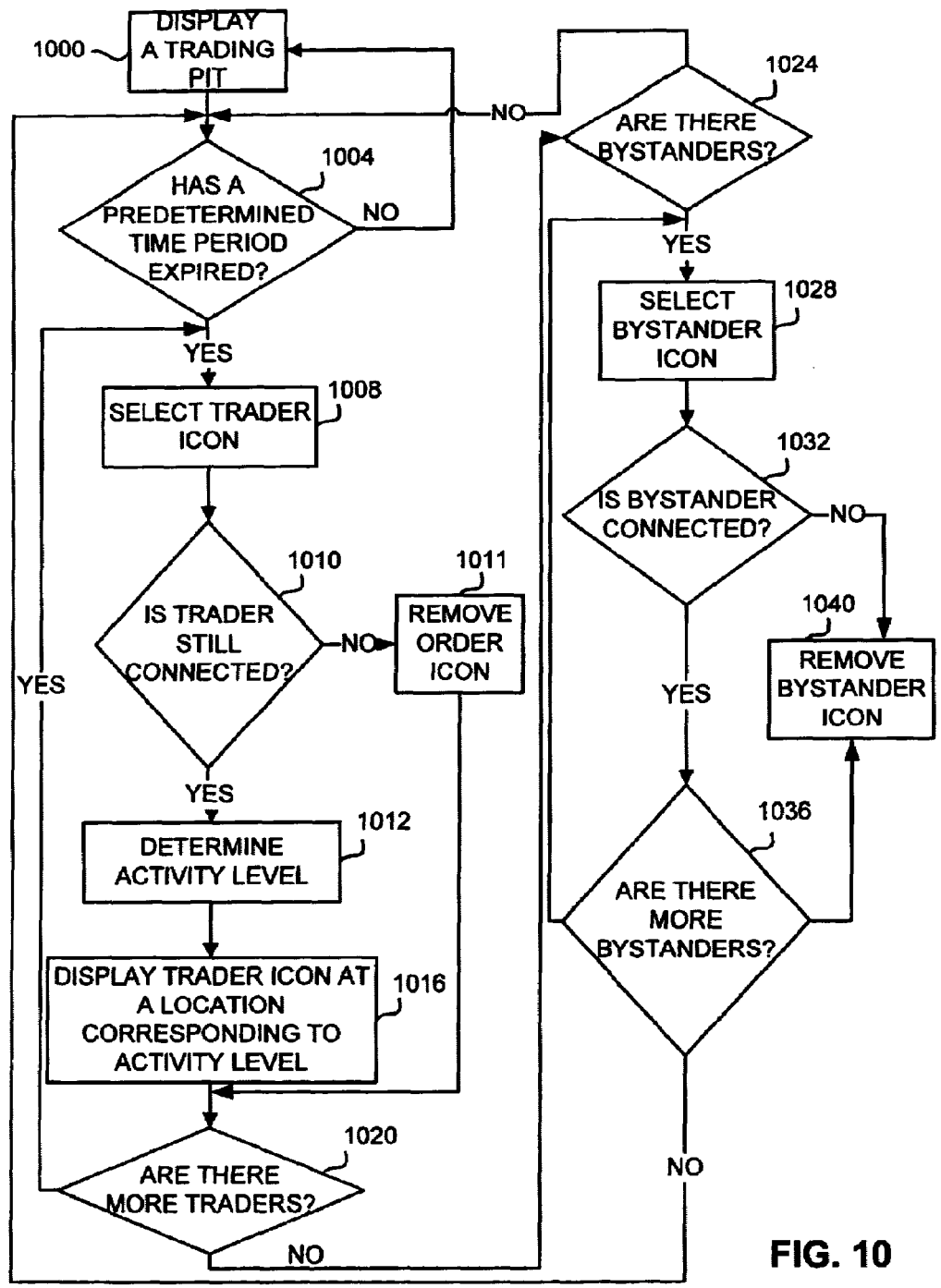
FIG. 10 is a flow chart illustrating a preferred embodiment of generating and placing a trader icon in accordance with the present invention.

FIG. 10 is a flow chart illustrating a preferred embodiment of generating and placing a trader icon in accordance with the present invention. First, a trading pit icon 916 is displayed 1000. Next, the client 104 determines 1004 whether a predetermined period of time has passed. The pit panel data is updated periodically, and the client 104 waits for that amount of time before re-generating the display with the new data. If the server 200 determines 1004 that the predetermined period has expired, a first trader icon is selected 1008. The client 104 determines 1010 whether the trader is still connected to the server 200 from the data provided by the server 200. If the trader is not, the trader icon 912 for the trader is removed 1011, and the client 104 determines 1020 whether there are more traders. If the trader is still connected, an activity level is determined 1012 for the trader. Activity levels are determined as a combination of the volume of outstanding orders, the value of outstanding orders, recent activity, or other measures which determine how active a trader has been. Once the activity level has been determined, the client 104 displays 1016 the icon 912 for the trader at the location corresponding to the activity level. In an embodiment where order indicators 913 are displayed, the order indicators 913 are updated to include the latest order data. In the preferred embodiment, as discussed above, the pit icon 916 is comprised of concentric polygons or rings, the traders are ordered by activity levels, and each polygon represents a range of activity level orders. After the activity level of a trader is determined, the traders are reordered responsive to their activity levels, and the trader icon 912 for each the trader is placed in the polygon designated for the order of the trader. The client 104 determines 1020 if there are more traders. If there are not, the client 104 determines 1024 if there are bystanders and, if there are, selects 1028 the first bystander icon 904, 908 and determines 1032 whether the bystander is connected using data that is provided by the server 200. If the bystander is not connected, the bystander icon is removed 1040. If the bystander is connected, the client 104 determines 1036 whether there are more bystanders. If there are not, the client 104 returns to the step of determining 1004 whether a predetermined time period has ended, as the pit panel 900 view has been updated to reflect the current users and their current activity levels.

Figure 12:
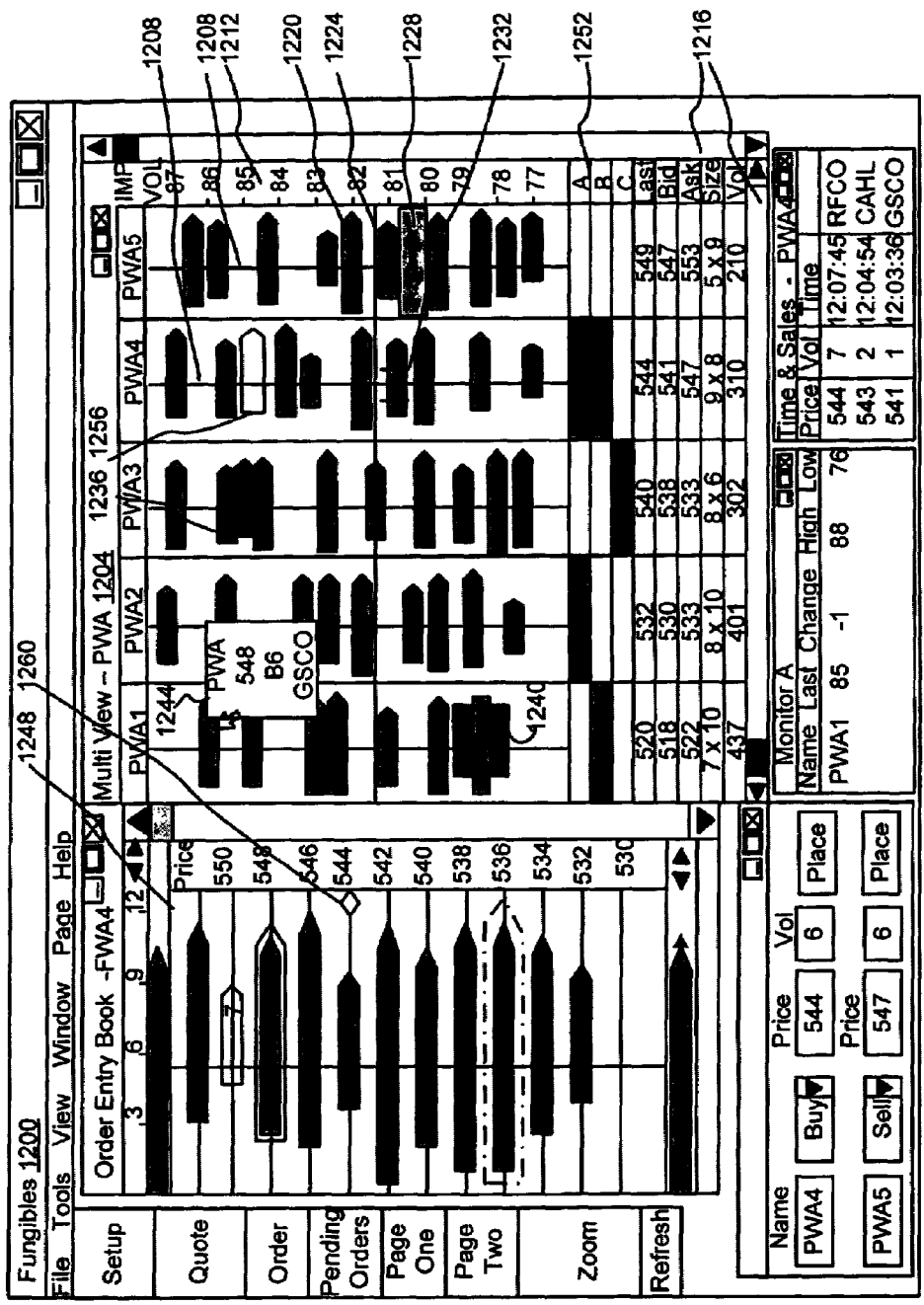
FIG. 12 is a screen shot illustrating a preferred embodiment of a user interface for trading semi-fungible goods.
Figure 13:
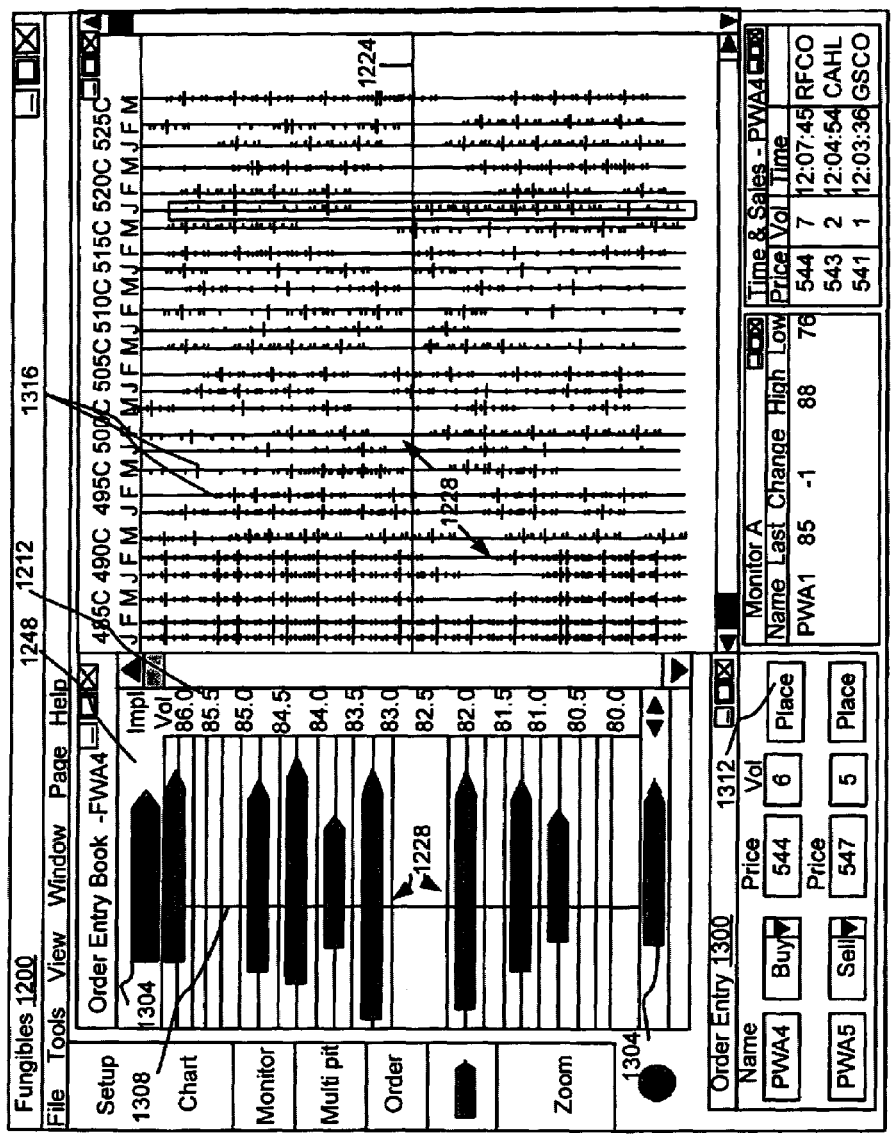
FIG. 13 is a screen shot illustrating an alternate embodiment of a user interface for trading semi-fungible goods.

FIG. 12 is an embodiment of a graphical user interface 1200 for semi-fungible trading. In one embodiment, the interface 1200 displays multiple windows designed for the Microsoft Corp. Windows™ operating system, although any operating system can be used in accordance with the present invention. A semi-fungible good window 1204 displays a plurality of book axes 1208. A book axis 1208 is an axis that displays orders for a semi-fungible good. An order may be an offer or bid for a semi-fungible good. In addition to straight orders, contingency orders may also be placed having conditions that govern the ultimate disposition of the transaction. In the example of FIG. 12, the interface 1200 displays five book axes 1208 (PWA1–PWA5) in the semi-fungible good window 1204. Although five are displayed, the interface 1200 may display more or fewer book axes 1208 in a single window 1204, as shown in FIG. 13. In the embodiment of FIG. 12, the interface 1200 displays a subset of all book axes 1208 in one window and provides the ability to view additional book axes 1208 through the use of a horizontal and/or vertical scroll bar 1216. The interface 1200 preferably displays a title for the semi-fungible good window 1204 that indicates the class of semi-fungible goods being traded. For example, the goods being traded could be power futures, and therefore the interface 1200 would display the title of the window to indicate that the book axes 1208 being displayed were different power futures. The interface 1200 may generate a title from user input in response to a query for a name, or the interface 1200 may retrieve title information from a previously stored file, or the interface 1200 may generate a title automatically based on the semi-fungible goods selected.

As discussed above, semi-fungible goods are goods that have a value relationship, but each good varies from the other goods based on one or more variables. Typically variables include quantity, quality variations, delivery date, expiration date, delivery points, guarantor, contract variable, length of contract, and the life of the product. This list of possible variables is exemplary and not exhaustive. Examples of semi-fungible goods and associated variables are listed in Table A.

TABLE A

| Semi-Fungible Good | Variables |
| --- | --- |
| Options | strike, exercise rules, time to expiration, and underlying contract |
| Fixed Income Product | yield curve, time to maturity, quality of issuer, name of issuer, interest payments or coupons, or other contractual differences |
| Cash Commodities | delivery points, quality variation of goods, time of delivery, and similar goods that have substitution properties for the users. |
| Futures | time to contract expiration, delivery dates, quality variation of goods, related or similar contracts, and quantity of goods in contract. |

TABLE A-continued

| Semi-Fungible Good | Variables |
| --- | --- |
| Foreign exchange | swaps, cross-currency rates, time periods for delivery, multiple currencies denominated in single currency |
| Transportation | delivery times, cost of handling, and pick up and delivery points |
| Services | quality of service, time of service delivery, and name of service provider |

Thus, options on stocks for company A having a variation in expiration would be semi-fungible goods, for example.

In the embodiment of FIG. 12, the interface 1200 displays orders as order icons 1220. The order icons 1220 represent either a bid or an offer. However, in some embodiments, such as an auction embodiment, only bids or only offers are displayed. In a preferred embodiment, the interface 1200 displays bid icons 1220 in different colors from the offer icons 1220 to allow the trader to easily distinguish between the types of orders. Alternatively, the interface 1200 may display the icons 1220 for bids in a different shape from the icons 1220 for offers, or with some other visually distinguishing characteristic. Additionally, the interface 1200 may display contingency orders with a visually distinguishing characteristic to differentiate the contingency orders from straight orders. Moreover, by user preference, any characteristic of an order can be used to visually differentiate orders. The distinguishing characteristic may be automatically generated by the interface 1200 or selected by the trader. The difference in prices between the bids and offers for a semi-fungible good leads to a natural separation, or spread, between the bids and offers. The interface 1200 preferably displays the spread area 1228 in a color that is different than the bid and offer icon color. In a preferred embodiment, the interface 1200 selects a bright color to highlight the spread area 1228 to the trader, as the different spreads can be the most valuable information conveyed by the interface 1200. Other methods of highlighting the spread may also be used, for example, cross-hatching the area 1228 between the highest bid and lowest offer, or placing a "spread" icon in the area.

The interface 1200 preferably correlates the book axes 1208 to a semi-fungible good value axis 1212. The interface 1200 uses the value axis 1212 to represent the value for each of the orders for all of the book axes 1208. For example, if the interface 1200 uses the value axis 1212 to represent price, then the location of an order icon 1220 relative to the value axis represents the price of the order. Thus, by displaying the orders for different semi-fungible goods on a single screen, a trader can quickly examine the books or markets for semi-fungible goods and make trading decisions quickly and effectively. For example, if the window 1204 represented the entire number of semi-fungible goods being traded, and the value axis 1212 represented price, then the trader can see that the good PWA5 is trading at the lowest price of the 5 different semi-fungible goods and PWA3 is trading at the highest price. The trader can also see that good 5 has a high number of orders of the different semi-fungible goods, which indicates that the market for good 5 is very active. Thus, the present invention provides an easy and efficient method for trading in semi-fungible goods and, for non-traders using the interface 1200 of the present invention, the interface 1200 also serves as a vehicle for displaying significant market information. In a further embodiment, the user interface 1200 communicates the size (i.e. the number of contracts or shares represented) of orders to the traders through a geometric dimension of the order icon 1220. In the embodiment illustrated in FIG. 12, the interface 1200 adjusts the horizontal dimension of the icons 1220 to provide the size information. However, vertical or other geometric dimensions could also be used. In a semi-fungible embodiment, the sizes displayed by the dimensions of the icons 1220 communicates relative size information for each book axis 1208. Thus, if a trader views PWA4, the trader will instantly know that the top offer has the smallest size for that book axis 1208 and the fifth bid from the bottom has the largest size for that book axis 1208. Additionally, the trader can infer information about the relative sizes for all of the offers and all of the bids for a book axis 1208. The trader, looking at the first book axis, PWA1, will know that far more quantities are represented by offers than by bids. However, in the preferred embodiment, the size of an icon 1220 in book axis PWA1 does not relate to the size of an icon 1220 in book axis PWA2. This independence helps enable the interface 1200 display multiple book axes on one screen. If the quantities were absolute instead of being relative across the book axes, then one high quantity order in a single book axis 1208 might dominate the screen, limiting the ability of the interface 1200 to display other book axes 1208.

In one embodiment, the value axis 1212 provides units that correlate the value of different semi-fungible goods. For example, in FIG. 12, the value axis 1212 is in terms of implied volatility. As discussed above, options have several variables which make them semi-fungible instead of fungible goods. However, one unifying characteristic of options is that their value can be expressed in implied volatility. If company A has an option that has a strike price of $150.00 and the stock is currently trading at $100.00 per share, the volatility of the option will provide a basis for determining the value of that option. Volatility has a positive correlation to the value of the option. That is, the higher the volatility of an option, the higher its value will be, with all other factors being equal. Conversely, the lower the volatility, the lower the value of the option.

In the Black-Scholes model, for a stock without dividends, interest rates, strike price, stock price, and time to expiration provide four of five factors in assessing the value of an option. The other factor is implied volatility. Thus, if the first four factors are known, the other factor, implied volatility is determined to assess the value of an option. In the example of FIG. 12, the different book axes 1208 display orders for different options for the same company. The orders are displayed on a scale relating to their implied volatility. Thus, the options in the PWA3 column are trading with the highest implied volatility and the options in PWA1 and PWA5 are trading at the lowest implied volatility. Therefore, regardless of strike price, expiration date, or other factors, the options in PWA3 are the most theoretically overvalued relative to the other options series represented. In accordance with the present invention, the interface 1200 enables traders to input an algorithm such as the Cox-Ross model or Black-Scholes model to generate a value axis 1212 that relates the value of semi-fungible goods to each other. Other algorithms may be displayed by the interface 1200 for selection by the user or the user may enter their own custom algorithms for relating the different semi-fungible goods. For example, in one embodiment, a semifungible good may be SuperBowl™ seats, and the value of a seat displayed by the value axis 1212 is determined relative to the distance of the seat from the 50 yard line and the vertical distance of the seat in terms of rows, from the field of play. Thus, the value axis 1212 of the present invention provides information regarding the value of the seat beyond the asking price. Therefore, as can be seen in FIG. 12, a trader can easily trade semi-fungible goods using this embodiment of the present invention by viewing all or a subset of all of the semi-fungible goods in one display, and then viewing the semi-fungible goods in terms of their relative value, using a trader-defined algorithm to define that value. Thus, the present invention provides an entirely new method for trading in semi-fungible goods not available to traders using conventional systems.

In a further embodiment, the interface 1200 displays an action line 1224 that indicates a value which a trader would like to use as a reference in order to determine where the trader may be interested in effecting trades. The action line 1224 can be derived from a user provided algorithm or from any other source. The action line 1224 can be generated using manually entered values, market data, or from any other data feed. The interface maps the action line on the display 1200 from the fixed or inputted data according to the algorithm which generates the values for the action line 1224. The interface 1200 can configure the color, size, and other physical features to suit the trader's taste. Additionally, the interface 1200 can provide a floating action line 1224 whose position depends on an algorithm provided by the trader. Thus, the trader can provide an action line whose position is dependant on the daily interest rate, and, in this example, each day the position of the action line 1224 would change. In such an embodiment, the interface 1200 itself may access the publicly available interest rate information and automatically reposition the action line 1224, or the trader may input the new interest rate each day, upon prompting by the interface 1200 or on his or her own volition. The action line may be straight on a display with a common value axis 1212; however if the action line 1224 represents a variable other than that being used for the value axis 1212, then the action line 1224 may be discontinuous. For example, if the value axis 1212 has units in terms of price, and the action line 1224 is in terms of implied volatility, then the action line 1224 for each book axis 1208 will be in a different position.

In an alternate embodiment, a user can enter markers 1256 or "dummy orders" to graphical represent data points of interest to the trader. An audio or visual alert may be generated, by user defined preference, when an actual trade occurs at the value of the marker 1256. For example, if a user wanted to place a marker 1256 to alert the user when a good is sold at $5.00, the user would place a marker 1256 at the corresponding location at the book axis 1208 representing the good of interest. When a trade occurs for that good at $5.00, the trader is alerted. As shown in FIG. 12, the interface 1200 displays the marker 1256 with a visually distinct characteristic from live orders.

In one embodiment, a method for distinguishing overlapping orders at the same price or value is provided. In this embodiment, if multiple orders have the same value, a single order icon 1232 is displayed having a geometric dimension representing the sum of the quantities for the multiple orders and an indication that the icon represents multiple orders. For example, in the embodiment of FIG. 12, the interface 1200 displays order icon 1232 having a length equal to the quantities of the multiple orders it comprises. Additionally, the interface 1200 displays order icon 1232 with dashed lines dividing the order icon 1232 into segments, where each segment represents a different order. Thus, in this embodiment, a trader can view order icon 1232 and immediately know that there are three orders for the specified value and, by viewing the length of the icon 1232, know the quantities the orders represent. In a preferred embodiment, the interface 1200 positions orders from largest to smallest going from left to right in a vertically aligned book axis 1208. Of course, other methods of representing the presence of multiple orders at the same value may also be used in accordance with the present invention.

In a further embodiment, a method for displaying order icons 1220 that are close in value or price is provided. In this embodiment, if two or more order icons 1220 are close in value, the icons 1220 are overlapped and differentiated in their look from other order icons 1220 to let the trader know that multiple orders exist close in value. In one embodiment, the orders as semi-transparent, and areas of overlap appear with greater color saturation. For each overlap, there would be a greater increase in color saturation. In the example of FIG. 12, the interface 1200 displays multiple order icon 1236 having "crawling ants" demarcating the different order icons 1220 that are represented in the three-order block. The interface 1200 preferably creates dashed lines in a different color than the order icon 1220 itself around the edge of the icons 1220. Then, the interface 1200 overlays one icon 1220 over another icon 1220 to reveal both icons 1220. In a preferred embodiment, the interface 1200 overlays a shorter icon 1220 over a larger icon 1220 because this arrangement allows the most area for both icons 1220 to be seen. If there are more than two icons 1220 overlapping, the interface 1200 preferably alternates the order in which the icons 1220 are overlapped. For example, in FIG. 12, the first icon 1220 is in the background, the second icon 1220 is in the foreground, and the third icon 1220 is also in the background. Alternating the arrangement aids in heightening the visibility of the different icons 1220. In an another embodiment, the overlapping orders are displayed overlapping each other, but the color of the overlapping order icons 1220 will change to a sharply differentiated color or a color chosen by the user. Alternatively, the interface 1200 flashes the overlapping icons 1220 to distinguish the overlapping icons 1220 from non-overlapping icons 1220.

Of course, if too many orders overlapped, the interface 1200 preferably changes the scale of the value axis 1212 to a finer granularity to display more space between the icons 1220. However, the scale of the value axis 1212 affects the display of all of the book axes 1208, and therefore the interface 1200 will not change the scale without first determining the effects of changing the scale on the other book axes 1208. In one embodiment, the interface 1200 generates the scale of the value axis 1212 to accommodate the minimum scale necessary to display the book axes 1208 with the greatest value ranges, i.e., the highest offer over all book axes 1208 and the lowest bid over all book axes 1208 would be used to calculate the scale of the value axis 1212. In another embodiment, the interface 1200 displays a scale having a given percentage of points above and below the mean value for the mid point of all markets for all book axes 1208. A scroll bar 1216 would be used to view orders which are above or below the default field of view. In one embodiment, the interface 1200 continuously refreshes the scale as the order arrangement on book axes 1208 changes. In an alternate embodiment, the interface 1200 freezes the scale at the initial values displayed when the interface 1200 is initiated or refreshed. In yet another embodiment, the user can set a given time period for the value scale to be redrawn based on the above mentioned methods.

In an alternate embodiment, orders close in value are stacked, as shown by stacked order icon 1240. In this embodiment, orders that overlap are stacked together, with the common boundary line in preferably a different color than the default color used for the edges of the order icons 1240. In this embodiment, the point on the right end of the icon 1240 that points to the value axis is replaced by a straight line to distinguish that the edge of the icon 1240 does not correlate to the value scale. In a further embodiment, the interface 1200 displays a contrasting vertical line to bisect the order icons 1240 and add more contrast.

In another embodiment, the interface 1200 displays the best bids and offers for each book axis 1208 correlating to the value axis 1212. However, the interface 1200 displays all of the other order icons 1220 in a stacked formation that does not correlate to the value axis 1212. However, the information regarding the spread and the quantities of the orders are still preserved in this embodiment. The order icons 1220 may be stacked a fixed space apart to best fit the available space in the book axis 1208. This method allows more orders to be displayed and provides visual information on the number of orders in each book axis 1208, providing important depth of market information. Alternatively, the spacing between the icons 1220 may be determined as a function of the relative value of the orders 1220. For example, orders closer in value to the best order may be closer in space to the best order. The spacing would be proportional to the relative difference in value of the given orders.

In another embodiment, the interface 1200 provides flip-up text boxes 1244 that display additional detail regarding an order. For example, the flip-up text box 1244 in FIG. 12 displays name of the good, price, bid ask indicator plus size information, the time the order was placed (not shown), and trader name. Any or all of this information can be displayed in a flip-up text box 1244. The flip-up text box 1244 thus supplements the intuitive feel generated by the interface 1200 of the present invention with precise details the trader will need when the trader is deciding whether to make a trade. The flip-up text box 1244 can also be used to provide information for overlapping order icons 1232, for example, by indicating the precise value for each of the overlapped orders, a summation value for all overlapping orders, and other information as described above. Alternatively, the flip-up text box 1244 displays information only regarding the segment of the multiple order icon 1232 over which the mouse or cursor is placed. In a preferred embodiment, the interface 1200 allows users to determine what information appears in the flip-up text box 1244 to customize the interface 1200 to the user's preferences. Alternatively, a mouse click can also bring up a text box window displaying the above-described information. In an embodiment utilizing a mouse operation to display the information in a text box window, the information for either an individual order displayed as one segment of a multiple order icon 1232, or for the entire order, can be displayed by using either a right or left mouse click, a keyboard command, or another utilization action.

In one embodiment, the interface 1200 provides a panel view 1248 to display more detail regarding a selected book axis 1208. In this embodiment, a user may select a book axis 1208 using a mouse or other input device to view more or different information regarding the book for the particular semi-fungible good represented by the book axis 1208. Then, the interface 1200 displays or generates a view of the book axis 1208 showing additional information. In the example of FIG. 12, the book axis 1208 in the panel view 1248 is displayed in terms of price instead of implied volatility. Thus, by simply selecting one of the plurality of book axes 1208 displayed in the main view, the trader can immediately view the orders of a selected book axis 1208 in terms of a different unit. In one embodiment, the trader selects the parameters of the panel view 1248, for example, units, size and other information. A last trade indicator 1260 is displayed to indicate the value at which the last trade occurred.

In FIG. 13, an embodiment of the interface 1200 is shown in which a large plurality of book axes 1208 are displayed in a single view. A scroll bar 1216 is provided to display additional book axes 1208. However, the main screen shows a large number of book axes 1208 to allow a trader to view information regarding a large number of semi-fungible goods simultaneously. In this embodiment, the book axis 1208 itself is rendered as a thin vertical (or horizontal) line, and the orders are displayed as visual indicators 1316, such as hatch marks, on the line 1208. As in the embodiment of FIG. 12, in this embodiment, the length of the visual indicators 1316 also corresponds to the quantity of a given order. Thus, the relative value and quantity information for each order is provided in the embodiment of FIG. 13. This embodiment provides the advantage of viewing the information regarding a large number of semi-fungible goods. For example, in FIG. 13, the trader can view the bid-ask spread 1228 as it is distributed over the semi-fungible goods to immediately understand the values at which the different goods are being traded. Additionally, the number of orders pending in the markets is immediately understood. Thus, as the interface 1200 can display the entire set or a large majority of the semi-fungible goods in one screen, the trader has all of the information that he or she requires for effective and informed trading of the semi-fungible goods.

In this embodiment, the panel view 1248 is more important as it is more difficult to view price, value, and quantity information in a display of so many book axes 1208. However, by simply selecting the axis 1208 for which the trader has interest, the trader can view all of the details in the panel view 1248. In a preferred embodiment, the interface 1200 displays the spread 1228 in a different color to highlight the spread 1228 across the different book axes 1208. Also, the book axes 1208 themselves are preferably displayed in different colors to allow the trader to easily distinguish the axes 1208. An action line 1224 is also provided as discussed above. Additionally, the bid area, i.e., the area of the book axis below the spread is preferably displayed in a different color than the offer area to also enable the trader to easily distinguish and intuitively understand the market for the orders of the semi-fungible goods.

In one embodiment, an order entry box 1300 is displayed in a panel view 1248 to provide the trader with an easy means of placing an order. In this embodiment, the trader selects a bid or offer icon, shown in the panel view as order entry icons 1304, and then places the icon 1304 along the axis 1308 at the desired value. The trader can then adjust the length of the icon 1304 to the desired quantity. In a preferred embodiment, as the trader is adjusting the order entry icon 1304, the precise values or quantities are displayed in the order entry box 1300, to allow the trader to know when the icon has reached the appropriate location or size. Then, once the bid or offer is acceptable, the trader may click on the icon 1304 or click on the "Place" button 1312 in the order entry box 1300 to place the order. The interface 1200 then displays the order in the book axis 1208. The methods for generating the order and displaying the order are described above.

Figure 14:
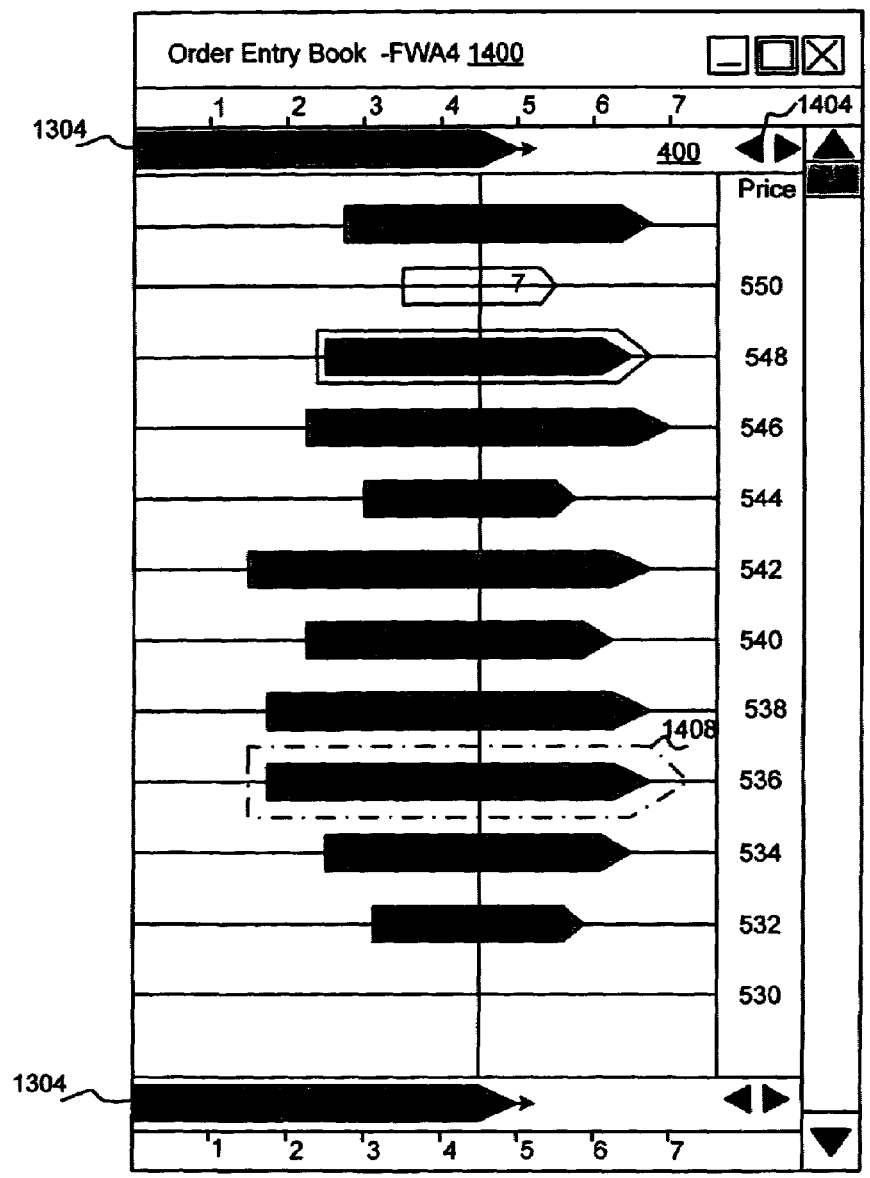
FIG. 14 is a screen shot illustrating an embodiment of an order entry box in accordance with the present invention.

FIG. 14 is an expanded view of one embodiment of an order entry book window 1300. In this embodiment, the interface 1200 displays bid or offer entry icons 1220 within size adjusting windows 1400. Thus, to adjust the size of an order to be entered, a trader would select the order entry icon 1304 with a mouse or other input device and extend the length of the icon 1304 until the desired quantity is represented. In the embodiment of FIG. 14, a scale is provided above or below the adjusting window 1400 to enable the trader to quickly adjust the icon 1304 to the correct size. Additionally, more precise size scrolling buttons 1404 are provided to allow for a more precise adjustment of the length of the icon 1304. Once the size is acceptable, the trader selects the entry icon 1304 and drags it to the appropriate position in the panel view 1248. In one embodiment, after the order is placed, the order remains pending, and is displayed with some visually distinguishing characteristic from accepted orders. For example, in FIG. 14, a pending order is displayed with dashed lines 1408 to indicate to the trader that the order has not yet been placed. Alternatively, the pending order could be displayed in a different color, or in bold, or the like. Then, the trader can adjust the location using precise scrolling buttons (not shown) or other means of accurately placing the order at the desired price. Once the icon 1304 is at the desired price location and represents the desired quantity, the trader can use a right mouse button or any other pre-defined key to request that the order be entered. In one embodiment, a confirmation window is then displayed, and the trader can then confirm that the order should be entered.

The panel view 1248 may also be used to adjust an existing order. In this embodiment, the trader will select an order to be modified using a predefined key, button, or mouse action. Then, the interface 1200 will verify that the selected order was previously placed by the trader requesting modification, and the selected order will become a pending order, and displayed in a similar format as a pending order. The information of the order will populate an order entry text window 1300. The user can modify the elements of the order in the text box 1300. The user will have the option of canceling the pending order with a button click operation [button not shown in diagram] or effectuating the modification of the order by hitting an order placement button. If the user hits the cancellation button, the order icon 1220 will return to its original visual representation and the system will not modify the order. If the user hits the order placement button, the system will first cancel the existing order and once it has determined that the order has been cancelled, it will enter a new order with the new parameters entered by the user. In one embodiment, a pending order will automatically be cancelled, or "timed out", if no action is taken within a given, user defined amount of time. At that point, the trader can cancel the order, or adjust a parameter of the order such as its price or quantity.

To complete a transaction by selecting a bid or offer icon 1220, the trader selects the existing order icon 1220 and a window is displayed to place a bid or offer at a matching price for a matching quantity as a selected bid or offer. Thus, if an existing order is a bid for 20 units at $10.00 a unit, a window would be displayed allowing the trader to enter an offer for 20 units at $10.00 a unit. By selecting a confirm option, the order is entered.

Figure 15:
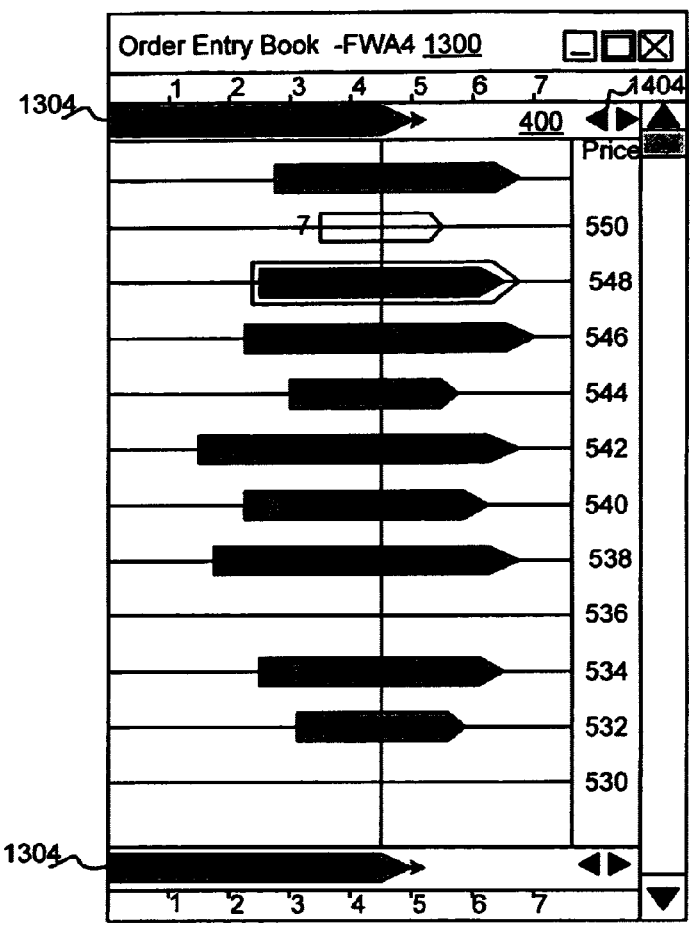
FIG. 15 is a screen shot of an order entry box with a summing function in accordance with the present invention.
Figure 15:
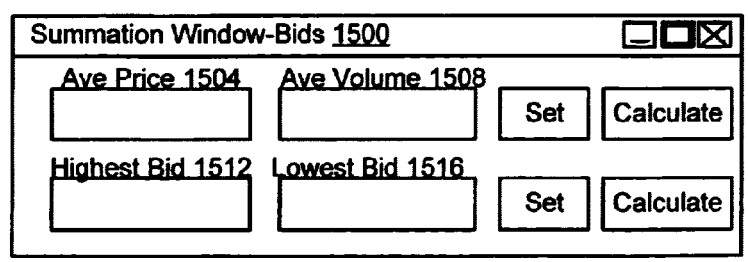
Figure 2:
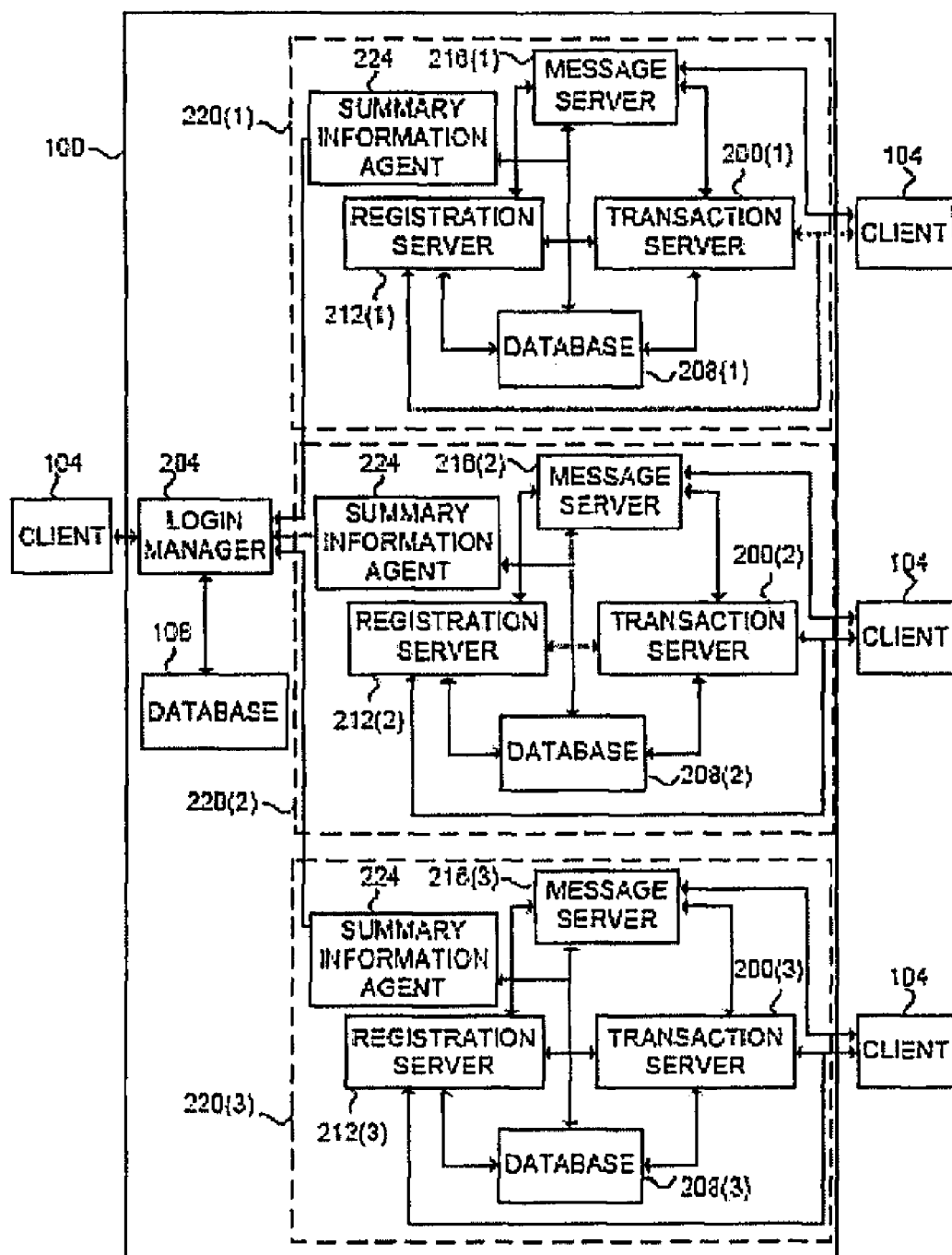
Figure 3A:
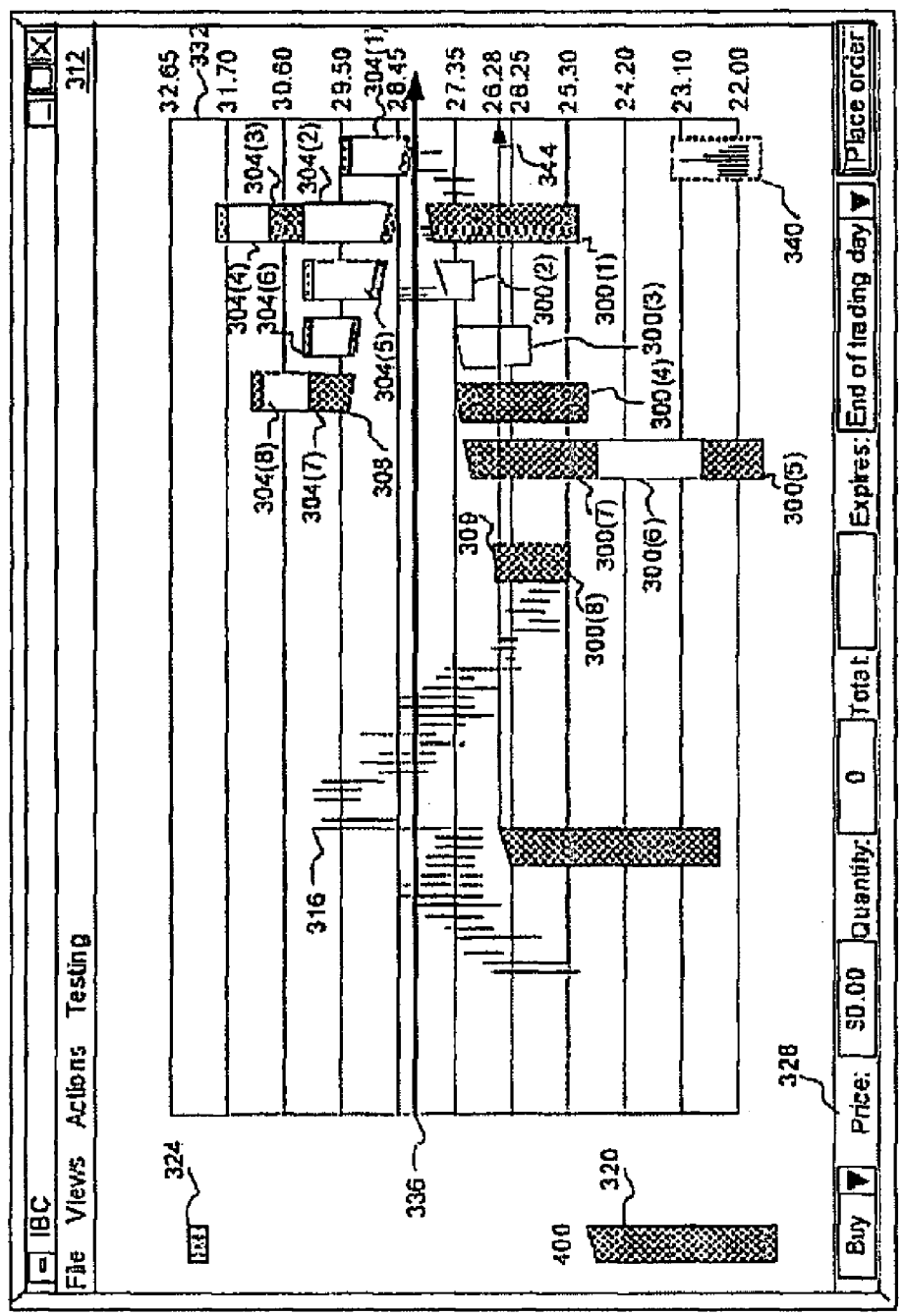
Figure 3B:
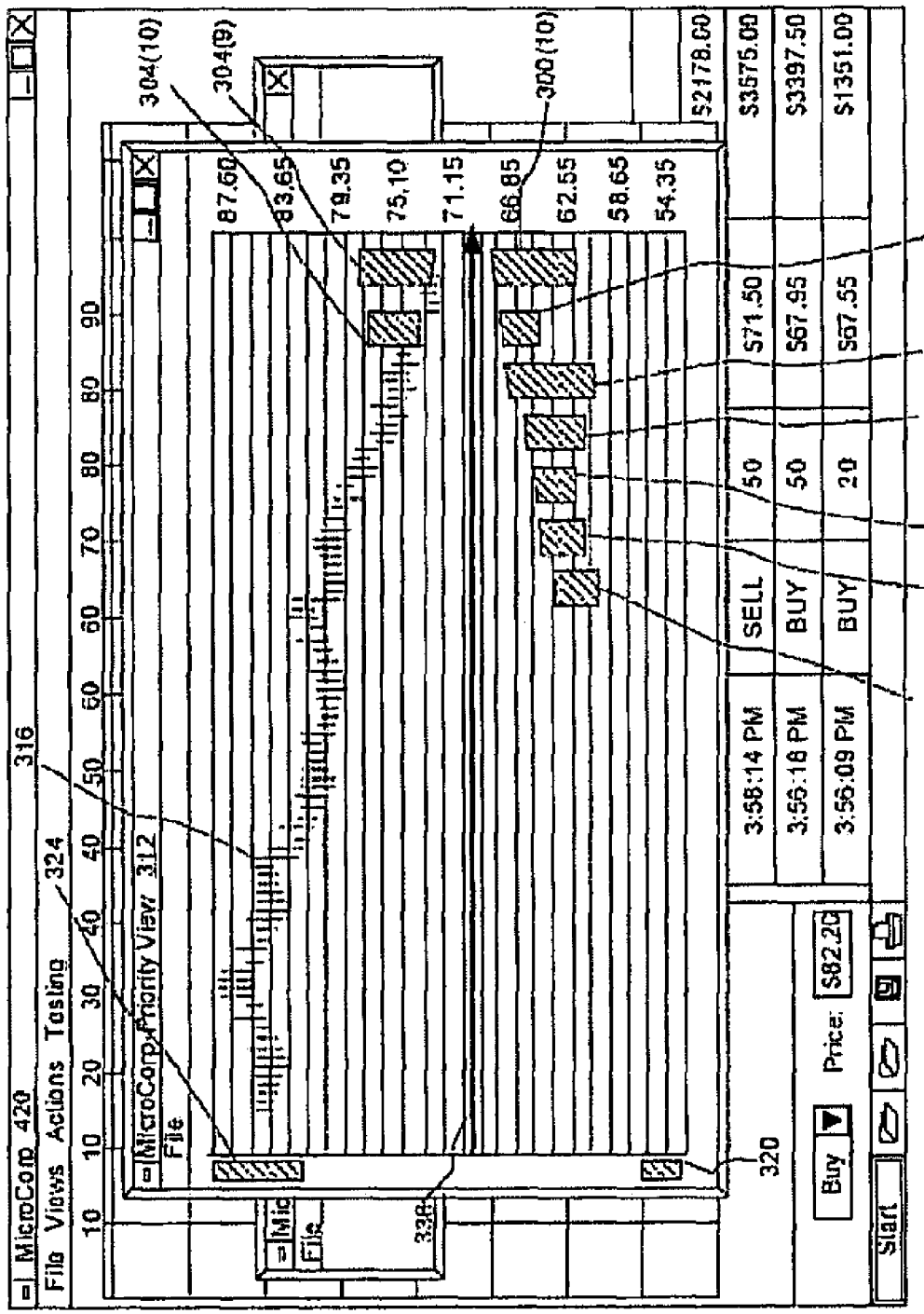
Figure 3D:
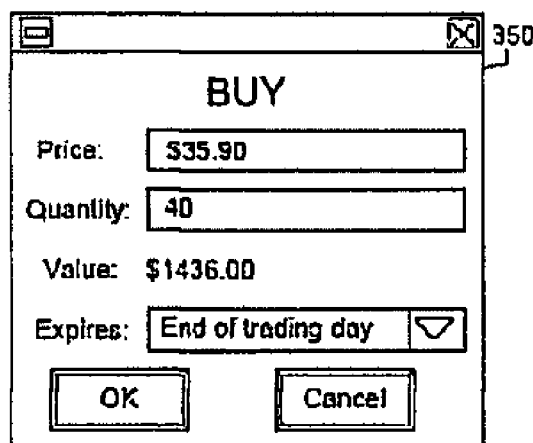
Figure 3E:
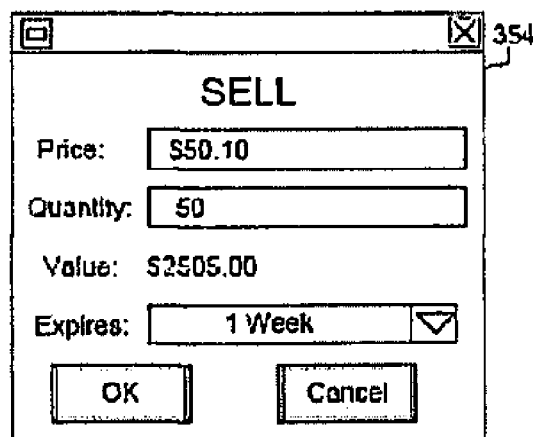
Figure 9:
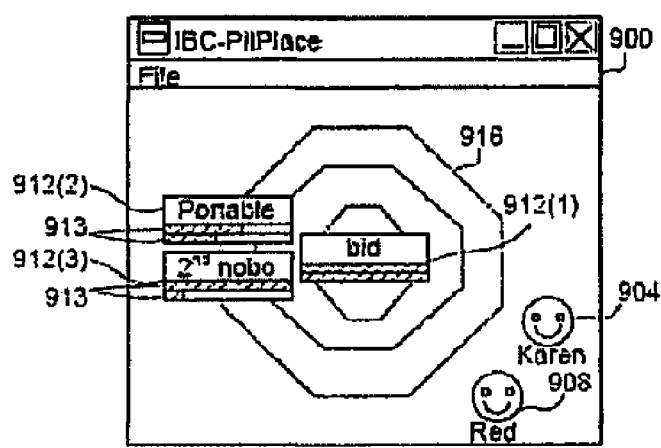
Figure 4:
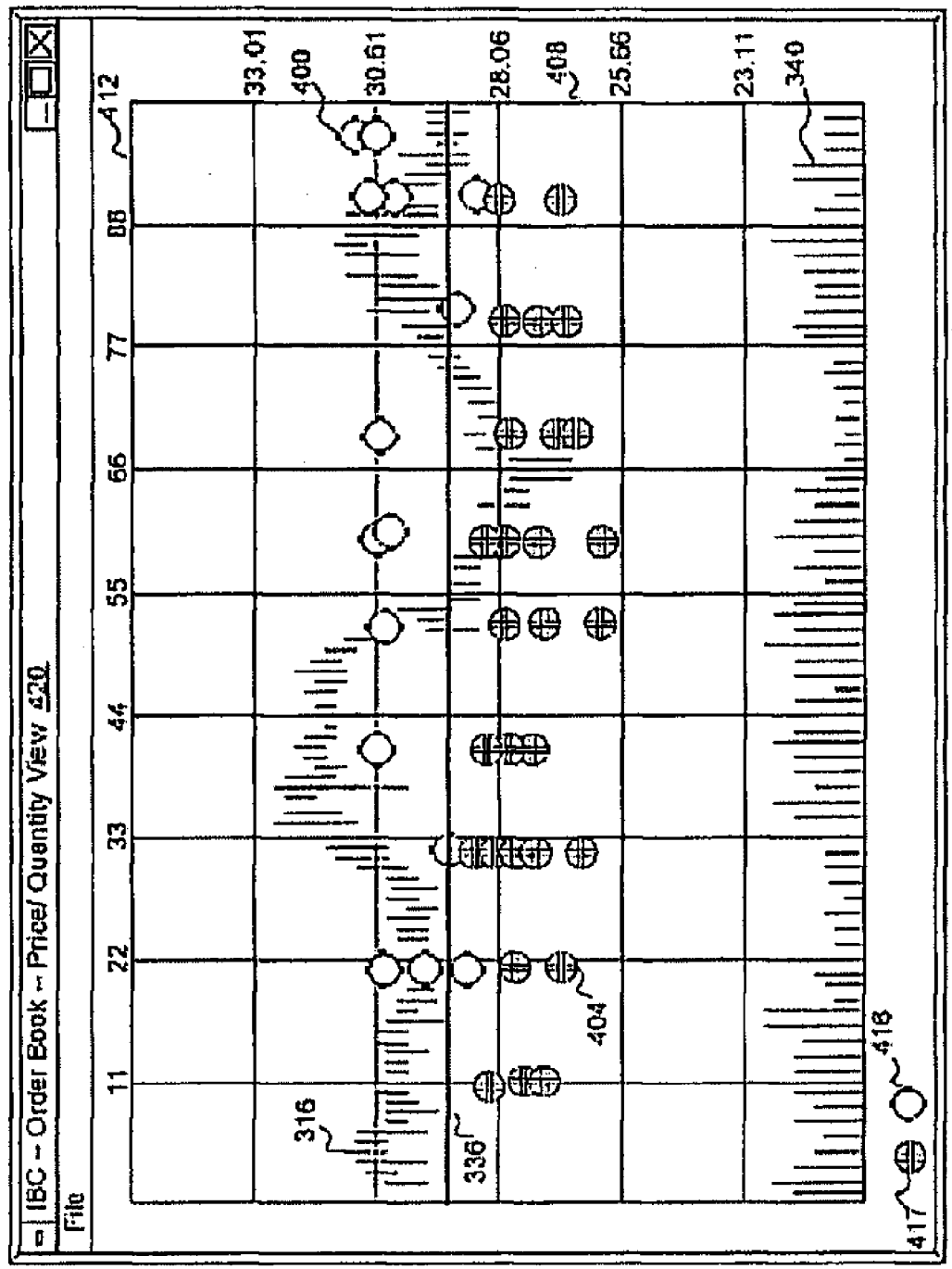
Figure 6:
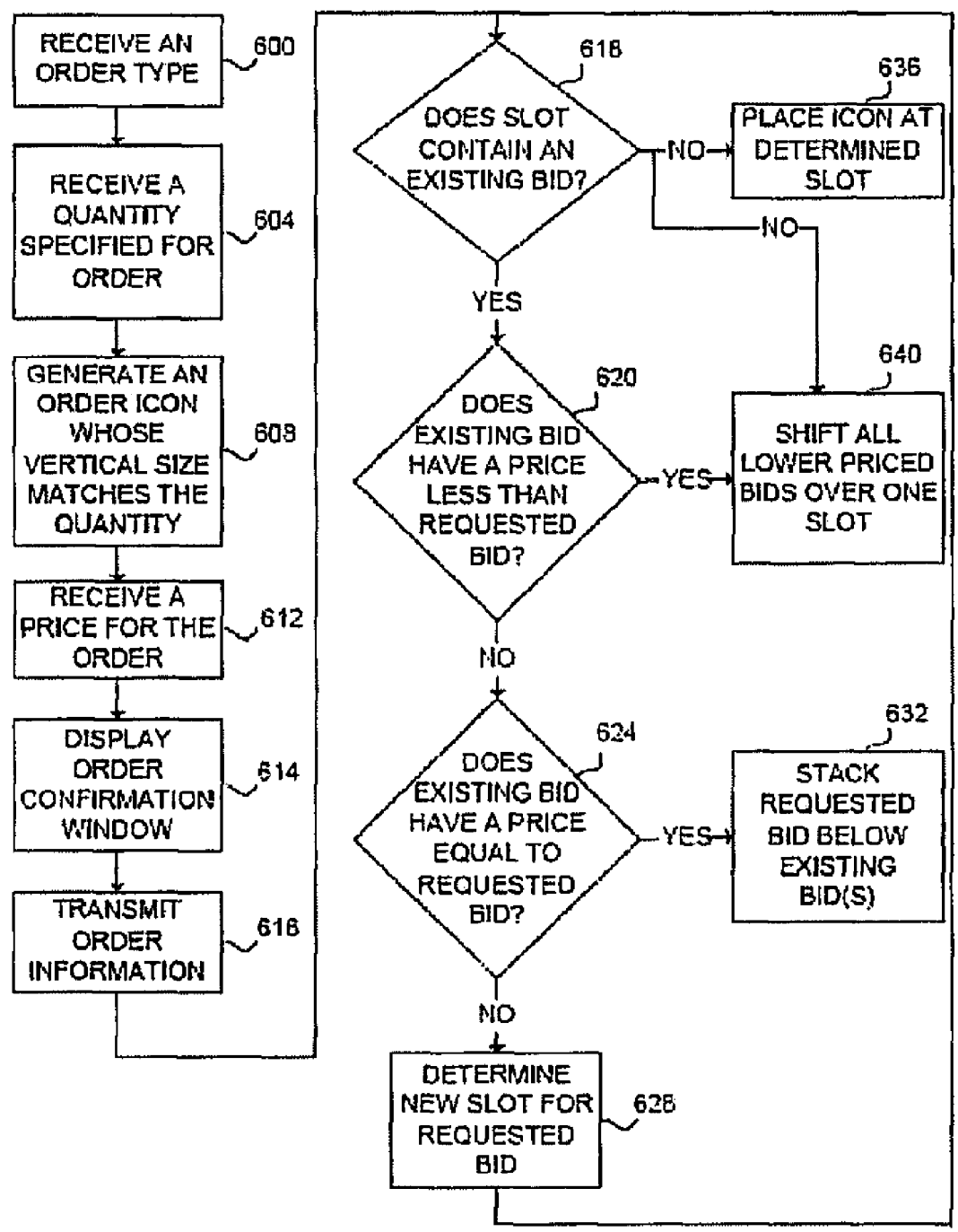
Figure 7:
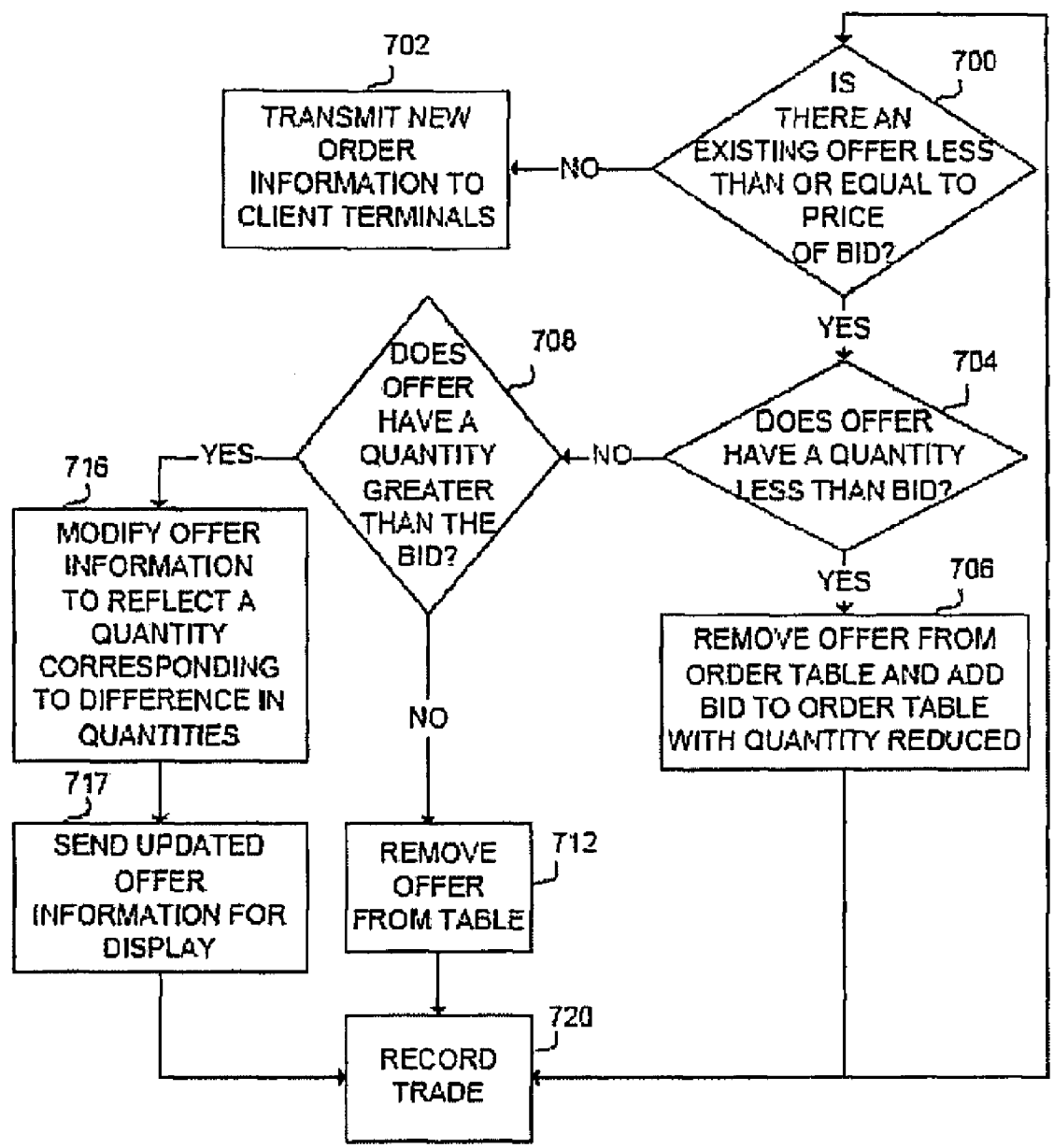
Figure 10:
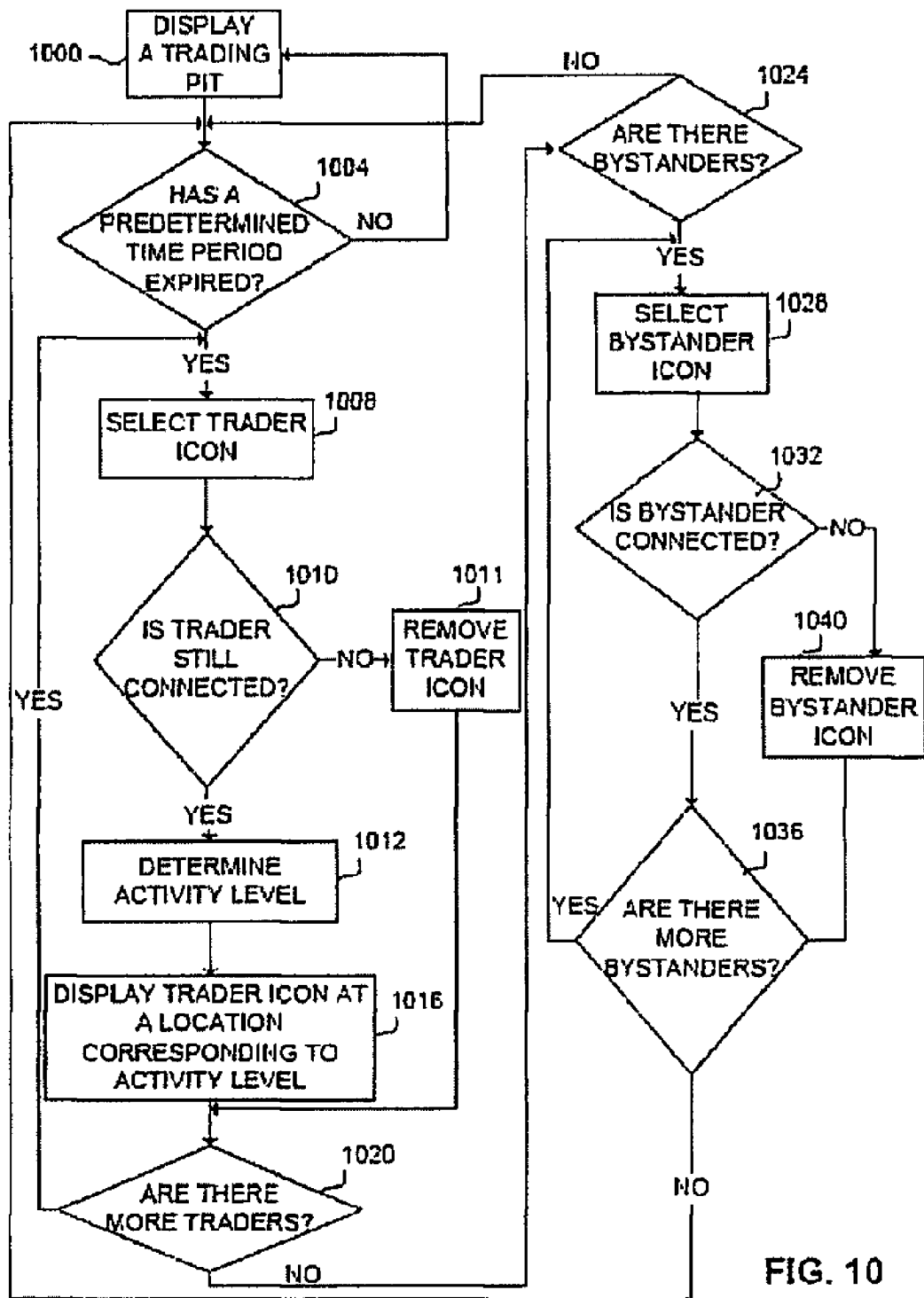
Figure 12:
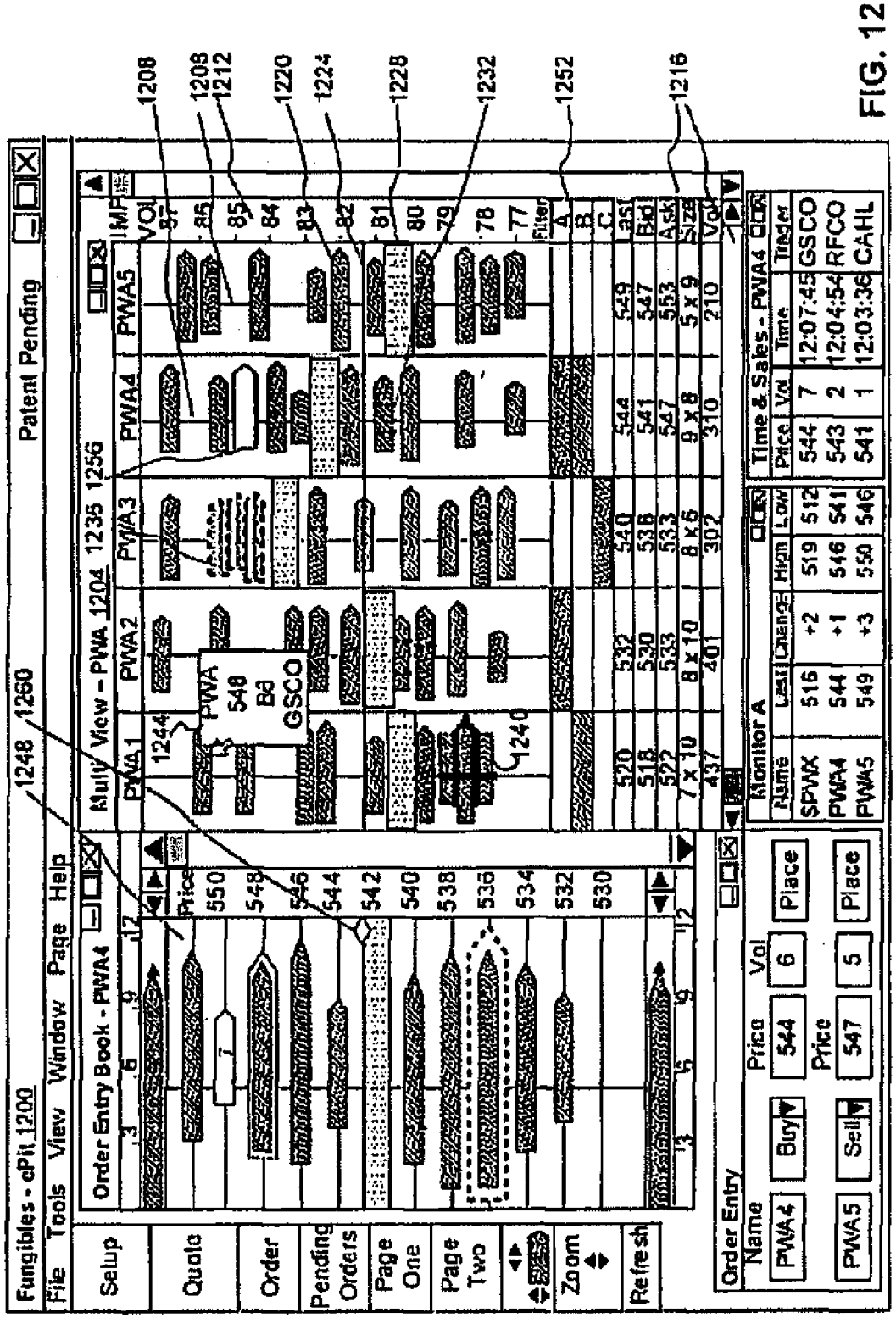
Figure 13:
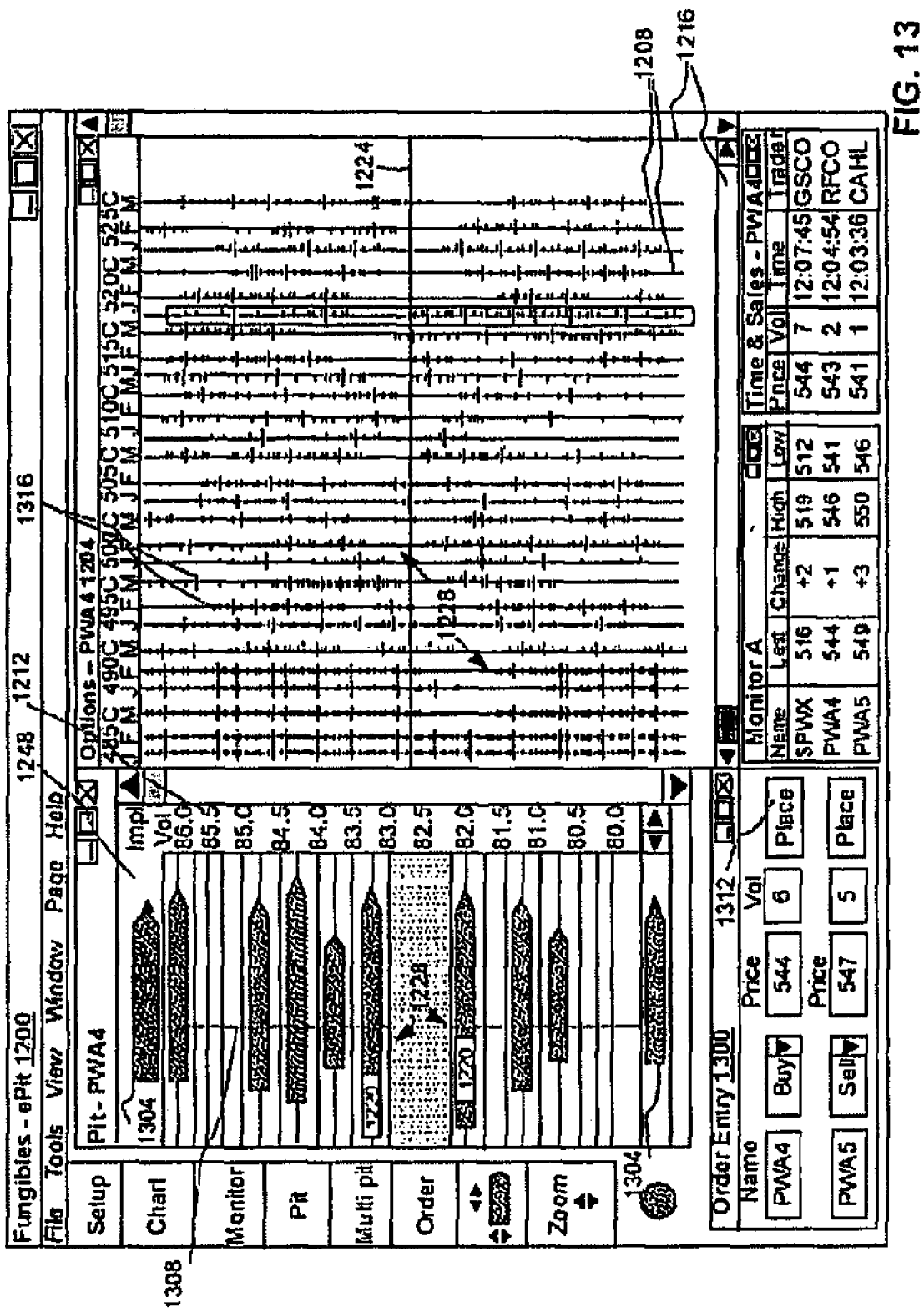
Figure 14:
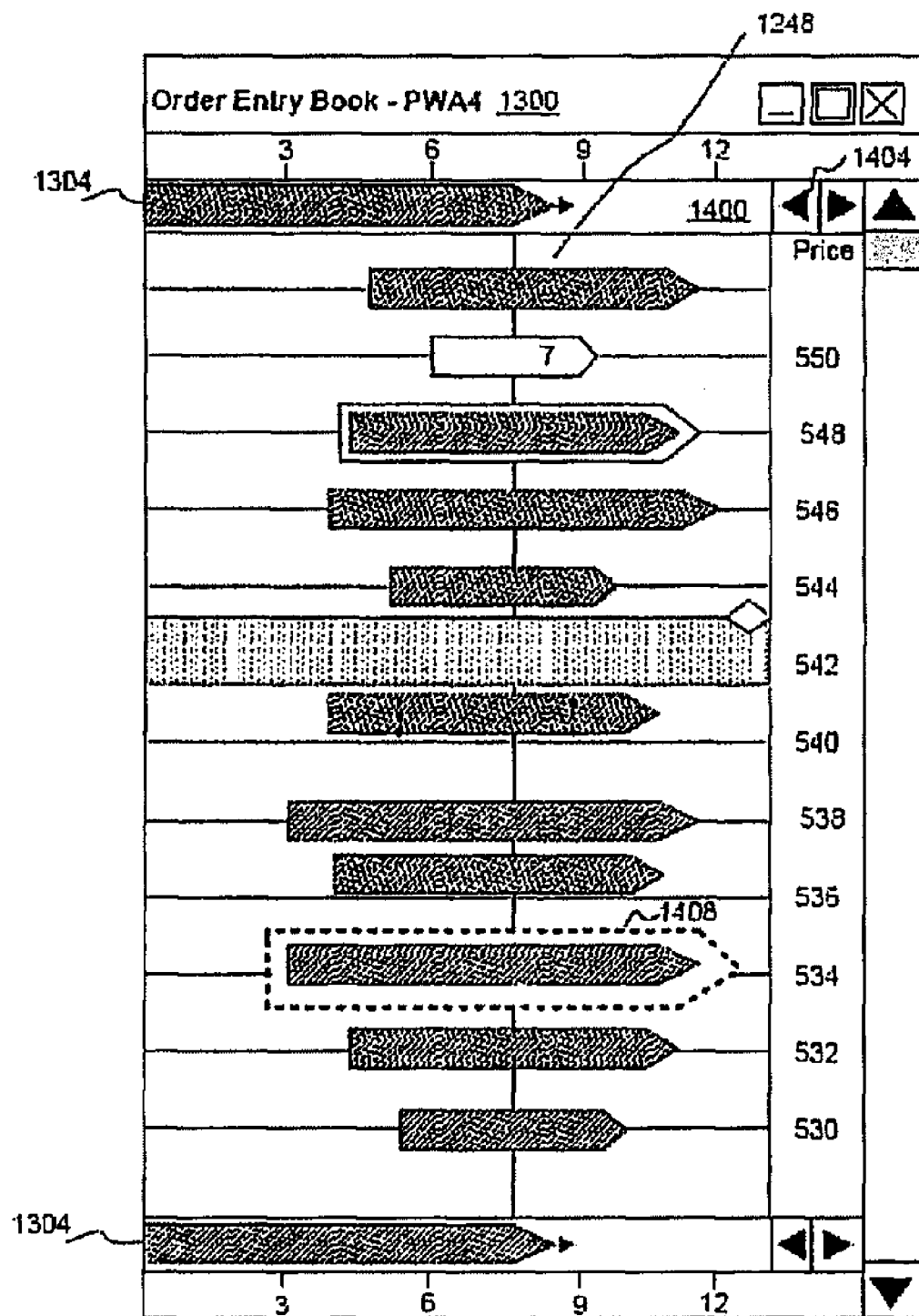
Figure 15:
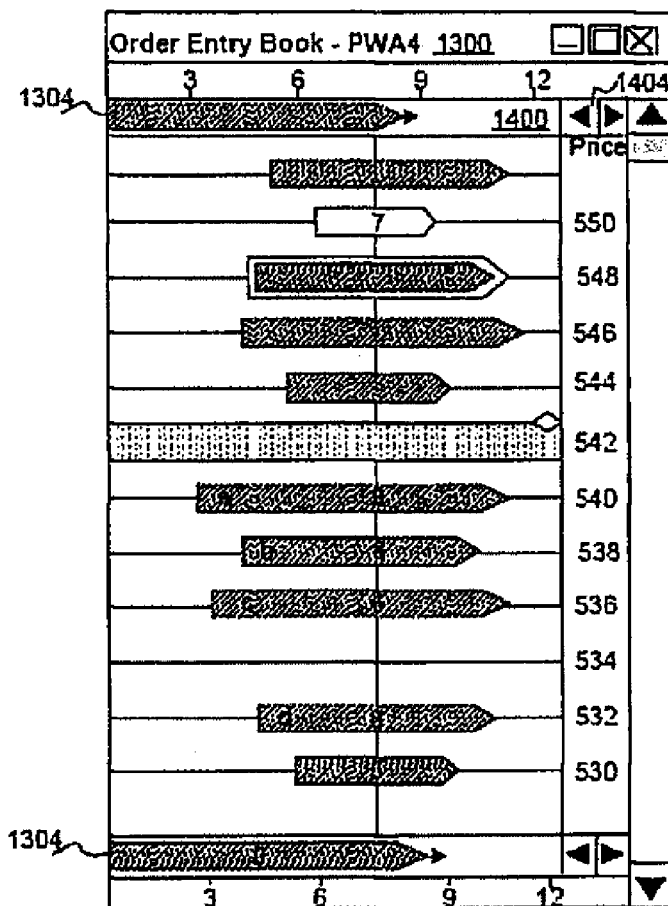
Figure 15:
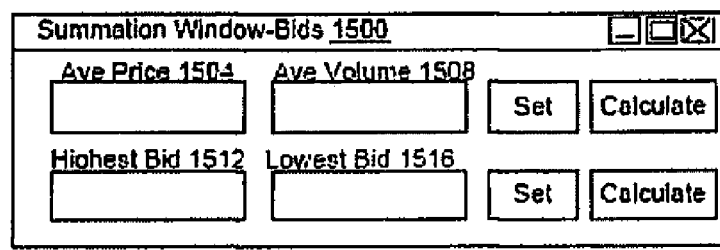
Figure 2:
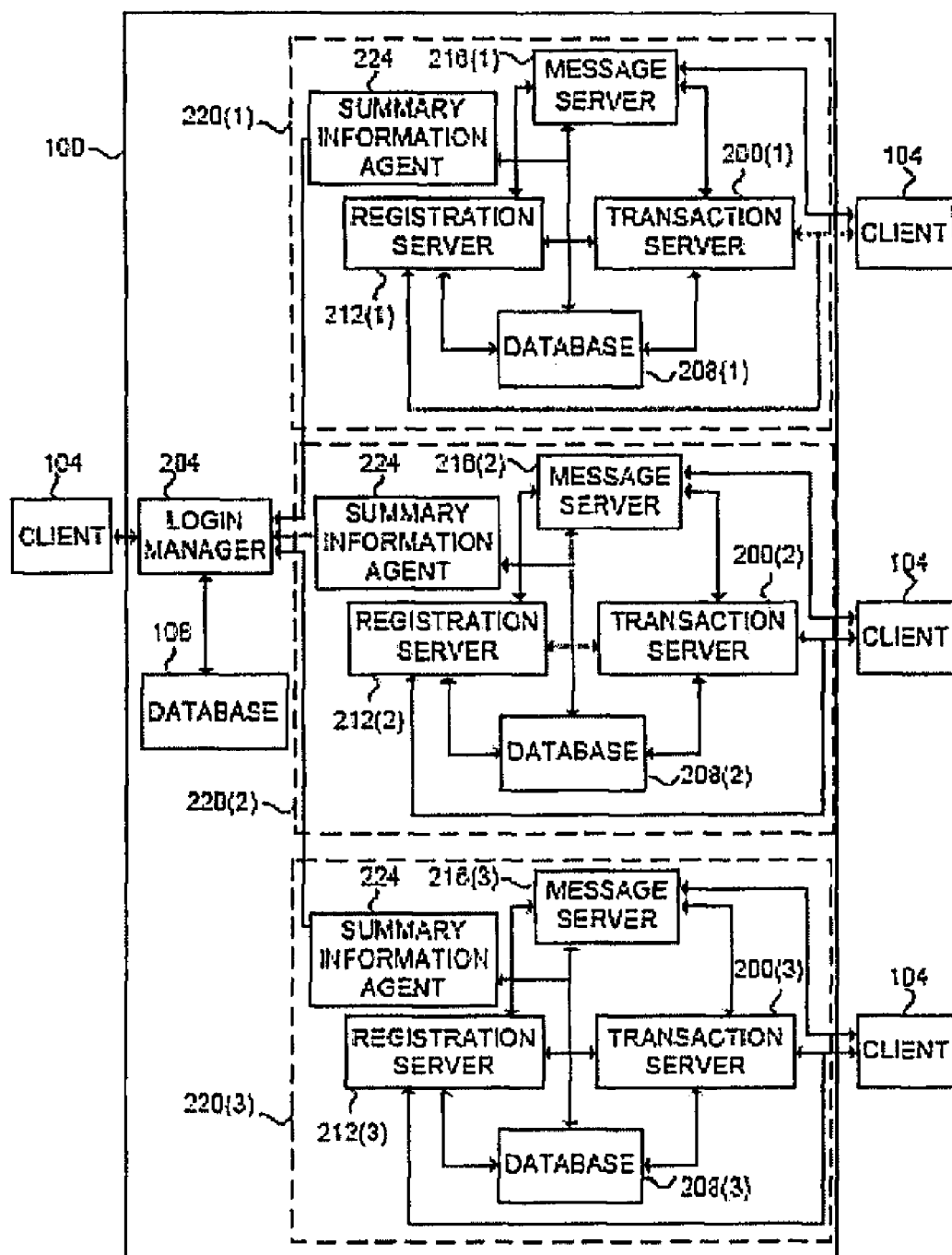
Figure 3A:
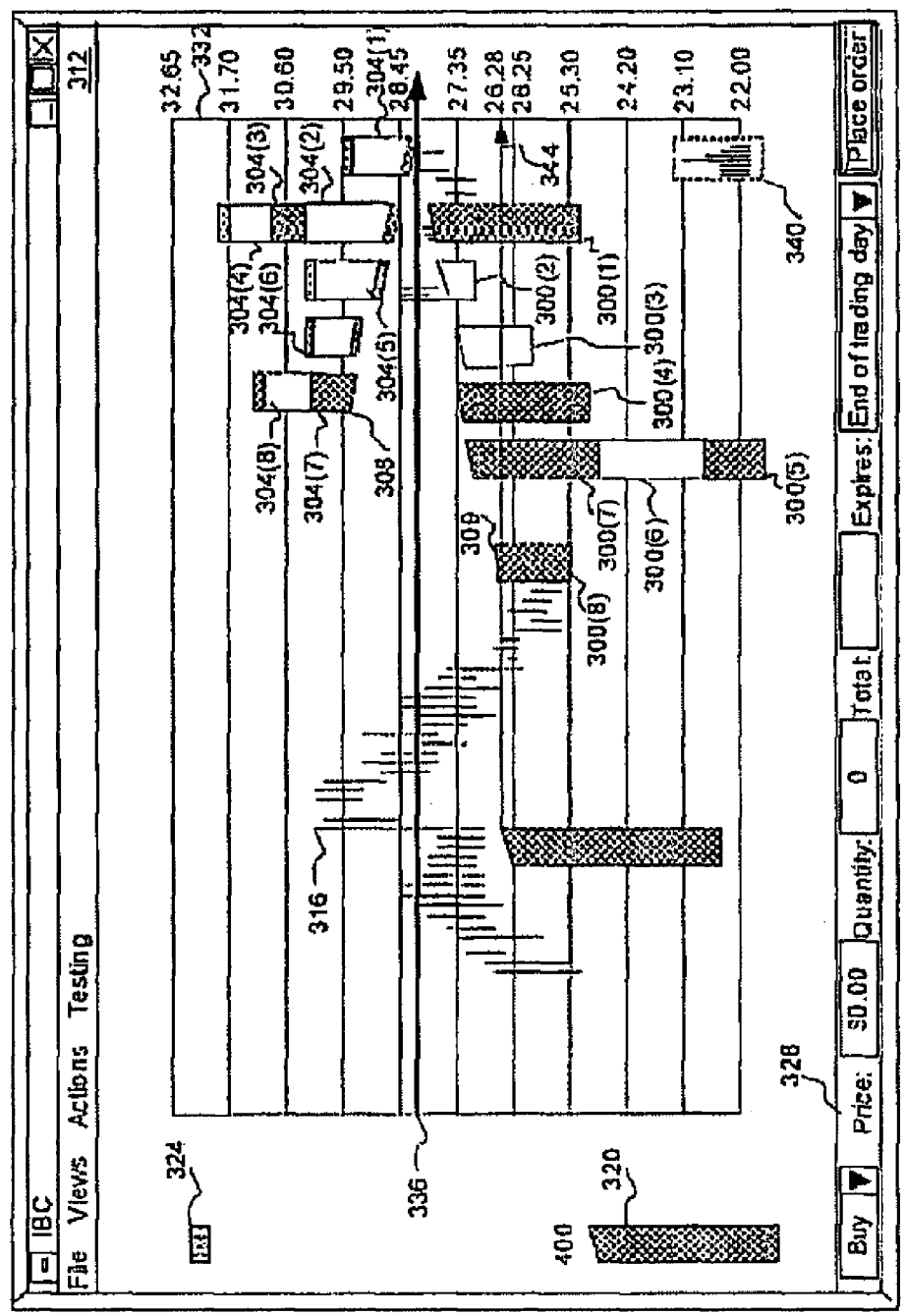
Figure 3C:
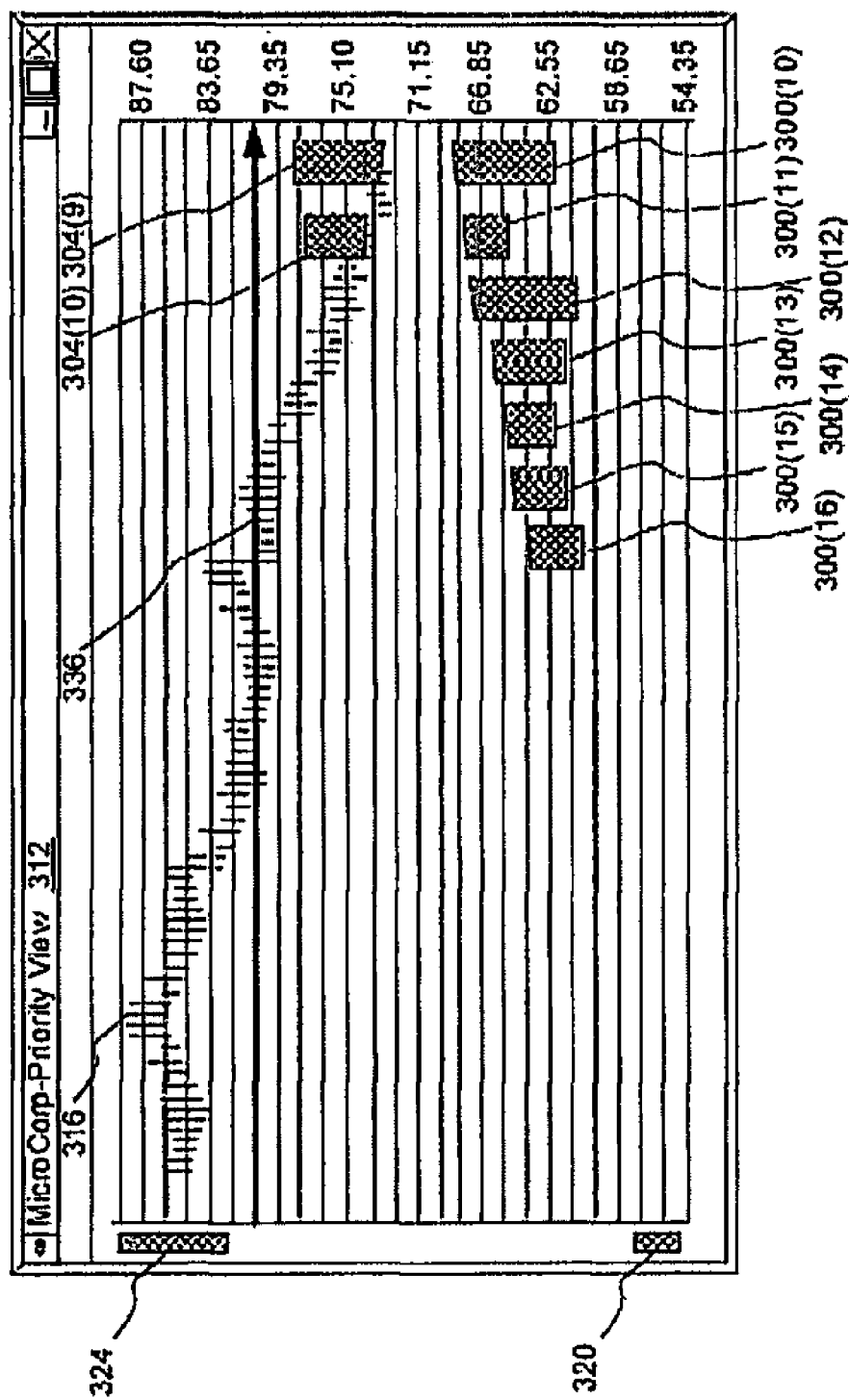
Figure 3D:
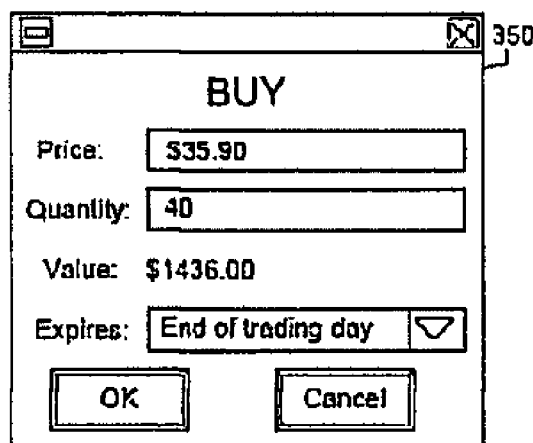
Figure 3E:
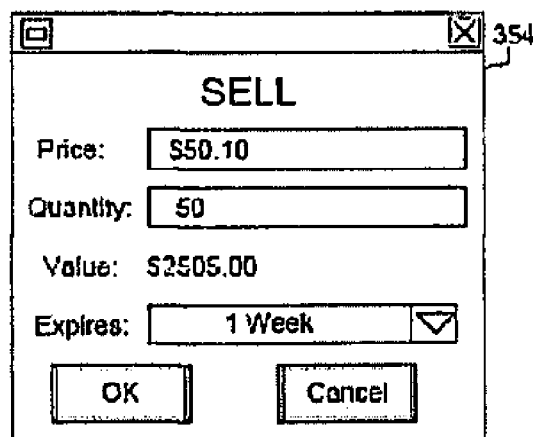
Figure 9:
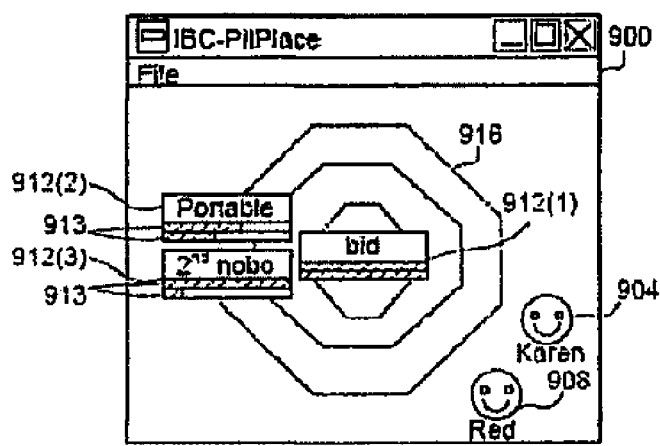
Figure 4:
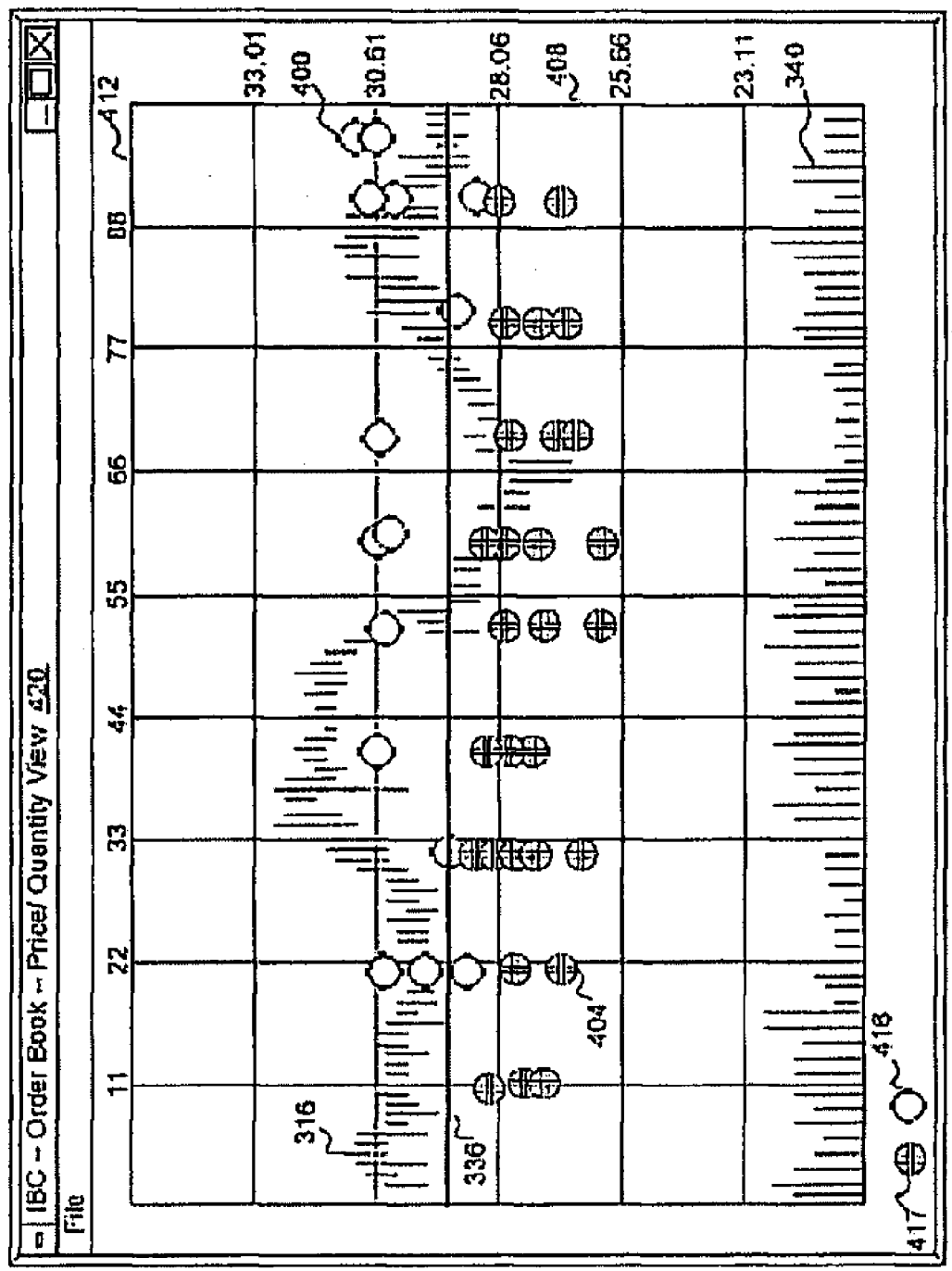
Figure 6:
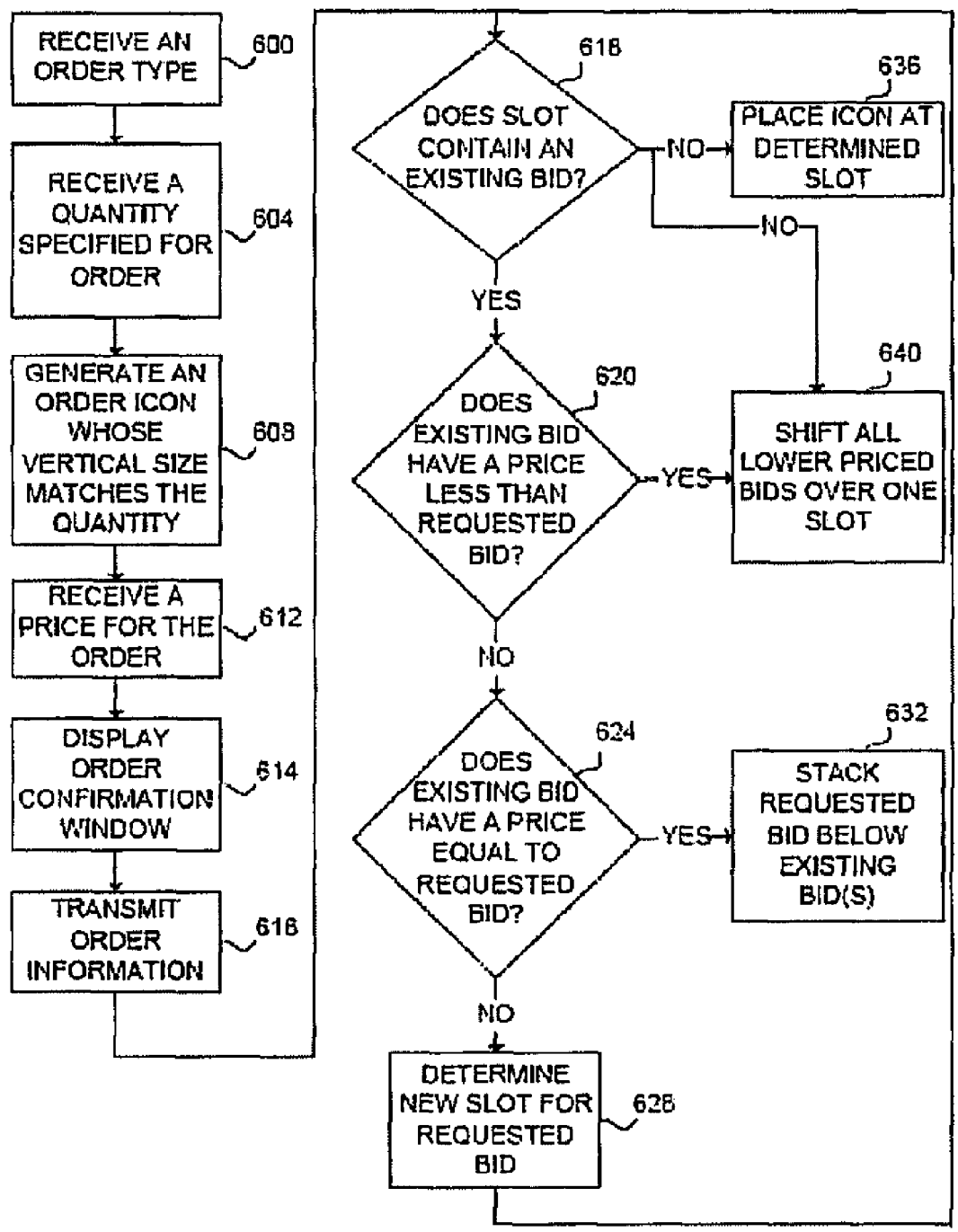
Figure 7:
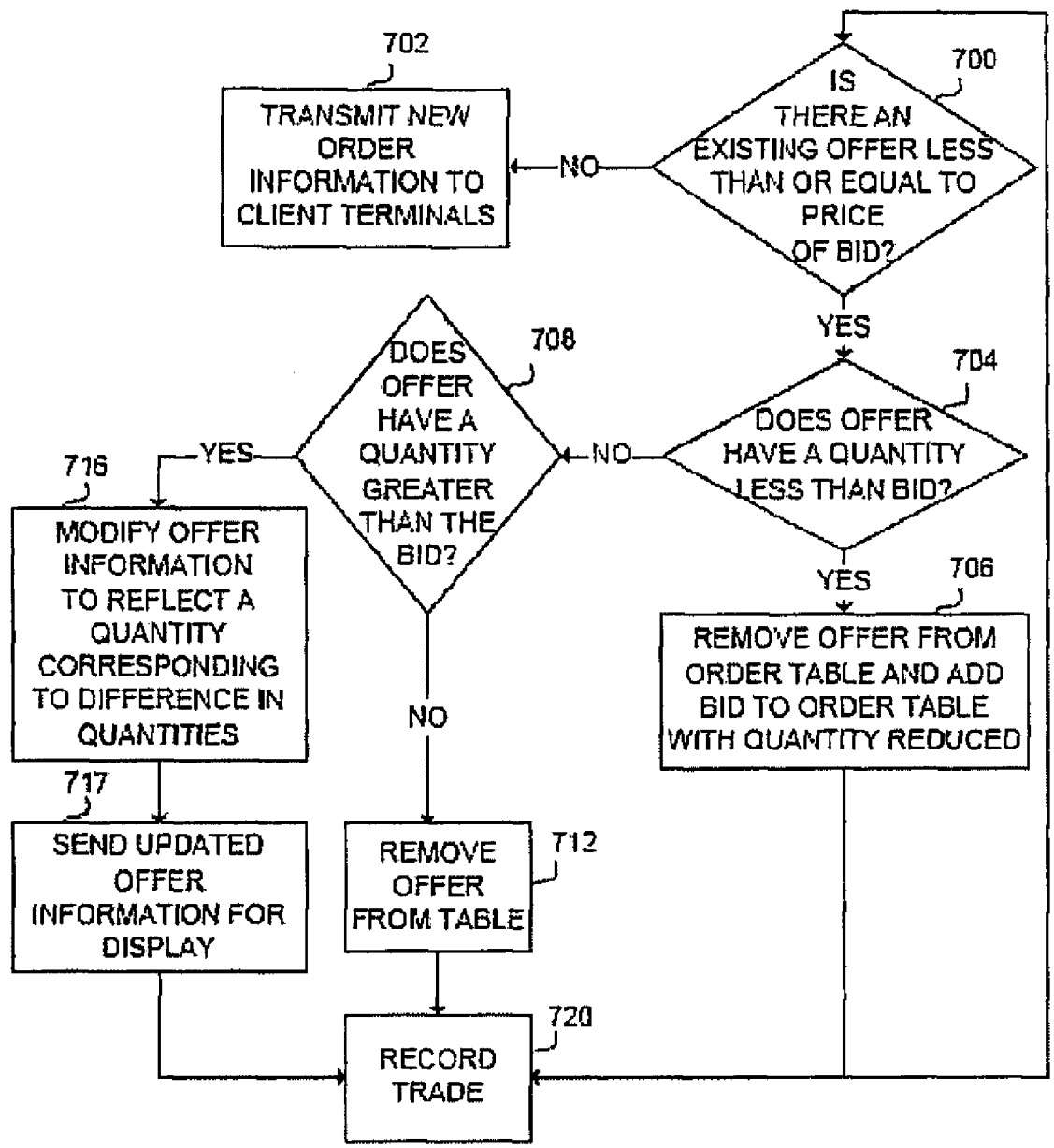
Figure 10:
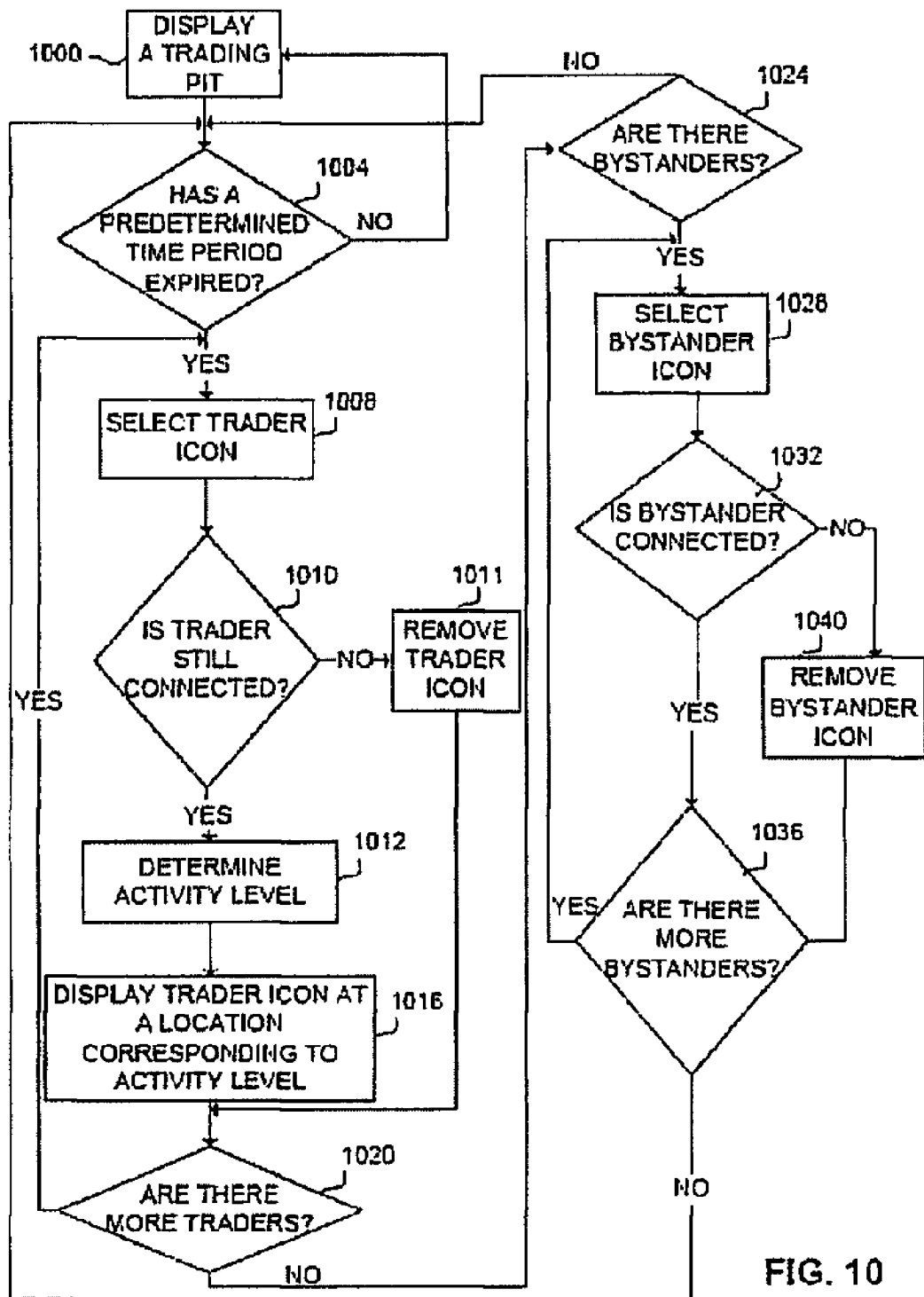
Figure 12:
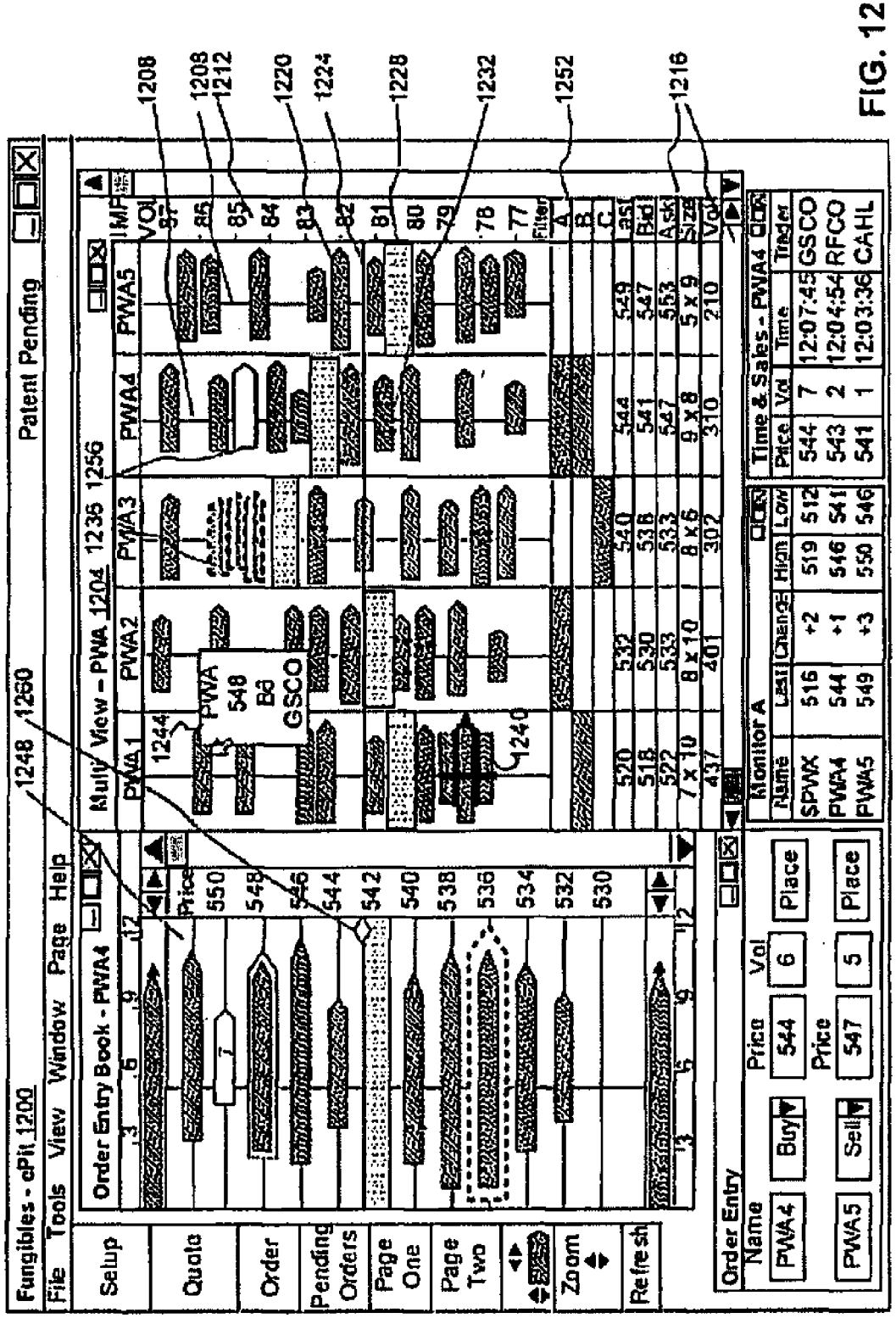
Figure 13:
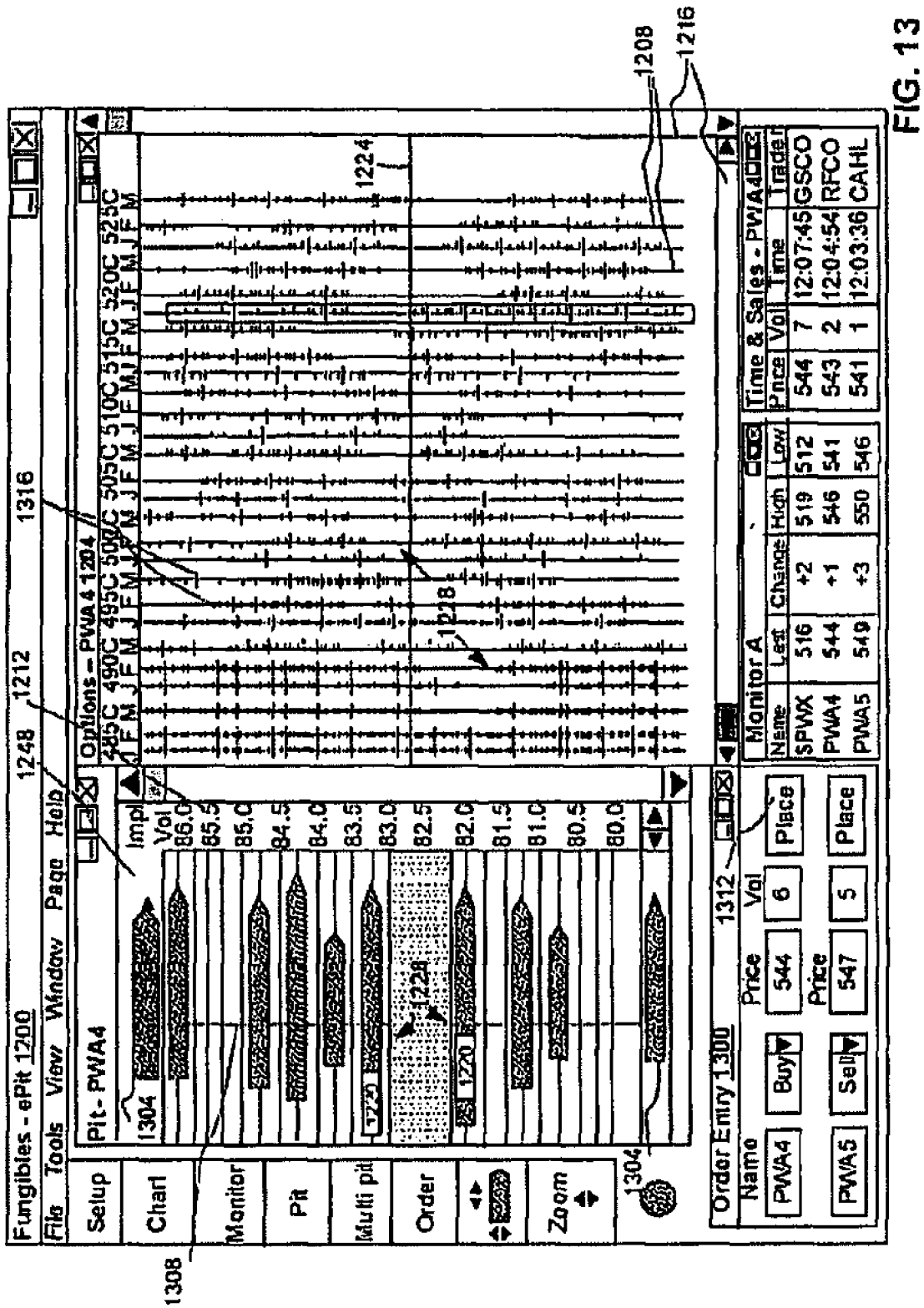
Figure 14:
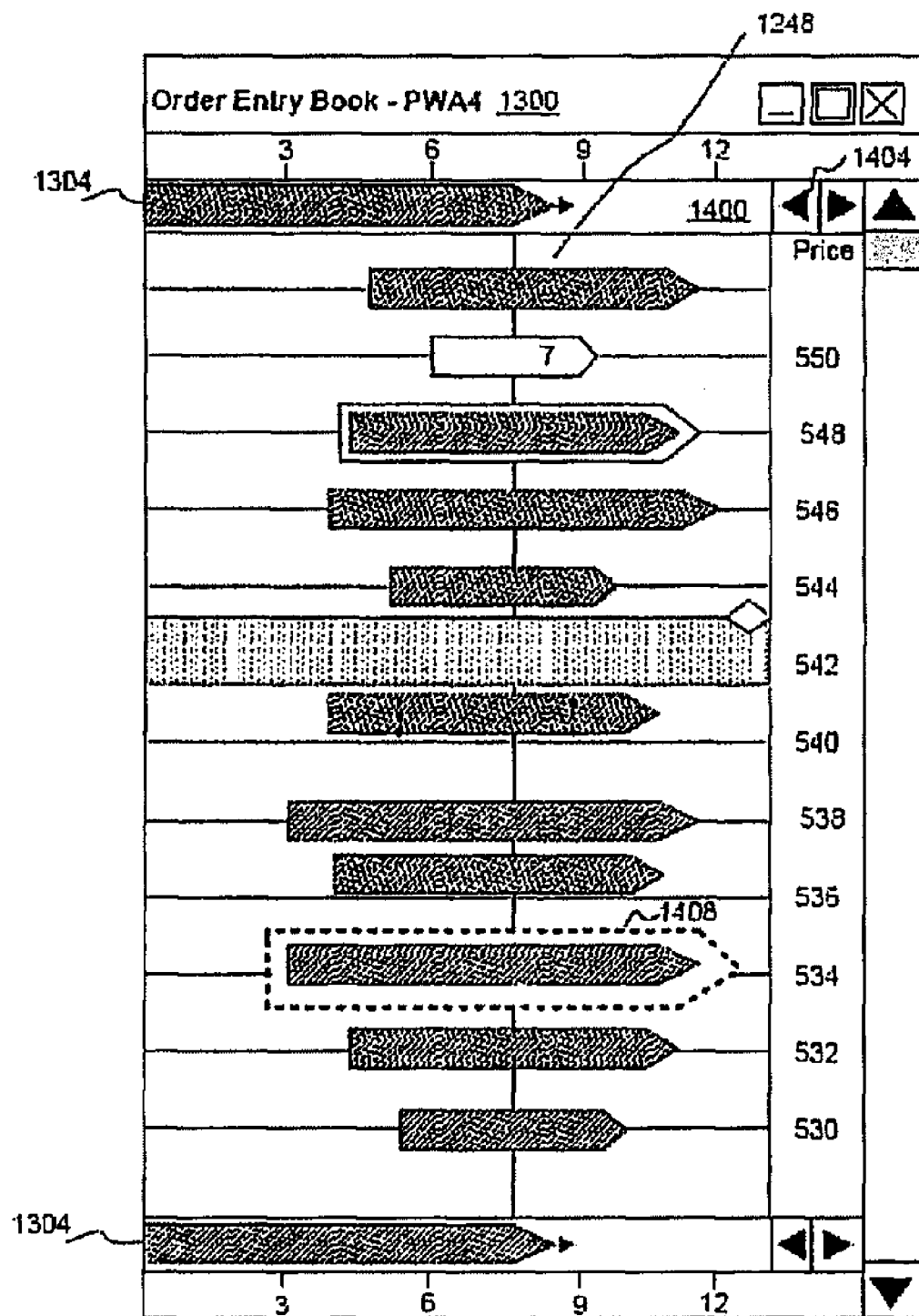
Figure 15:
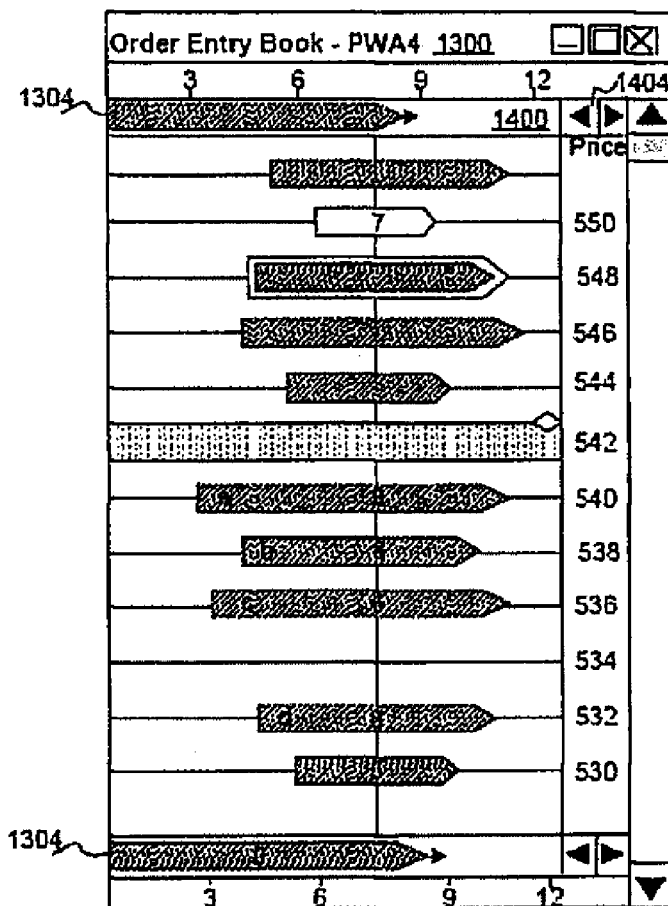
Figure 15:
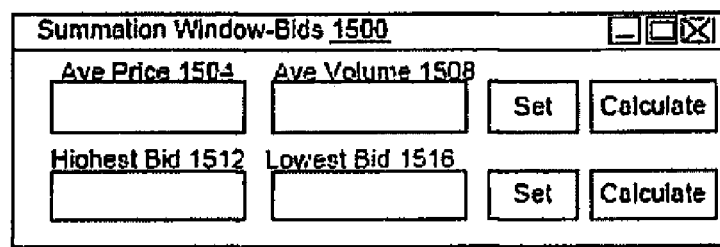

FIG. 15 illustrates an embodiment in which the order entry book window 1300 allows a trader to sum existing orders. For example, if a trader wanted to see the total quantity of the highest four bids in FIG. 15, the trader would select the summing function from a menu or by clicking on the appropriate icon, and then select the orders the trader would like summed. In one embodiment, the interface 1200 displays a summation icon overlaying a selected order to allow the trader to track which orders are being summed. When the summation tool is activated with a button or mouse operation, a summation text window 1500 will appear. In one embodiment, this window 1500 has text fields for total quantity, average price, highest bid [or offer], lowest bid [or offer], and total price. The user could select a value on the scale of panel view 1248 and the summation text window 1500 populates with the associated values representing the summation of values for all orders between those at or closest to the selected value to the best bid or offer. For example, in FIG. 15, if the user tagged the summation device at "d", the summation window 1500 would populate with the following values: Box 1504 would represent the average price a trader would pay to fill all the orders from "d" to "a". That is, Box 1504=[(price of a)×(volume of a)+(price of b)×(volume of b)+(price of c)×(volume of c)+(price of d)×(volume of d)]/(volume a+volume b+volume c+volume d). Box 1508 would represent the sum of the volume of orders a, b, c and d. Box 1516 would represent the price of order d. Box 1512 would represent the price of order a. Alternatively, the user can enter a value for either volume or average price and then click a button, utilize a mouse operation or some other method of actuation to activate the summation tool to populate the remaining fields. In one embodiment, an icon would be generated on the book axis window in question representing the associated average value quantity.

In another embodiment, orders can be summed over a range of prices not including the best bid or offer. In this embodiment, the user could enable the function by clicking a button and then populate the high order price level using a right mouse click and the low order price level using a left mouse click at the desired level along the value axis 1212. The user would then hit a calculate button to populate the average price and volume numbers. The same operation could be used to set the average price or total volume where the summation tool would populate the window 1500 with the highest and lowest bid or offer values which would correspond. The summation tool can be used to calculate values other than price when orders are measured across another value scale.

Referring back to FIG. 12, in a further embodiment, an array of filter boxes 1252 are displayed which, when highlighted, allow the trader to differentiate between semi-fungible orders based on parameters unique to given orders or order books. For example, in a preferred embodiment, the trader can specify that a filter box 1252 be highlighted for all book axes 1208 where the lowest (the "best") offer is for more than a given number of contracts. The trader will specify the given number to be equal to some number of contracts that the trader wishes to sell. Then, the trader merely has to look at the filter boxes 1252 for all of the different book axes 1208 to immediately know when the trader can sell his contracts. In another embodiment, the trader can request the interface 1200 to highlight all book axes 1208 where a given trader has entered an order. Thus, a trader may use this feature to locate orders of other traders with which the trader has a line of credit, or simply to track the book axes 1208 with which the trader himself or herself has placed an order. Thus, the filters 1252 provide an additional means of simplifying the information inherent in trading semi-fungible or non-fungible goods.

Although the above description has been given in terms of displaying bids and offers for semi-fungible goods, the present invention may apply equally to displaying non-fungible goods. Thus, if a trader is trading in several different non-fungible goods, the interface 1200 can display the book axes 1208 for the different non-fungible goods in a similar manner as described above. In this embodiment, however, the value axis 1212 will typically display price, as there may be no other common basis with which to relate the non-fungible goods, although any common value could be used. Thus, in this embodiment, the trader can track all of the goods the trader is trading and realize the benefits described above. Additionally, although the above description has focused on traders' use of the present invention, non-traders who desire information about different markets can use the interface 1200 of the present invention to have the information about the markets effectively and efficiently communicated. For example, a stock market analyst may want to focus on the performance of S&P 500 companies. Accordingly, the analyst may configure the interface 1200 to display book axes 1208 for each of those companies. Then, the analyst can watch trends in the market overall for each company and in the S&P overall. Pricing, quantity, and spread information is instantly available to the analyst for all of the companies, and more information is available in the panel view 1248 described above. Filters 1252 and action lines 1224 can be used to alert the analyst to certain trends, like large sell offs and price swings. Thus, the information communication methodology of the present invention applies equally in a non-trading environment as well as a trading environment.

In a further embodiment of the present invention, the interface 1200 displays only bids or only offers in an auction application. In one embodiment, one book axis 1208 represents one auction, and the bids for the auctioned good are displayed as described above. For example, if 50 computers are being sold in an auction, a book axis 1208 displays the different bids and represents the quantities of the bids through displaying the width of the icon 1220. Multiple auctions for the same type of good or for different goods may also be displayed as described above. If the goods are different, i.e., non-fungible, the value axis 1212 typically represents price. However, if the goods are semi-fungible or fungible, then the value axis 1212 represents price or another variable relating the semi-fungible or fungible goods together. Thus, in accordance with the present invention, a buyer, seller, or observer can view multiple auctions on a single interface 1200. In a reverse auction, the interface 1200 can display offers without bids to allow a buyer, seller, or observer to watch multiple reverse auctions. The buyer may track multiple auctions for which the buyer has a bid, a seller can track various auctions in which the seller is selling a good, or an observer may simply observe the market for different goods to determine what the value of a good is. The panel view 1248 may be used to display more information about a specific auction, and buyers and sellers can place bids and offers for a good as described above by selecting on an order token and adjusting its parameters to match the buyer's or seller's desired values. The foregoing describes in details the features and benefits of the present in various embodiments. Those of skill in the art will appreciate that present invention is capable of various other implementations that operate in accordance with the foregoing principles and teachings. Certainly, the names of the various entities may be changed without impacting their functional operations. Accordingly, this detailed description is not intended to limit the scope of the present invention, which is to be understood by reference the claims below.

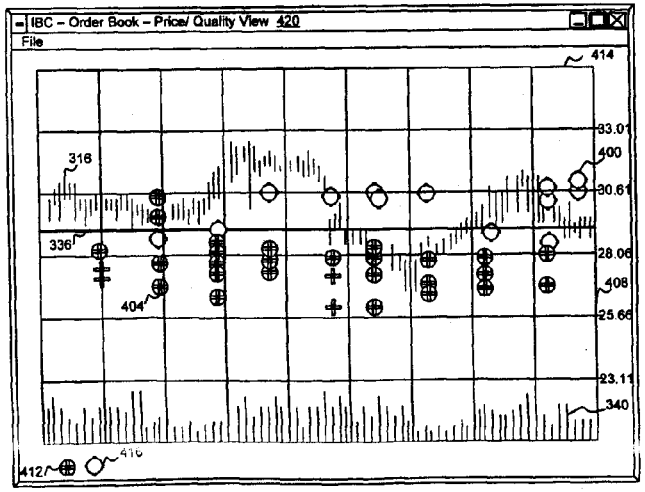

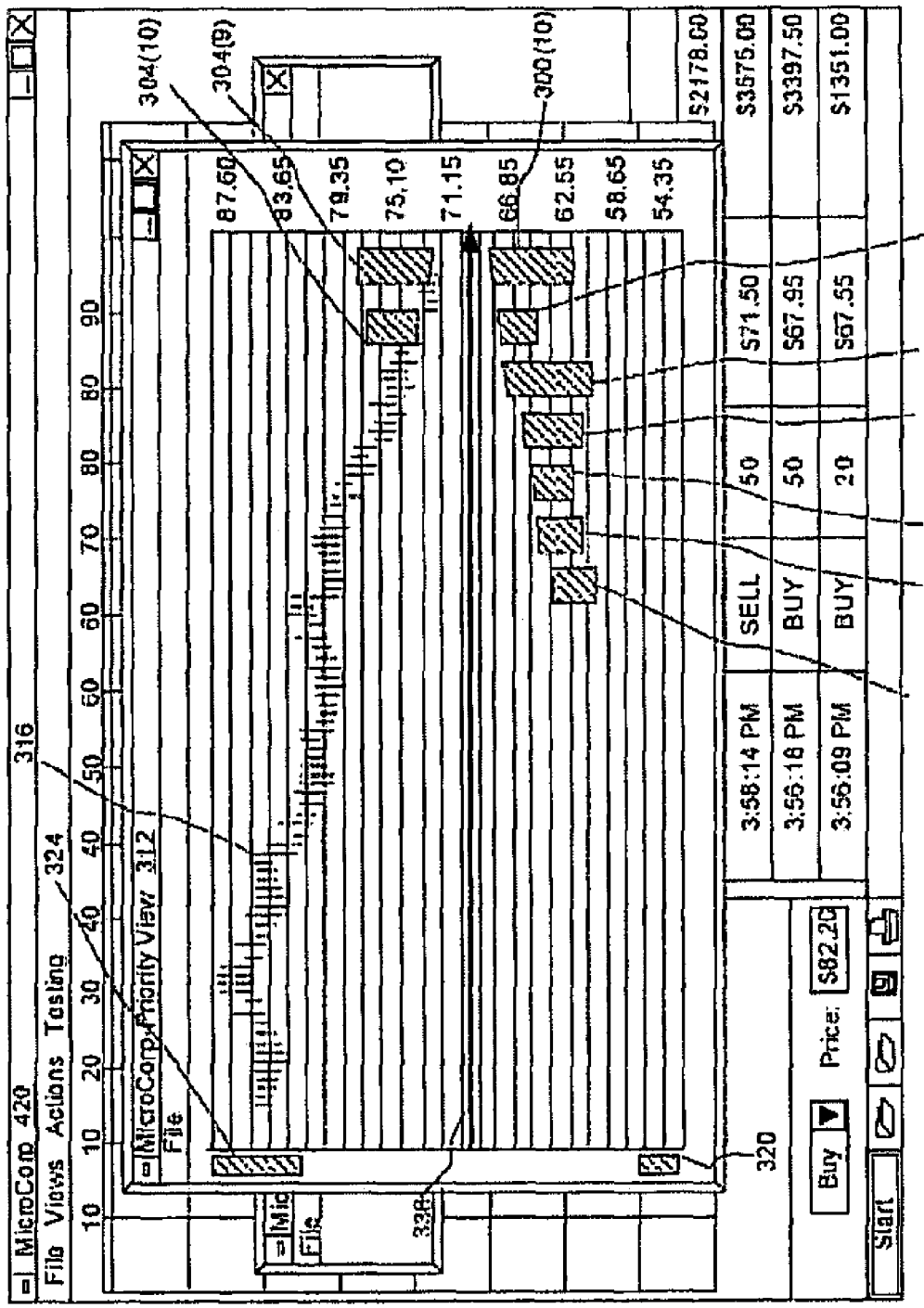

What is claimed is:

1. In an electronic trading system, a computer based method for displaying information regarding the trading of a plurality of goods, comprising:

displaying a plurality of book axes on a screen associated with a computing device, each book axis representing a book for a corresponding one of the plurality of goods, each book comprised of a plurality of orders including at least one bid order and at least one sell order for the corresponding good;

displaying a value axis in relation to the plurality of book axes on the screen, the value axis having units of a value common to the plurality of goods; and displaying indicators on the screen representing at least one order for at least one of the plurality of goods, wherein the indicators are displayed in locations along the book axes corresponding to the value axis.

2. The method of claim 1, wherein each indicator represents a bid or an offer for one of the plurality of goods.

3. The method of claim 2, further comprising the step of visually distinguishing indicators that represent bids from indicators that represent offers.

4. The method of claim 1, wherein the values along the value axis represent prices associated with the plurality of goods.

5. The method of claim 1, wherein the values along the value axis represent volatility associated with the plurality of goods.

6. The method of claim 1, wherein the values along the value axis represent a unifying characteristic of the plurality of goods.

7. The method of claim 1, wherein the step of displaying indicators representing at least one order comprises locating an indicator relative to the value axis based upon a price of the order.

8. The method of claim 1, wherein the indicators for the plurality of goods are displayed in a single window.

9. The method of claim 1, wherein the indicators comprise icons.

10. The method of claim 9, wherein the icons are sized according to a quantity value.

11. The method of claim 1, further comprising displaying an action line relative to the value axis, wherein a location of the action line along the value axis indicates a value of interest.

12. The method of claim 11, wherein the action line is generated based on an algorithm.

13. The method of claim 12, wherein the action line is floating and the location of the action line is updated based on the algorithm.

14. The method of claim 11, wherein the action line is generated based on a value obtained from a data feed.

15. The method of claim 14, wherein the location of the action line is updated based on the value obtained from the data feed.

16. The method of claim 11, wherein the action line represents a variable other than that being used for the value axis.

17. The method of claim 1, further comprising displaying a marker representing a data point of interest relative to the value axis.

18. The method of claim 1, further comprising changing a scale of the values along the value axis.

19. The method of claim 1, further comprising placing an order on behalf of a user for one of the plurality of goods in response to a command, and updating the display of indicators to include the order.

20. The method of claim 1, further comprising, for each of the plurality of goods visually highlighting a spread between an indicator representing an order at a highest bid price and an indicator representing an order at a lowest ask price.

21. The method of claim 1, further comprising the steps of receiving a selection of one of the plurality of book axes, and displaying an enlarged version of the selected book axis.

22. The method of claim 1, further comprising the steps of receiving a selection of one of the plurality of book axes, and displaying a different view of the selected book axis.

23. The method of claim 22 wherein the different view of the selected book axis comprises using a different scale for the selected book axis.

24. The method of claim 22 wherein the different view of the selected book axis comprises the selected book axis with additional information.

25. The method of claim 1, wherein a scale associated with the plurality of book axes is different than a scale of the value axis.

26. The method of claim 1, wherein indicators associated with the best bids and offers are displayed in correlation with the value axis, and indicators associated other orders are not displayed in correlation with the value axis.

27. The method of claim 1, wherein the step of displaying a plurality of book axes comprises displaying a large number of book axes in a condensed manner.

28. The method of claim 27 wherein each of the large number of book axes comprises a line.

29. The method of claim 1, further comprising visually highlighting one of the plurality of book axes based on a condition being met.

30. The method of claim 1, wherein the indicators are based on at least one data feed and wherein the display of the indicators is updated based on the at least one data feed.

31. The method of claim 1, further comprising displaying values along the value axis.

32. The method of claim 1, wherein each indicator represents an individual order for one of the plurality of goods.

33. The method of claim 1, wherein each indicator represents a plurality of orders for one of the plurality of goods.

34. The method of claim 1, wherein the plurality of goods are semi-fugible, fungible or non-fungible.

35. The method of claim 1 wherein the screen displays a graphical user interface.

36. A computer based method for displaying market information relating to electronic trading of products, comprising:

receiving bid and offer information for a first product and a second product being traded on at least one electronic trading system, the first and second products each trading with a current highest bid price and a current lowest ask price;

generating a common value axis comprising units of value associated with the first and second products;

displaying a first indicator associated with the current highest bid price for the first product in relation to a first value level on the common value axis;

displaying a second indicator associated with the current lowest ask price for the first product in relation to a second value level on the common value axis;

displaying a third indicator associated with eth current highest bid price for the second product in relation to a third value level on the common value axis; and displaying a fourth indicator associated with the current lowest ask price for the second product in relation to a fourth value level on the common value axis;

whereby the indicators for the first and second products are displayed on a screen associated with a computing device such that relative values of the indicators are visually apparent.

37. The method of claim 36, further comprising updating the display of the first, second, third and fourth indicators upon receiving updated bid and offer information for the first and second products.

38. The method of claim 36, further comprising displaying additional indicators associated with orders at prices other than the current highest bid and ask prices for the first and second products, the additional indicators being displayed relative to the common value axis.

39. The method of claim 36, further comprising visually highlighting a particular indicator based on a condition being met.

40. The method of claim 36, further comprising displaying additional indicators associated with orders for additional products in relation to the common value axis.

41. The method of claim 36, wherein the common value axis represents price.

42. The method of claim 36, wherein the common value axis represents volatility.

43. The method of claim 36, wherein the common value axis represents a unifying characteristic of the first and second products.

44. The method of claim 36, wherein the first, second, third and fourth indicators comprise icons.

45. The method of claim 44, wherein the icons are sized in accordance with quantities associated with the orders.

46. The method of claim 36, further comprising displaying an action line relative to the common value axis, wherein a location of the action line along the common value axis indicates a value of interest.

47. The method of claim 46, wherein the action line is generated based on an algorithm.

48. The method of claim 47, wherein the action line is floating and the location of the action line is updated based on the algorithm.

49. The method of claim 47, wherein the action lien is generated based on a value obtained from a data feed.

50. The method of claim 49, wherein the location of the action line is updated based on values obtained from the data feed.

51. The method of claim 47, wherein the action line represents a variable other than that being used for the common value axis.

52. The method of claim 36, further comprising displaying a marker associated with a value of interest relative to the common value axis.

53. The method of claim 36, further comprising changing a scale of the values along the common value axis.

54. The method of claim 36, further comprising placing an order having a value associated with the common value axis for one of the first and second products in response to a command.

55. The method of claim 36, further comprising displaying a first and second book axis, each book axis relating to one of the first and second products, wherein the first and second indicators are displayed along the first book axis and the first and fourth indicators are displayed along the second book axis.

56. The method of claim 55, further comprising visually highlighting a spread between the first and second indicators and a spread between the third and fourth indicators.

57. The method of claim 56, further comprising receiving a selection of one of the first and second book axes, and displaying an enlarged version of the selected book axis.

58. The method of claim 56, further comprising receiving a selection of one of the first and second book axes, and displaying different information related to the second book axis.

59. The method of claim 56, wherein the first and second book axes have scales that are different than a scale of the common value axis.

60. The method of claim 56, further comprising displaying additional indicators associated with orders at prices other than the current highest bid and ask prices for the first and second products, the additional indicators being displayed relative to the common value axis.

61. The method of claim 49, wherein the first, second, third and fourth indicators are displayed in correlation with the value axis, and wherein the additional indicators are not displayed in correlation with the value axis.

62. The method of claim 56, further comprising displaying additional book axes, each additional book axis relating to one of a plurality of additional products.

63. The method of claim 62, wherein the step of displaying first and second book axes and displaying additional book axes further comprise displaying a large number of book axes in a condensed manner.

64. The method of claim 63, wherein each of the large number of book axes comprises a line.

65. The method of claim 56, wherein the first, second, third and fourth indicators are based on at least one data feed, and wherein the display of the first, second, third and fourth indicators is updated based on the at least one data feed.

66. The method of claim 56, further comprising displaying the common value axis.

67. The method of claim 56, wherein the first, second, third and fourth indicators each represents an individual order.

68. The method of claim 56, wherein the first, second, third and fourth indicators each represent multiple orders.

69. The method of claim 36 wherein the products are semi-fungible, fungible or non-fungible.

70. The method of claim 36 wherein the screen displays a graphical user interface.

* * * * *

UNITED STATES PATENT AND TRADEMARK OFFICE
CERTIFICATE OF CORRECTION

| | | |
|---|---|---|
| PATENT NO. | : 6,993,504 B1 | |
| APPLICATION NO. | : 09/651301 | |
| DATED | : January 31, 2006 | |
| INVENTOR(S) | : Richard W. Friesen et al. | |

It is certified that error appears in the above-identified patent and that said Letters Patent is hereby corrected as shown below:

The Title page showing an illustrative figure, should be deleted and substitute therefor the attached title page.

Delete drawing sheets 1-13, and substitute therefor the drawing sheets, consisting of Figs. 2, 3A, 3B, 3C, 3D, 3E, Fig. 9, Fig. 4, Fig.6, Fig. 7, Fig. 10, Fig. 12-15, as shown on the attached pages.

Column 7, line 29: please delete "$29.50" and insert --slightly less than $27.35--.

Column 8, line 14: please delete "300(91)" and insert --300(1)--.

Column 8, lines 18-29: please delete the entire phrase "Thus by viewing all outstanding offer icons 304 and bid icons 300 as they are made on an item, the trader can anticipate the market and quickly adjust his or her trading plans to take advantage of the information. In contrast, in conventional systems, the trader only knows the last highest bid and the last highest offer. In the example of FIG. 3a, the trader would only know the existence of bid 300(9) and offer 304(1). Only the market maker would know the existence of the other bids and offers. Individual traders would therefore be unaware of trends in bidding, and experience greater difficulty in anticipating the market."

Column 8, line 55: please delete "is chosen" and insert --has chosen--.

Column 11, line 20: please delete "412" and insert --417--.

Column 11, line 23: please delete "412" and insert --417--.

Claim 26, col. 26, line 18: please insert --with-- between "associated" and "other.".

Claim 36, col. 26, line 58: please delete "with eth current" and insert --with the current--.

Claim 49, col. 27, line 36: please delete "lien" and insert --line--.

Signed and Sealed this
Twenty-eighth Day of June, 2011

David J. Kappos
*Director of the United States Patent and Trademark Office*

(12) United States Patent
Friesen et al.

(10) Patent No.: US 6,993,504 B1
(45) Date of Patent: Jan. 31, 2006

(54) USER INTERFACE FOR SEMI-FUNGIBLE TRADING

(75) Inventors: Richard W. Friesen, Fairfax, CA (US); Mark C. Klizas, San Francisco, CA (US)

(73) Assignee: Trading Technologies International, Inc., Chicago, IL (US)

( * ) Notice: Subject to any disclaimer, the term of this patent is extended or adjusted under 35 U.S.C. 154(b) by 37 days.

(21) Appl. No.: 09/651,301

(22) Filed: Aug. 30, 2000

Related U.S. Application Data

(63) Continuation-in-part of application No. 09/289,550, filed on Apr. 9, 1999.

(60) Provisional application No. 60/151,468, filed on Aug. 30, 1999.

(51) Int. Cl.
*G06F 17/60* (2006.01)

(52) U.S. Cl. ..................... 705/37; 705/36 R
(58) Field of Classification Search ............... 364/408; 705/37, 36 R
See application file for complete search history.

(56) References Cited

U.S. PATENT DOCUMENTS

| | | | |
|---|---|---|---|
| 4,674,044 A | 6/1987 | Kalmus et al. ............ 364/408 |
| 4,750,135 A | 6/1988 | Boilen | |
| 4,799,156 A | 1/1989 | Shavit et al. ............ 364/401 |
| 4,823,265 A * | 4/1989 | Nelson ................. 364/408 |
| 4,903,201 A | 2/1990 | Wagner | |
| 5,038,284 A | 8/1991 | Kramer | |
| 5,077,665 A | 12/1991 | Silverman et al. | |
| 5,101,353 A | 3/1992 | Lupien et al. | |
| 5,136,501 A | 8/1992 | Silverman et al. | |
| 5,270,922 A | 12/1993 | Higgins | |
| 5,297,031 A | 3/1994 | Gutterman et al. ......... 364/408 |
| 5,297,032 A | 3/1994 | Trojan et al. ............. 364/408 |
| 5,347,452 A | 9/1994 | Bay, Jr. ................... 705/37 |
| 5,375,055 A | 12/1994 | Togher et al. ............ 364/408 |
| 5,619,631 A | 4/1997 | Schott | |
| 5,675,746 A * | 10/1997 | Marshall ................... 705/35 |
| 5,689,651 A | 11/1997 | Lozman ................... 395/237 |
| 5,774,877 A | 6/1998 | Patterson, Jr. et al. | |
| 5,793,301 A | 8/1998 | Patterson, Jr. et al. | |
| 5,797,002 A | 8/1998 | Patterson, Jr. et al. | |

(Continued)

FOREIGN PATENT DOCUMENTS

EP 0 388 162 A2 3/1990

(Continued)

OTHER PUBLICATIONS

Yahoo!Finance—p. 1, 1995.*

(Continued)

*Primary Examiner*—Jagdish N Patel
(74) *Attorney, Agent, or Firm*—McDonnell Boehnen Hulbert & Berghoff LLP

(57) ABSTRACT

A user interface and method are disclosed for providing trading between a plurality of semi-fungible and non-fungible goods. A plurality of book axes are displayed in a single interface, each book axis representing a market for a particular good. Orders for goods are displayed as marks on the axes to display the relative value of the orders. A value axis is provided that relates the value of the goods from each market to each other. Thus, a single interface provides the means to relate the values of different semi-fungible goods. The value axis may be displayed in units of price, or a custom value designated by a user or pre-defined by the interface. Quantity information is represented in the interface through the display of a dimension of an order icon. Precise information about each order is displayed either in a panel view or a pop-up window.

70 Claims, 15 Drawing Sheets

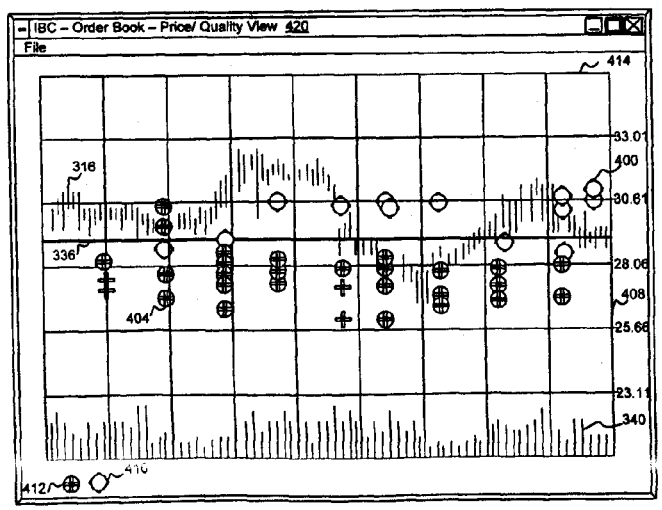

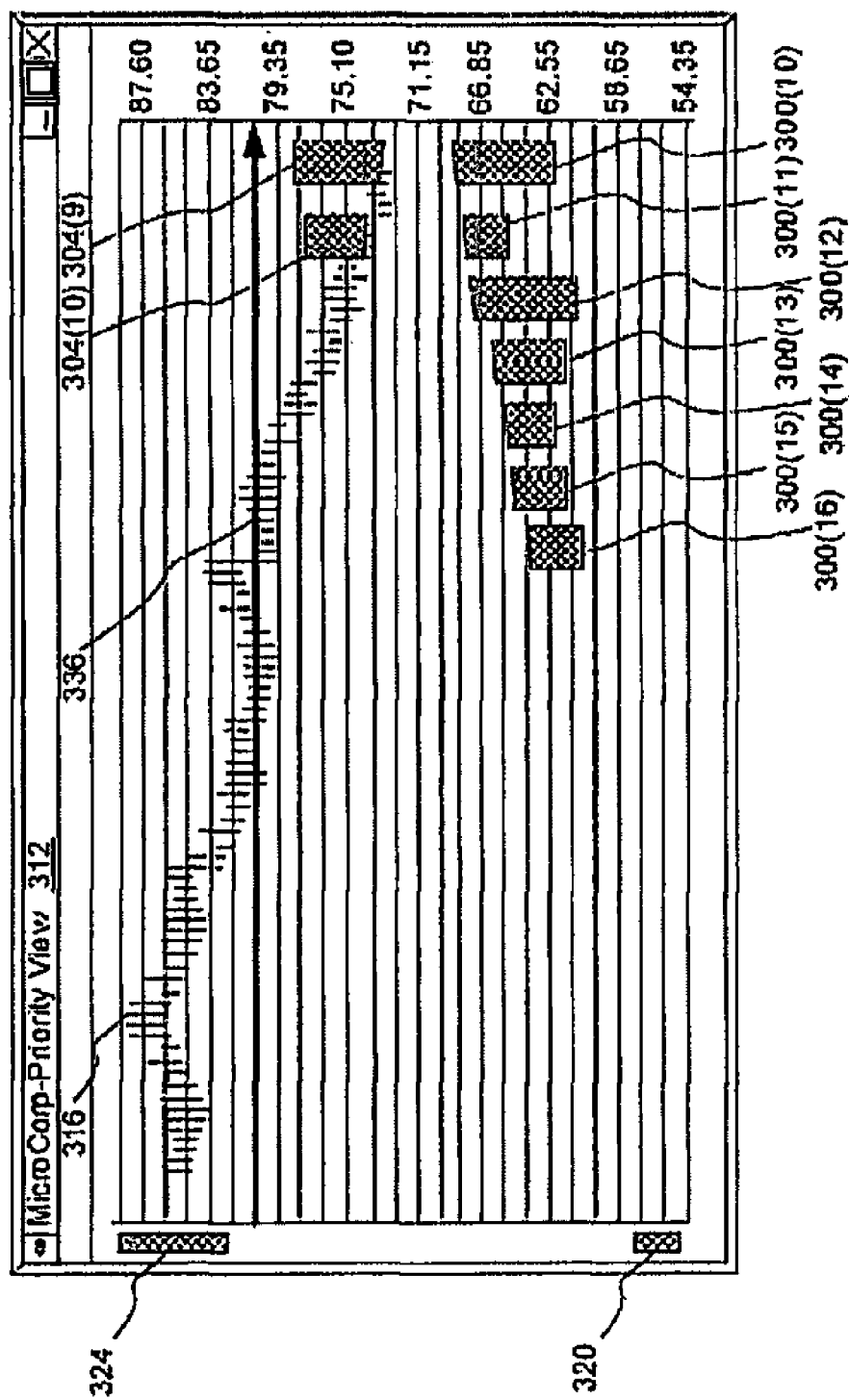

UNITED STATES PATENT AND TRADEMARK OFFICE
CERTIFICATE OF CORRECTION

| | | |
|---|---|---|
| PATENT NO. | : 6,993,504 B1 | |
| APPLICATION NO. | : 09/651301 | |
| DATED | : January 31, 2006 | |
| INVENTOR(S) | : Richard W. Friesen et al. | |

It is certified that error appears in the above-identified patent and that said Letters Patent is hereby corrected as shown below:

The Title page showing an illustrative figure, should be deleted and substitute therefor the attached title page.

Delete drawing sheets 2-10, 12-15, and substitute therefor the drawing sheets 2-10, 12-15, consisting of Figs. 2, 3A, 3B, 3C, 3D, 3E, Fig. 9, Fig. 4, Fig.6, Fig. 7, Fig. 10, Fig. 12-15, as shown on the attached pages.

Column 7, line 29: please delete "$29.50" and insert --slightly less than $27.35--.

Column 8, line 14: please delete "300(91)" and insert --300(1)--.

Column 8, lines 18-29: please delete the entire phrase "Thus by viewing all outstanding offer icons 304 and bid icons 300 as they are made on an item, the trader can anticipate the market and quickly adjust his or her trading plans to take advantage of the information. In contrast, in conventional systems, the trader only knows the last highest bid and the last highest offer. In the example of FIG. 3a, the trader would only know the existence of bid 300(9) and offer 304(1). Only the market maker would know the existence of the other bids and offers. Individual traders would therefore be unaware of trends in bidding, and experience greater difficulty in anticipating the market."

Column 8, line 55: please delete "is chosen" and insert --has chosen--.

Column 11, line 20: please delete "412" and insert --417--.

Column 11, line 23: please delete "412" and insert --417--.

Claim 26, col. 26, line 18: please insert --with-- between "associated" and "other.".

Claim 36, col. 26, line 58: please delete "with eth current" and insert --with the current--.

Claim 49, col. 27, line 36: please delete "lien" and insert --line--.

This certificate supersedes the Certificate of Correction issued June 28, 2011.

Signed and Sealed this
Twenty-third Day of August, 2011

David J. Kappos
*Director of the United States Patent and Trademark Office*

(12) United States Patent
Friesen et al.

(10) Patent No.: US 6,993,504 B1
(45) Date of Patent: Jan. 31, 2006

(54) USER INTERFACE FOR SEMI-FUNGIBLE TRADING

(75) Inventors: Richard W. Friesen, Fairfax, CA (US); Mark C. Klizas, San Francisco, CA (US)

(73) Assignee: Trading Technologies International, Inc., Chicago, IL (US)

( * ) Notice: Subject to any disclaimer, the term of this patent is extended or adjusted under 35 U.S.C. 154(b) by 37 days.

(21) Appl. No.: 09/651,301

(22) Filed: Aug. 30, 2000

Related U.S. Application Data

(63) Continuation-in-part of application No. 09/289,550, filed on Apr. 9, 1999.

(60) Provisional application No. 60/151,468, filed on Aug. 30, 1999.

(51) Int. Cl.
*G06F 17/60* (2006.01)

(52) U.S. Cl. .................................... 705/37; 705/36 R

(58) Field of Classification Search ............... 364/408; 705/37, 36 R
See application file for complete search history.

(56) References Cited

U.S. PATENT DOCUMENTS

| | | |
|---|---|---|
| 4,674,044 A | 6/1987 | Kalmus et al. ............. 364/408 |
| 4,750,135 A | 6/1988 | Boilen |
| 4,799,156 A | 1/1989 | Shavit et al. ................ 364/401 |
| 4,823,265 A * | 4/1989 | Nelson ....................... 364/408 |
| 4,903,201 A | 2/1990 | Wagner |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,270,922 A | 12/1993 | Higgins |
| 5,297,031 A | 3/1994 | Gutterman et al. ......... 364/408 |
| 5,297,032 A | 3/1994 | Trojan et al. ................ 364/408 |
| 5,347,452 A | 9/1994 | Bay, Jr. ......................... 705/37 |
| 5,375,055 A | 12/1994 | Togher et al. ............... 364/408 |
| 5,619,631 A | 4/1997 | Schott |
| 5,675,746 A * | 10/1997 | Marshall ....................... 705/35 |
| 5,689,651 A | 11/1997 | Lozman ....................... 395/237 |
| 5,774,877 A | 6/1998 | Patterson, Jr. et al. |
| 5,793,301 A | 8/1998 | Patterson, Jr. et al. |
| 5,797,002 A | 8/1998 | Patterson, Jr. et al. |

(Continued)

FOREIGN PATENT DOCUMENTS

EP        0 388 162 A2     3/1990

(Continued)

OTHER PUBLICATIONS

Yahoo!Finance—p. 1, 1995.*

(Continued)

*Primary Examiner*—Jagdish N Patel
(74) *Attorney, Agent, or Firm*—McDonnell Boehnen Hulbert & Berghoff LLP

(57) ABSTRACT

A user interface and method are disclosed for providing trading between a plurality of semi-fungible and non-fungible goods. A plurality of book axes are displayed in a single interface, each book axis representing a market for a particular good. Orders for goods are displayed as marks on the axes to display the relative value of the orders. A value axis is provided that relates the value of the goods from each market to each other. Thus, a single interface provides the means to relate the values of different semi-fungible goods. The value axis may be displayed in units of price, or a custom value designated by a user or pre-defined by the interface. Quantity information is represented in the interface through the display of a dimension of an order icon. Precise information about each order is displayed either in a panel view or a pop-up window.

70 Claims, 15 Drawing Sheets